United States Patent
Stark et al.

(10) Patent No.: US 7,076,602 B2
(45) Date of Patent: Jul. 11, 2006

(54) MULTI-DIMENSIONAL ASSOCIATIVE SEARCH ENGINE HAVING AN EXTERNAL MEMORY

(75) Inventors: Moshe Stark, Even Yehuda (IL);
Moshe Hershkovich, Netanya (IL);
Ronen Reznik, Yehud (IL)

(73) Assignee: HyWire Ltd., Netanya (IL)

( * ) Notice: Subject to any disclaimer, the term of this patent is extended or adjusted under 35 U.S.C. 154(b) by 287 days.

(21) Appl. No.: 10/688,986

(22) Filed: Oct. 21, 2003

(65) Prior Publication Data

US 2004/0083336 A1 Apr. 29, 2004

Related U.S. Application Data

(63) Continuation-in-part of application No. 10/229,065, filed on Aug. 28, 2002, now Pat. No. 6,839,800, and a continuation-in-part of application No. 10/206,189, filed on Jul. 29, 2002, which is a continuation-in-part of application No. PCT/IL01/01025, filed on Nov. 5, 2001.

(51) Int. Cl.
*G06F 12/00* (2006.01)

(52) U.S. Cl. ........................ 711/108; 711/154; 711/113; 707/3; 365/49

(58) Field of Classification Search .................... None
See application file for complete search history.

(56) References Cited

U.S. PATENT DOCUMENTS 4,791,606 A  12/1988  Threewit et al.

(Continued)

FOREIGN PATENT DOCUMENTS

WO  PCT/IL01/01025  11/2001

(Continued)

OTHER PUBLICATIONS

U.S. Appl. No. 09/779,941, Stark.

(Continued)

*Primary Examiner*—Mano Padmanabhan
*Assistant Examiner*—Jasmine Song
(74) *Attorney, Agent, or Firm*—Mark M. Friedman

(57) ABSTRACT

An associative search engine (ASE) including: (a) a search engine manager (SEM), disposed within a chip, including: (i) processing logic; (b) an external memory system, disposed outside of the chip, including: (i) a plurality of memory storage units, each memory storage unit of the memory storage units having at least a first array for storing a plurality of key entries; (c) at least a second array for storing a plurality of associated data entries, the data entries being associated with the key entries, and (d) an interface for data interfacing between the external memory system and the SEM, wherein the processing logic is designed and configured to search within each of the memory storage units, in response to an input key, so as to determine if the input key matches a particular key entry, and wherein the key entries are stored in the memory storage units as logical two-dimensional arrays (TDAs) arranged for a search tree having a plurality of levels, so as to provide an increased rate of the data retrieval from the external memory system to the processing logic.

47 Claims, 30 Drawing Sheets

U.S. PATENT DOCUMENTS

| | | |
|---|---|---|
| 5,383,146 A | 1/1995 | Threewit |
| 6,226,710 B1 * | 5/2001 | Melchior ................... 711/108 |
| 6,374,325 B1 | 4/2002 | Simpson et al. |
| 6,570,877 B1 * | 5/2003 | Kloth et al. ................ 370/392 |
| 6,711,661 B1 * | 3/2004 | Zabarski et al. ............ 711/202 |
| 6,766,317 B1 * | 7/2004 | Sharma et al. ................. 707/3 |
| 2003/0093646 A1 | 5/2003 | Stark |
| 2003/0137787 A1 | 7/2003 | Stark |

FOREIGN PATENT DOCUMENTS

| | | |
|---|---|---|
| WO | WO01/91132 | 11/2001 |

OTHER PUBLICATIONS

U.S. Appl. No. 10/315,006, filed Dec. 2002, Stark.
U.S. Appl. No. 10/206,189, filed Jul. 2002, Kastoriano et al.
U.S. Appl. No. 10/229,054, filed Aug. 2002, Stark.

* cited by examiner

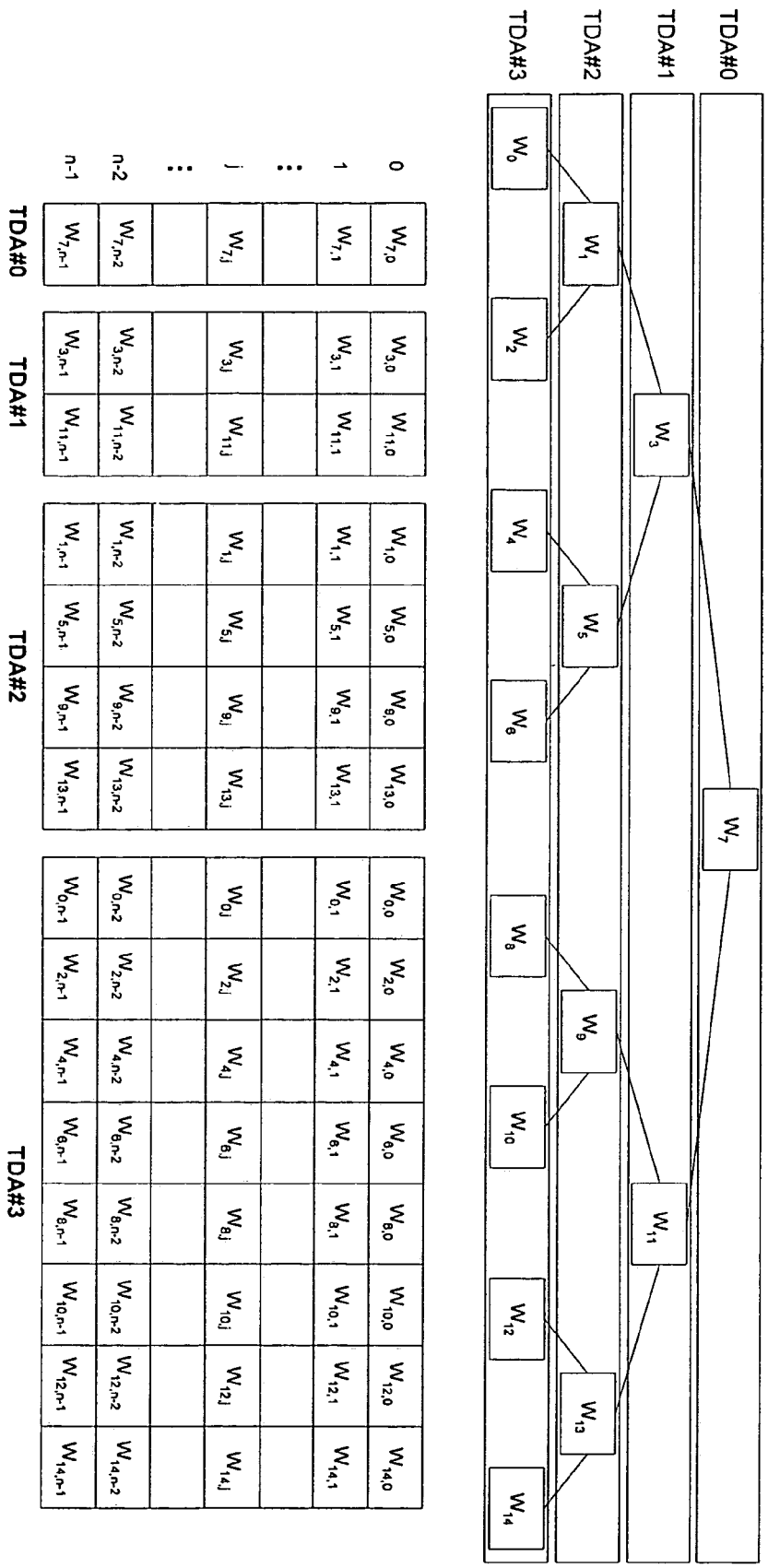
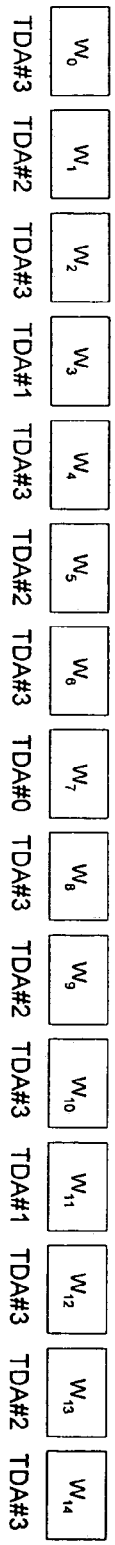
Figure 9

Figure 10

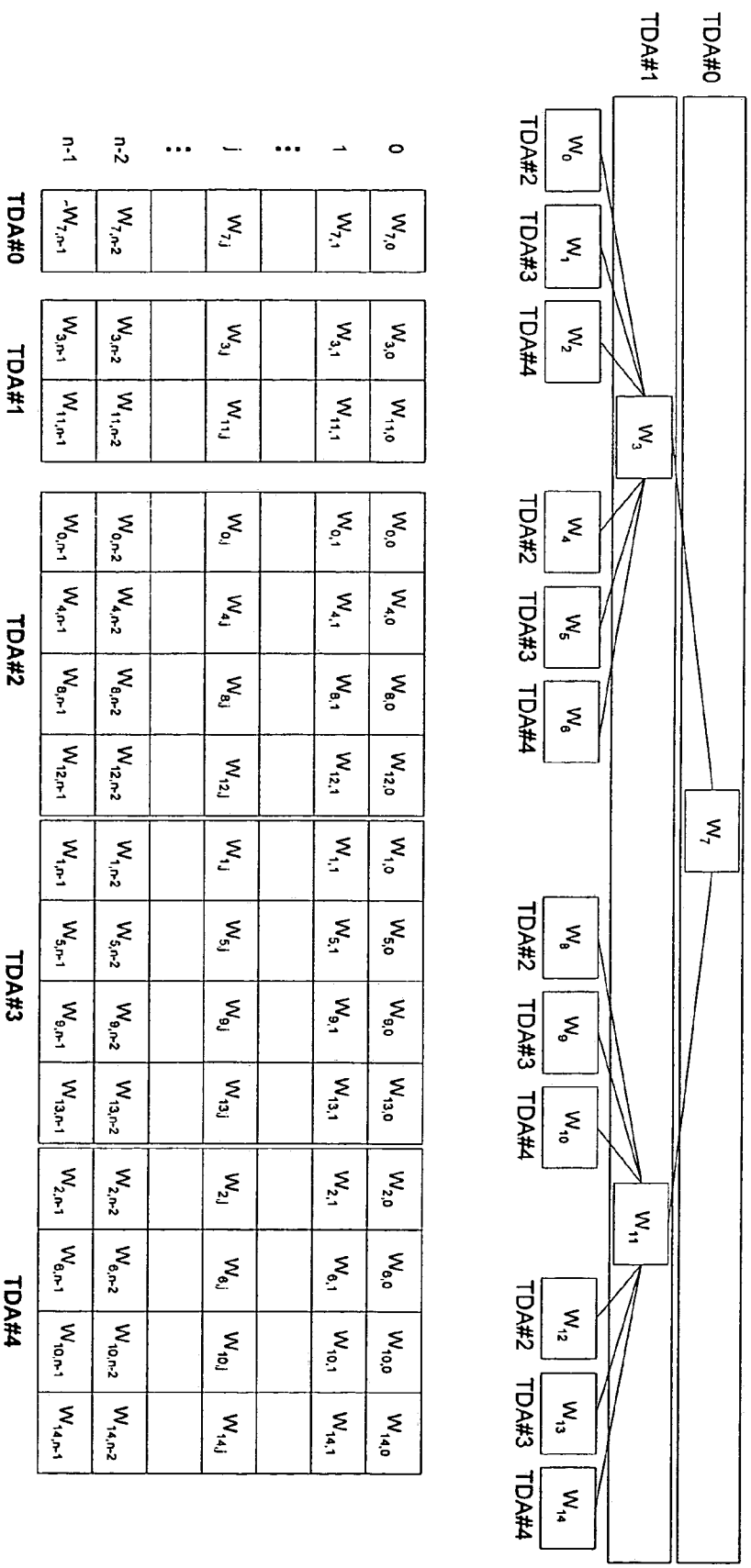
Figure 12

Figure 13

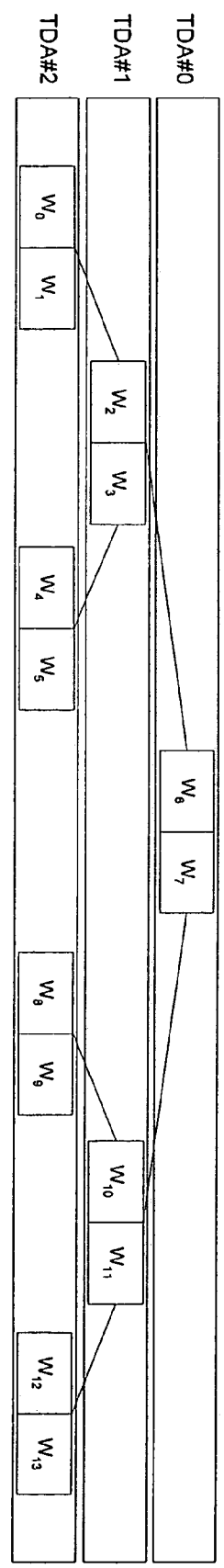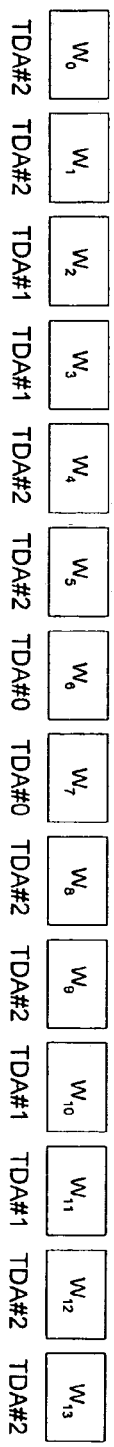
Figure 14

Figure 15

| FC-Register | | DRAM#1 | | DRAM#2 | | | DRAM#3 | | |
|---|---|---|---|---|---|---|---|---|---|
| 0 | $W_{0,0}$ | $W_{3,0}$ | $W_{7,0}$ | $W_{1,0}$ | $W_{5,0}$ | $W_{9,0}$ | $W_{0,0}$ | $W_{2,0}$ | $W_{4,0}$ |
| | | | | | | | $W_{6,0}$ | $W_{8,0}$ | $W_{10,0}$ |
| 1 | $W_{0,1}$ | $W_{3,1}$ | $W_{7,1}$ | $W_{1,1}$ | $W_{5,1}$ | $W_{9,1}$ | $W_{0,1}$ | $W_{2,1}$ | $W_{4,1}$ |
| | | | | | | | $W_{6,1}$ | $W_{8,1}$ | $W_{10,1}$ |
| ⋮ | ⋮ | ⋮ | ⋮ | ⋮ | ⋮ | ⋮ | ⋮ | ⋮ | ⋮ |
| j | $W_{0,j}$ | $W_{3,j}$ | $W_{7,j}$ | $W_{1,j}$ | $W_{5,j}$ | $W_{9,j}$ | $W_{0,j}$ | $W_{2,j}$ | $W_{4,j}$ |
| | | | | | | | $W_{6,j}$ | $W_{8,j}$ | $W_{10,j}$ |
| ⋮ | ⋮ | ⋮ | ⋮ | ⋮ | ⋮ | ⋮ | ⋮ | ⋮ | ⋮ |
| n-2 | $W_{0,n-2}$ | $W_{3,n-2}$ | $W_{7,n-2}$ | $W_{1,n-2}$ | $W_{5,n-2}$ | $W_{9,n-2}$ | $W_{0,n-2}$ | $W_{2,n-2}$ | $W_{4,n-2}$ |
| | | | | | | | $W_{6,n-2}$ | $W_{8,n-2}$ | $W_{10,n-2}$ |
| n-1 | $W_{0,n-1}$ | $W_{3,n-1}$ | $W_{7,n-1}$ | $W_{1,n-1}$ | $W_{5,n-1}$ | $W_{9,n-1}$ | $W_{0,n-1}$ | $W_{2,n-1}$ | $W_{4,n-1}$ |
| | | | | | | | $W_{6,n-1}$ | $W_{8,n-1}$ | $W_{10,n-1}$ |

| FC-Register | | TDA#0 | | TDA#1 | | | TDA#2 | | | | | |
|---|---|---|---|---|---|---|---|---|---|---|---|---|
| 0 | $W_{0,0}$ | $W_{3,0}$ | $W_{7,0}$ | $W_{1,0}$ | $W_{5,0}$ | $W_{9,0}$ | $W_{0,0}$ | $W_{2,0}$ | $W_{4,0}$ | $W_{6,0}$ | $W_{8,0}$ | $W_{10,0}$ |
| 1 | $W_{0,1}$ | $W_{3,1}$ | $W_{7,1}$ | $W_{1,1}$ | $W_{5,1}$ | $W_{9,1}$ | $W_{0,1}$ | $W_{2,1}$ | $W_{4,1}$ | $W_{6,1}$ | $W_{8,1}$ | $W_{10,1}$ |
| ⋮ | ⋮ | ⋮ | ⋮ | ⋮ | ⋮ | ⋮ | ⋮ | ⋮ | ⋮ | ⋮ | ⋮ | ⋮ |
| j | $W_{0,j}$ | $W_{3,j}$ | $W_{7,j}$ | $W_{1,j}$ | $W_{5,j}$ | $W_{9,j}$ | $W_{0,j}$ | $W_{2,j}$ | $W_{4,j}$ | $W_{6,j}$ | $W_{8,j}$ | $W_{10,j}$ |
| ⋮ | ⋮ | ⋮ | ⋮ | ⋮ | ⋮ | ⋮ | ⋮ | ⋮ | ⋮ | ⋮ | ⋮ | ⋮ |
| n-2 | $W_{0,n-2}$ | $W_{3,n-2}$ | $W_{7,n-2}$ | $W_{1,n-2}$ | $W_{5,n-2}$ | $W_{9,n-2}$ | $W_{0,n-2}$ | $W_{2,n-2}$ | $W_{4,n-2}$ | $W_{6,n-2}$ | $W_{8,n-2}$ | $W_{10,n-2}$ |
| n-1 | $W_{0,n-1}$ | $W_{3,n-1}$ | $W_{7,n-1}$ | $W_{1,n-1}$ | $W_{5,n-1}$ | $W_{9,n-1}$ | $W_{0,n-1}$ | $W_{2,n-1}$ | $W_{4,n-1}$ | $W_{6,n-1}$ | $W_{8,n-1}$ | $W_{10,n-1}$ |

Figure 18

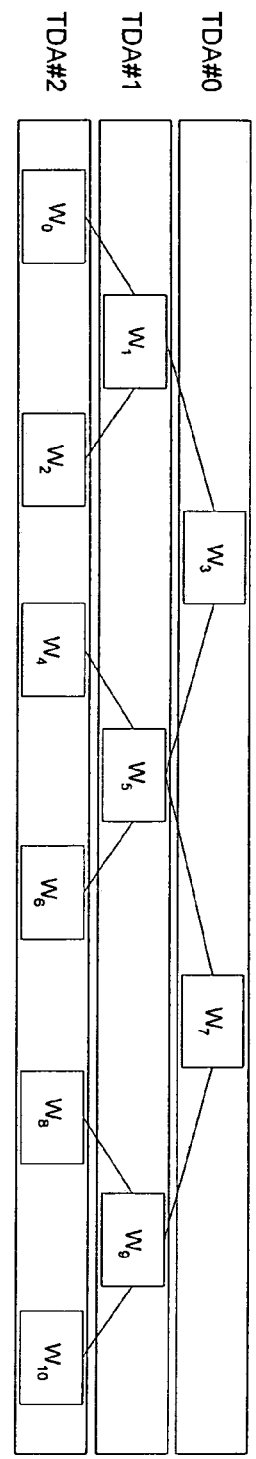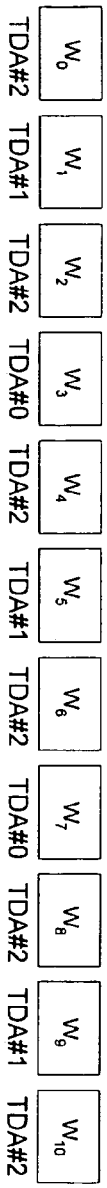
Figure 19

MULTI-DIMENSIONAL ASSOCIATIVE SEARCH ENGINE HAVING AN EXTERNAL MEMORY

This is a continuation-in-part of U.S. patent application Ser. No. 10/206,189 filed Jul. 29, 2002 and a continuation-in-part of U.S. patent application Ser. No. 10/229,065 filed Aug. 28, 2002 now U.S. Pat. No. 6,839,800, which is a continuation-in-part of PCT Application Serial No. IL01/01025, filed Nov. 5, 2001.

FIELD AND BACKGROUND OF THE INVENTION

The present invention relates to associative search engines (ASEs) and, more particularly, to a method and device for significantly increasing the storage capacity of any Associative Search Engine by means of one or more external memories, and for performing fast search operations in these memories.

It is known that a large storage capacity is required for data packet classification and forwarding, in which large amounts of information must be stored in the information base. Storage space limitations affect all state-of-the-art ASEs, including Content Addressable Memories (CAMs) such as Binary CAMs and Ternary CAMs. Storage space limitation is also a key issue in the Range Search Engine (RSE) technology of HyWire Ltd., which is used for searching Multi-Dimensional Keys in Multi-Dimensional Ranges.

In the key search operations performed in the RAM-Based CAMs and Multi-RAM CAM configurations covered in all the above patents, it was assumed that once a specific row of a RAM or Multi-RAM is identified in the FC-Register, the entire row can be read out and all the key entries listed in the row can be simultaneously compared with the searched key using one or several Column Locators to identify the matching key. This may hold for SRAMs or other fast memory devices embedded in the RSE, where many cells (or many words) can be simultaneously accessed; however, this is not the case with external memory devices. This technology requires that a high-bandwidth memory device be embedded in the RSE, such that a large plurality of cells (or words) can be simultaneously accessed.

External memory devices would appear to be fundamentally inappropriate for the RSE technology. The bandwidth, which is given by the product of the device operating frequency and the number of bits retrieved per read access, specifies the bit rate transferred between an external memory device and the RSE, and must be large enough to meet the requirements of the lookup rate.

The use of an external memory with an Associative Search Engine is known, particularly in algorithmic implementations. The utilization of an external memory with a CAM-based ASE is also known. However, given the requisite lookup rates in data packet classification and forwarding applications, these technologies are bandwidth limited. Moreover, the requisite lookup rates have been steadily increasing, such that in the future, the bandwidth limitations will be even more acute.

It must be emphasized that these bandwidth limitations exist even when the relatively sophisticated and expensive Static Random Access Memories (SRAMs) are used as external memory. While Dynamic Random Access Memories (DRAMs) are typically much less inexpensive and consume significantly less power than SRAMs, DRAMs are much slower than SRAMs and require a refresh interval between consecutive accesses. These drawbacks, along with the relatively small number of bits that can be retrieved per access, limit the use of external DRAMS to low lookup rates.

There is therefore a recognized need for, and it would be highly advantageous to have, an Associative Search Engine that achieves high lookup rates and, at the same time, enables an increased storage capacity using an external memory. It would be of further advantage to have an ASE that is more economical than ASEs known heretofore, and more particularly, to have an ASE that utilizes standard, inexpensive external memory components having characteristically low energy consumption.

SUMMARY OF THE INVENTION

The present invention discloses an ASE including a Search Engine Manager (SEM) with internal Control & Processing Logic and DRAM Control & Interfaces connected to external DRAMs that provide scalable, extremely high storage capacity. Efficient storage schemes and search procedures enable high-rate lookups in the external DRAMs.

The present invention is a method and device for storing key entries and associative data and performing fast search operations in one or more storage devices. Although the storage and search methods disclosed are advantageously used in conjunction with DRAMs, these methods are equally applicable to Static RAMs and to compound DRAMs, each containing a set of memory banks that can be sequentially accessed. These methods can also apply to partitioned storage devices, where each partition operates as a separate memory device. The disclosed methods can also be applied to various other storage devices, such as ROMs, EPROMs, $E^2ROMs$, flash-based storage devices, optical storage devices, CCD, magnetic devices, etc.

DRAMs are typically much cheaper and consume significantly less power than SRAMs. However, they have important drawbacks; they are much slower and require a refresh interval between consecutive accesses. These drawbacks and the relatively small number of bits that can be retrieved per access, limit the use of external DRAMs to low lookup rates. The sophisticated storage and search methods disclosed herein speed up significantly the key search operations to achieve viable lookup rates. These methods reduce the number of access times needed to read the key entries in a DRAM row and allow the use of higher frequencies or the parallel operation of several devices at a lower frequency.

According to the teachings of the present invention there is provided an associative search engine (ASE) for data storage and retrieval, including: (a) a search engine manager (SEM), disposed within a chip, the search engine manager including: (i) processing logic; (b) an external memory, disposed outside of the chip, the memory including: (i) at least a first array for storing a plurality of range boundary information; (c) at least a second array for storing a plurality of associated data entries, the data entries being associated with the range boundary information, wherein the processing logic is designed and configured to search, in response to an input key, the range boundary information, so as to determine if the input key falls within a range associated with a particular range boundary information of the range boundary information.

According to further features in the described preferred embodiments, the search engine manager has an internal memory disposed within the chip.

According to still further features in the described preferred embodiments, the range is represented by a single boundary value.

According to still further features in the described preferred embodiments, the external memory includes at least one random access memory (RAM).

According to still further features in the described preferred embodiments, the system further includes (d) an interface for interfacing between the external memory and the SEM.

According to still further features in the described preferred embodiments, the interface includes at least one control & data bus (CDB).

According to still further features in the described preferred embodiments, the second array having a plurality of rows and a plurality of columns.

According to still further features in the described preferred embodiments, the second array is disposed in the external memory.

According to still further features in the described preferred embodiments, the associative search engine of claim 1, further includes: (d) a memory for storing range validity information for each of the range boundary information.

According to still further features in the described preferred embodiments, the memory for storing range validity information is disposed within the external memory.

According to another aspect of the present invention there is provided an ASE for data storage and data retrieval, including: (a) a SEM, disposed within a chip, including: (i) processing logic; (b) an external memory system, disposed outside of the chip, including: (i) a plurality of memory storage units, each memory storage unit having at least a first array for storing a plurality of key entries; (c) at least a second array for storing a plurality of associated data entries, the data entries being associated with the key entries, and (d) an interface for data interfacing between the external memory system and the SEM, wherein the processing logic is designed and configured to search within each of the memory storage units, in response to an input key, so as to determine if the input key matches a particular key entry, and wherein the key entries are stored in the memory storage units as logical TDAs arranged for a search tree having a plurality of levels, so as to provide an increased rate of the data retrieval from the external memory system to the processing logic.

According to yet another aspect of the present invention there is provided a method for processing data using an associative search engine having an external memory and for extracting the data from the external memory in response to an input key, the method including the steps of: (a) providing the ASE, the ASE having: (i) a SEM, disposed within a chip, the search engine manager including processing logic; (b) providing, for the ASE, an external memory system disposed outside of the chip, the external memory system including: (i) a plurality of memory storage units, each memory storage unit having at least a first array for storing a plurality of key entries; (c) providing a memory for storing a plurality of associated data entries, the data entries being associated with the key entries; (d) providing an interface for data interfacing between the external memory system and the SEM; (e) arranging the key entries as logical TDAs, so as to increase a rate of data retrieval from the external memory system to the processing logic, and (f) searching the key entries, in response to the input key, so as to determine if the input key matches a particular key entry.

According to further features in the described preferred embodiments, the key entries are arranged within the memory storage units so as to enable a pipelined searching, wherein a search for the input key is initiated by the processing logic before a search for a previous input key has been completed.

According to still further features in the described preferred embodiments, the key entries are arranged within the memory storage units such that at least one of the memory storage units contains solely one solitary level.

According to still further features in the described preferred embodiments, the key entries are arranged within the memory storage units such that the one solitary level is a singular solitary level.

According to still further features in the described preferred embodiments, the key entries are further arranged within the memory storage units such that all of the memory storage units contain solely one solitary level of the plurality of levels.

According to still further features in the described preferred embodiments, all of the memory storage units contain solely one solitary level of the plurality of levels, the key entries being further arranged such that a particular level is stored entirely in a single memory storage unit.

According to still further features in the described preferred embodiments, each particular level of the levels is stored entirely in a single respective memory storage unit.

According to still further features in the described preferred embodiments, the key entries are arranged such that at least a portion of the memory storage units have at least one duplicated level.

According to still further features in the described preferred embodiments, the key entries are arranged such that all of the memory storage units have at least one duplicated level.

According to still further features in the described preferred embodiments, the duplicated level is disposed within the additional memory storage unit so as to reduce a memory space requirement within the memory storage units.

According to still further features in the described preferred embodiments, the duplicated level is disposed within the additional memory storage unit so as to reduce a requisite number of rows within the memory storage units.

According to still further features in the described preferred embodiments, the key entries are arranged such that at least a portion of the memory storage units have at least one duplicated level.

According to still further features in the described preferred embodiments, the duplicated level is disposed within the additional memory storage unit so as to reduce a requisite number of rows within the memory storage units.

According to still further features in the described preferred embodiments, the external memory system includes at least one random access memory (RAM).

According to still further features in the described preferred embodiments, the at least one RAM includes at least one dynamic random access memory (DRAM).

According to still further features in the described preferred embodiments, the at least one RAM includes at least one partitioned random access memory.

According to still further features in the described preferred embodiments, the at least one DRAM includes a plurality of memory banks.

According to still further features in the described preferred embodiments, the processing logic is designed and configured to store the key entries in monotonic order within at least one memory storage unit of the memory storage units.

According to still further features in the described preferred embodiments, at least two of the memory storage units have overlapping spans.

According to still further features in the described preferred embodiments, the associative search engine further includes: (e) a register for storing row-identifying key entries.

According to still further features in the described preferred embodiments, the second array is disposed in the external memory.

According to still further features in the described preferred embodiments, the register is a column register.

According to still further features in the described preferred embodiments, the register is divided into a plurality of hierarchical blocks.

According to still further features in the described preferred embodiments, the external memory system includes at least one random access memory (RAM).

According to still further features in the described preferred embodiments, at least one step of the searching of the key entries is performed in the plurality of memory storage units within a single clock cycle.

According to still further features in the described preferred embodiments, the method further includes the step of: (g) storing a key entry from each row of the TDAs in a column register to produce an array of row-identifying key entries.

According to still further features in the described preferred embodiments, the method further includes the step of: (g) storing a row-identifying key entry associated with a particular row of the TDAs, so as to produce an array of row-identifying key entries.

According to still further features in the described preferred embodiments, the method further includes the step of: (g) storing, in a column register, a row-identifying key entry associated with a particular row of the TDAs, so as to produce an array of row-identifying key entries.

According to still further features in the described preferred embodiments, the method further includes the step of: (h) searching the array containing the row-identifying key entries to determine a particular row within the TDAs that potentially contains a matching key entry that matches the input key.

According to still further features in the described preferred embodiments, the method further includes the step of: (i) searching the particular row that potentially contains the matching key entry.

According to still further features in the described preferred embodiments, each TDA represents a level of a B-tree.

According to still further features in the described preferred embodiments, the array of row-identifying key entries is partitioned into k hierarchical blocks according to a numerical system of base B, wherein $k \geq 2$ and $B \geq 2$.

According to still further features in the described preferred embodiments, the plurality of key entries stored in the at least a first array contains range boundary information.

According to still further features in the described preferred embodiments, the key entries are arranged in monotonic order within the memory storage units.

According to still further features in the described preferred embodiments, the searching is a pipelined searching, such that a search for the input key is initiated by the processing logic before a search for a previous input key has been completed.

According to still further features in the described preferred embodiments, the arranging of the key entries in logical TDAs is performed so as to enable the pipelined searching.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the Drawings:

FIG. 6 shows an example of 72 words arranged in 3 DRAMs having 6 columns and 4 rows of words for an efficient linear search procedure;

FIG. 7 shows an example of the same arrangement depicted in FIG. 6, but using decimal numbers as key entries;

FIG. 8 shows an example of a storage arrangement of 15 words per extended row of 4 TDAs for a binary search procedure;

FIG. 9 illustrates the binary search process for the specific storage arrangement shown in FIG. 8;

FIG. 10 shows an example with numerical key entries stored in 4 TDAs with 15 words per extended row for an efficient binary search procedure;

FIG. 12 shows an example of a variant of the binary search procedure (depicted in FIG. 9) denoted herein as "Binary-Linear Search";

FIG. 13 shows an example of a storage arrangement in 3 DRAMs of 14 words per extended row for an efficient binary search procedure;

FIG. 14 illustrates the binary search process for the specific storage arrangement shown in FIG. 13;

FIG. 15 shows an example with numerical key entries stored in 3 TDAs with 14 words per extended row for an efficient binary search procedure;

FIG. 18 shows an example of a storage arrangement in 3 TDAs of 11 words per extended row for an efficient "Ternary-Binary Search" procedure;

FIG. 19 illustrates the Ternary-Binary search process for the specific storage arrangement shown in FIG. 18;

FIG. 20 shows an example with numerical key entries stored in 3 TDAs with 11 words per extended row for an efficient Ternary-Binary search procedure;

FIG. 24 shows an example with numerical key entries stored in 3 TDAs with 22 words per extended row for an efficient Ternary-Binary search procedure;

DESCRIPTION OF THE PREFERRED EMBODIMENTS

Figure 1:
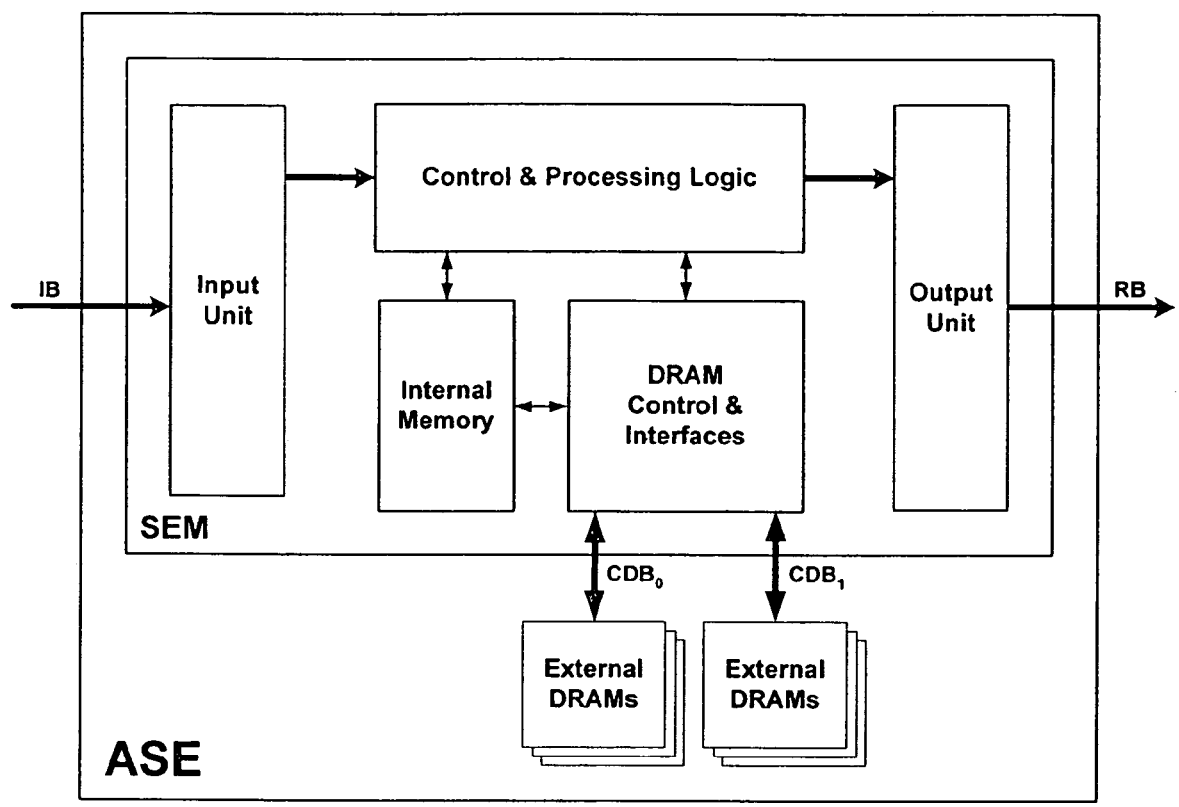
FIG. 1 shows an Associative Search Engine (ASE) including a Search Engine Manager (SEM) with internal Control & Processing Logic and DRAM Control & Interfaces connected via two Control & Data Busses ($CDB_0$ and $CDB_1$) to two sets of external DRAMs, according to the present invention.

The present invention is a method and device for storing associative data and performing fast search operations in one or more storage devices. Although the storage and search methods disclosed can be applied to various storage devices, they are preferably used in conjunction with Dynamic RAMs, each containing a set of memory banks that can be sequentially accessed.

The principles and operation of the method and device according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The storage and search methods disclosed refer in particular to DRAMs, but can also be applied to SRAMs and other storage devices. DRAMs are slower than SRAMs, but consume significantly less power and can be used to achieve higher density and larger storage capacity. The disclosed methods are preferably applied to compound DRAMs, each containing a set of memory banks that can be sequentially accessed.

The DRAMs are controlled by Control Logic, which can be located inside or outside the SEM. The DRAMs are connected to the SEM via one or more Control & Data Busses (CDBs). FIG. 1 shows an ASE having a SEM with internal Control & Processing Logic and DRAM Control & Interfaces connected via two CDBs ($CDB_0$ and $CDB_1$) to two sets of external DRAMs. These memories enhance the ASE storage capabilities to provide a scalable classification solution for building information bases of any size, to include any number of rules, any number of fields and any field widths. Several busses, each connected to one or more external memories, can be used in parallel to increase the forwarding and classification rate.

One specific embodiment of an ASE is the Range Search Engine (RSE) developed by HyWire Ltd., which is used for searching Multi-Dimensional Keys in Multi-Dimensional Ranges. In the present invention, the search engine can operate in conjunction with external memories having various RAM-Based CAM configurations, configurations that are disclosed in several co-pending U.S. Patent Applications assigned to HyWire Ltd. These RAM-Based CAM configurations include RAM-Based Binary CAM, used for processing binary integers (single-value integers), which is disclosed in U.S. patent application Ser. No. 10/229,054. RAM-Based RCAM, used for range integers (integers within a range of values), is disclosed in U.S. patent application Ser. No. 10/229,065. Two improved RCAM implementations can also be used with external memories, as taught in the instant invention. The first, denoted as Multi-Module RCAM, and disclosed in U.S. patent application Ser. No. 10/040,389, allows interconnection of multiple RAM-Based RCAM modules into a single Multi-Module device. The second, Multi-RAM RCAM (U.S. patent application Ser. No. 10/206,189), utilizes a group of RAMs in a single device. Moreover, several Multi-RAM RCAM devices can be integrated in Multi-Modules to form Multi-Modules of Multi-RAMs.

According to the present invention, all of the above RAM-Based CAM configurations can be used in conjunction with external memories for searching Multi-Dimensional Keys in Multi-Dimensional Ranges, so as to achieve high-performance packet classification and forwarding, as described in a co-pending U.S. patent application (Ser. No. 10/315,006) entitled "Multi-Dimensional Associative Search Engine", assigned to HyWire Ltd. All of the above-referenced applications (i.e., U.S. patent application Ser. Nos. 10/040,389, 10/206,189, 10/229,054, 10/229,065, and 10/315,006), as well as the priority documents of these applications, are incorporated by reference for all purposes as if fully set forth herein.

According to the present invention, and as will be developed in greater detail hereinbelow, the external memories can be used to store single integer keys (for Exact Search) and their associated data entries in a RAM-Based Binary CAM, or, more commonly, range key entries (representing range boundaries for Range Search), and also their associated data and associated boundary type entries (which determine the validity of the corresponding ranges) in a RAM-Based RCAM. The associated boundary type entries can be stored with the associated data entries, with the key entries or in a separate array. Any of these two cases can be implemented by storing the key entries, associated data entries and associated boundary type entries (for RAM-Based RCAM) in external memories, whereas the Search Logic, including the First Column Register, the Row Locator and Column Locator, reside in the SEM.

The use of external memories can be further implemented in Multi-RAM Binary CAM or RCAM configuration (U.S. patent application Ser. No. 10/206,189). The Multi-RAM CAM includes an ordered group of RAMs, which can be regarded as an "extended RAM" The entries of the multiple RAMs are arranged in an integrated manner, in ascending or descending order along "extended rows" or "extended columns". If arranged along extended rows, the first (lowest) entry of each extended row can be stored in a First Column Register, denoted as FC-Register.

The Multi-RAM Binary CAM or RCAM configuration can be implemented by storing the FC-Register and the required Search Logic components in the SEM, whereas external Multi-RAMs store all the key entries and the associated data entries (with the associated boundary type entries in a Multi-RAM RCAM). This configuration reduces significantly the storage space in the SEM, while still allowing the identification of a specific row of a RAM or Multi-RAM using a Row Locator on the FC-Register. On the other hand, it requires that the entries of the FC-Register and the external multiple RAMs be arranged in monotonic (ascending or descending) order. However, if the key entries of the FC-Register are assigned corresponding Row Index entries that serve as pointers to specific rows in the external Multi-RAMs, then the monotonic order of the key entries is not required throughout the external Multi-RAMs but only within their individual rows. This arrangement allows added flexibility in the storage of data, wherein new key entries and their associated data entries can be stored in new rows and the monotonic order is not kept throughout the entire database but only within the individual rows.

The Multi-RAM CAM configuration can also be implemented by storing the FC-Register in TCAMs within an ASE and the key entries in external Multi-RAMs, but this design is highly inefficient. A more efficient configuration can be achieved by associating the key entries stored in the TCAMs with Row Index entries within the ASE; in this configuration, the Row Index entries associated with the key entries in the TCAMs point to specific rows or columns in external Multi-RAMs.

In the key search operations performed in the RAM-Based CAMs and Multi-RAM CAM configurations covered in all the above patents, it was assumed that once a specific row of a RAM or Multi-RAM is identified in the FC-Register, the entire row can be read out and all the key entries listed in the row can be simultaneously compared with the searched key using one or several Column Locators to identify the specific cell that contains the matching key. This may hold for SRAMs or other fast memory devices embedded in the SEM, where many cells (or many words) can be simultaneously accessed; however, this is not the case with external memory devices. The number of bits per second that can be retrieved from external DRAMs, SRAMs or other memory devices (denoted herein as "bandwidth") is given by the product of the device operating frequency and the number of bits retrieved per read access. The bandwidth specifies the bit rate transferred between the external memory devices and the SEM, and must be large enough to meet the requirements of the lookup rate.

DRAMs are typically much cheaper and consume significantly less power than SRAMs. However, DRAMs have important drawbacks: they are much slower and require a refresh interval between consecutive accesses. These drawbacks, along with the relatively small number of bits that can be retrieved per access, have, until now, limited the use of external DRAMs to low lookup rates.

The sophisticated storage and search methods disclosed herein speed up significantly the key search operations to achieve viable lookup rates. The search methods described below are Linear, Binary and B-Tree; however, any other search tree, balanced or unbalanced (preferably balanced) can be used. These methods reduce the number of access times needed to read the key entries in a DRAM row and allow the use of higher frequencies or the parallel operation of several devices at a lower frequency.

The FC-Register can be partitioned in hierarchical blocks according to a numerical system of base B, yielding a Multi-Hierarchy architecture for storing the FC-Register entries. In general, when the first column is large, several hierarchies can be used. The first column can be partitioned in k hierarchical blocks, a $B^{k-1}$ Register and (k−1) RAMs, $B^{k-2}$ RAM to $B^0$ RAM. The storage space in the SEM can be reduced by storing in it part of the hierarchical blocks or only the highest-hierarchy block of the FC-Register, while locating all the other hierarchical blocks along with the Multi-RAMs in the external DRAMs. Then, the search methods disclosed herein can be used to sequentially search the hierarchical blocks and the Multi-RAMs located in the external DRAMs.

Storage and Search Methods

The storage and search methods of the present invention are preferably implemented by storing the key entries and associated data (AD) entries in external DRAMs (or other memory devices) and housing the Search Logic in a SEM within an ASE (such as an RSE, Binary CAM, Ternary CAM or algorithmic search engine). This Search Logic must include means for locating the specific rows in the set of external DRAMs that may contain the matching key. In particular, a SEM includes a First Column Register (FC-Register), a Row Locator and a Column Locator. The FC-Register holds a list of key entries that are compared with the searched key using the Row Locator to identify the specific row in the external DRAMs that may contain the matching key.

In general, to perform an efficient key search in any specific method, it is necessary to arrange the key entries in the memory in a suitable pattern that minimizes the number of accesses to the memory and enable faster throughput. This invention discloses three search methods and the corresponding storage methods.

Linear Search

Binary Search

B-Tree Search

The storage and search methods disclosed can be used for any type of RAMs and other memory devices, but are particularly suited for multiple-DRAM implementation, because they take into account the DRAM drawbacks of slow throughput (due to long read/write cycles) and simultaneous access limited to a relatively small number of 1-bit cells in a row. The disclosed methods also apply for DRAMs composed of blocks that can be sequentially accessed after a short delay between blocks.

Physically, the database entries are arranged in a G-DRAM, which is a set of G slow DRAMs; each DRAM has M columns and N rows of w-bit words, but allows simultaneous access to a limited number b of 1-bit cells in a row (consisting of M w-bit words); thus, all the words of one DRAM row can only be accessed in n=M·w/b cycles.

The logic structure of the database is based only a set of G Two-Dimensional Arrays (TDAs) corresponding to the G DRAMs, where each TDA contains the same total number of M·N w-bit words as the corresponding DRAM, but has a number of b=M·w/n 1-bit cells (or equivalently m=b/w=M/n w-bit words) per row and N·n rows. This logic structure, using the set of TDAs as just defined, rather than the physical structure with DRAMs, will be extensively used below to describe the disclosed storage and search methods.

The logic structure is designed so that m=b/w (number of words per group of b cells) is a simple rational number, such as 4, 3, 2, 3/2, 4/3, etc., or their inverse values 1/4, 1/3, 1/2, 2/3, 3/4, etc. In a preferable configuration, b is equal to w or a multiple of w; then each TDA stores one or more complete words. Otherwise, some words are split between different TDAs. For example, if b=w/4, then each word is split between 4 TDAs; if b=w·3/4, then 3 words are split between 4 TDAs.

The search methods disclosed can be suitably implemented with a Column Locator capable of simultaneously comparing m=b/w words (formed by b 1-bit entries) listed in the TDA row with the searched key to identify the specific word that matches the key in a single step. This Column Locator allows the performance of sequential searches, one per TDA row. Since the search methods disclosed involve several steps that increase the search latency, pipelined searches can be simultaneously performed using a number of Column Locators, the number of which depends on the number of steps involved. It is assumed that the groups of m words in the same rows of different TDAs can be accessed simultaneously or quasi-simultaneously (with a small delay between sequential reads, e.g., within a clock cycle). If b is not a multiple of w, then m is not an integer, and some words are split between different TDAs, hence, a suitable array of Column Locators, tailored to the specific value of m, must be used to perform sequential or pipelined searches.

Each database entry or word may contain a Key entry, or an Associated Data (AD) entry, or both entries integrated in one word, depending on the selected storage and search method. Each of these types of entries has a different meaning and a different length, resulting in varied numbers of words in the TDA row. If an AD entry is contained in separate word from the corresponding Key entry, it may be stored in the same DRAM or in a different DRAM; in any case, the AD entry location is uniquely designated by the corresponding Key entry. If a DRAM contains Key entries of different lengths, then they are arranged in separate rows of the corresponding TDA.

The entire database contains G·M·N words arranged in N·n "extended rows" of G·m words per extended row. These G·m words can be accessed simultaneously (or quasi-simultaneously). The FC-Register residing in the SEM holds a list of the N·n Key entries of the first column of the first TDA; these entries may be redundantly included in the TDA, but are preferably omitted to save storage space. The FC-Register entries are compared with the searched key in a single step using the Row Locator to identify the specific extended row in the set of G TDAs that may contain the matching key.

If the database grows by addition of new words, two storage alternatives may be implemented. The first option is the addition of new DRAMs logically arranged in new TDAs. In this case, each extended row grows and more words can be accessed simultaneously (or quasi-simultaneously), but the length of the extended column and of the FC-Register remains unchanged, such that no extra SEM storage capacity is required. The addition of TDAs must take into account the limitations of the Control & Data Busses (CDBs) that connect the DRAMs to the SEM. Additional CDBs may be required to transfer the increased data between the DRAMs and the SEM. The second option applies when the TDAs are not full, so that the new words can be added in unused rows in the existing TDAs; then, more entries are added in the FC-Register, requiring larger SEM storage capacity. However, the length of the extended rows and the number of words that can be accessed simultaneously (or quasi-simultaneously) remain unchanged.

Linear Search

The term "Linear Search", as used herein in the specification and in the claims section that follows, refers to the sequential search of key entries arranged in monotonic (ascending or descending) order along rows or columns. Typically, these rows or columns are successive rows or columns. While the present invention applies to any of these alternatives, for the sake of simplicity and consistency, the presentation hereinbelow uses a single convention in which key entries are stored and searched in ascending order along successive rows.

If an entire row of a RAM can be read out, such that all the key entries listed in a row can be simultaneously compared with the searched key, then it is suitable to arrange the key entries in ascending order throughout the entire rows of the RAM, as in the RAM-Based Binary CAM and RCAM, and throughout "extended rows" of multiple RAMs, as in Multi-RAM Binary CAM and RCAM, as disclosed in the above-referenced, co-pending applications assigned to HyWire Ltd.

Consider now a G-DRAM, which is a set of G DRAMs, each having M columns and N rows of w-bit words, but allowing simultaneous access to only b 1-bit cells or m=b/w words in a row. In this case, the arrangement of the entries of the multiple DRAMs in an integrated manner, in ascending order along extended rows, is not efficient, because the M words of one DRAM row can only be read out in n=M·w/b=M/m cycles, and the G·M words of an extended row of this set of DRAMs requires G·n read cycles.

To improve the access to the G-DRAM entries, the key entries are preferably arranged in a logical structure in G TDAs corresponding to the G DRAMs, where each TDA contains the same total number of M·N w-bit words as the corresponding DRAM, but has a number of b 1-bit cells (or equivalently m=b/w=M/n w-bit words) per row and N·n rows. In this arrangement, the M words in each row of each DRAM are divided in n groups of b 1-bit entries or m contiguous words. The first group of m words listed in the first DRAM row is stored in the entire first row of the corresponding TDA, the next m words are stored in the second row of the TDA, and so on, up to the n-th group of m words in the first DRAM row, which is stored in the n-th TDA row.

Since groups of m words in different physical G DRAMs (or in corresponding G TDAs) can be accessed simultaneously (or quasi-simultaneously), one efficient arrangement is a linear ordering of the G TDAs as an "extended TDA", so that the entries of the multiple TDAs are stored in ascending order along "extended rows". The first group of m contiguous words is stored in the first row of the first TDA (TDA # 0), the next m contiguous words in the first row of the second TDA (TDA # 1), and so on, up to the G-th group of m contiguous words, which is stored in the first row of the G-th TDA (TDA # G−1). The following G groups of m contiguous words are stored in the second rows of the G TDAs, and so on.

In this way, G·m contiguous words can be read out in groups of m words per cycle from G linearly arranged TDAs, and searched sequentially by one Column Locator or in pipelined operation by G Column Locators. Assuming that the G TDAs can be simultaneously accessed, all the entries in the extended row of the set of TDAs can be read out in n cycles. The latency is determined mainly by the DRAM read-out cycle.

It must be emphasized that if b is not a multiple of w, such that m is not an integer, and some words are split between different TDAs, a suitable array of Column Locators must be used to perform sequential or pipelined searches.

As mentioned before, the FC-Register residing in the SEM holds the N·n words of the first column of the first TDA (TDA # 0). The total number of words in the database (database capacity) stored in the DRAMs is G·M·N. Thus, the ratio of the database capacity to number of words in the FC-Register is equal to $$G \cdot M \cdot N / N \cdot n = G \cdot m,$$

which is the fixed number of words in an extended TDA row.

Figure 2:
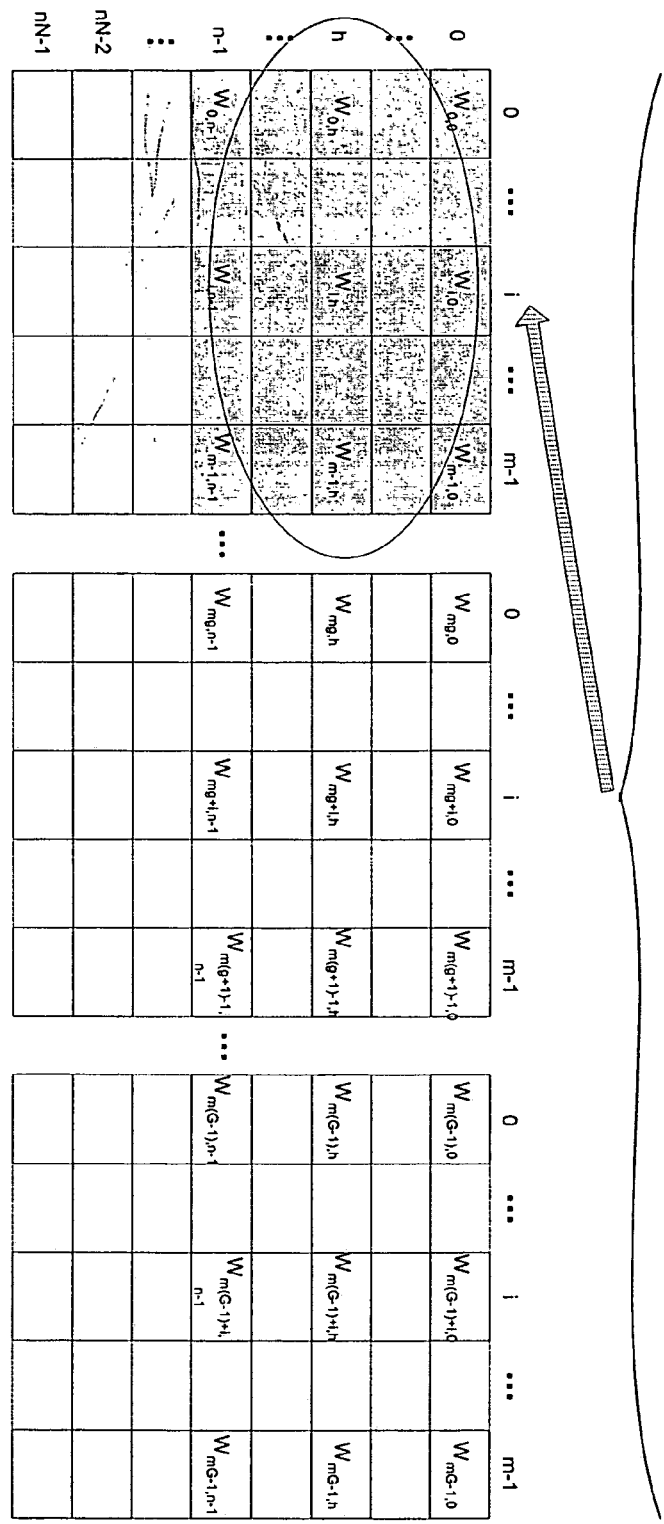
FIG. 2 shows the process of storing the M words of the first row in the first DRAM (DRAM # 0) in n rows of the first two-dimensional array (TDA # 0) so as to enable an efficient linear search procedure.

FIG. 2 shows the process of storing the M words of the first row in the first DRAM (DRAM # 0) in n rows of the first TDA (TDA # 0). To obtain the logic arrangement, the M words of the first row are divided in n=M/m groups of m words in DRAM # 0, ranging from $W_{0,h}$ to $W_{m-1,h}$ ($0 \leq h \leq n-1$), and are arranged in n rows (0 to n−1) in TDA # 0. The same logic arrangement is performed with the M words of the first row in the second DRAM (DRAM # 1), which are divided in n groups of m words ranging from $W_{m,h}$ to $W_{2m-1,h}$ ($0 \leq h \leq n-1$), and are stored in n different rows of the corresponding TDA # 1. This logic arrangement holds for all the G TDAs, where the n groups of m words of the first row of any specific DRAM # g ($0 \leq g \leq G-1$) range from $W_{mg,h}$ to $W_{m(g+1)-1,h}$ ($0 \leq h \leq n-1$), and are stored in n rows (0 to n−1) of the corresponding TDA # g.

The M words in the second row of DRAM # 0 are similarly divided in n groups of m words, ranging from $W_{0,h}$ to $W_{m-1,h}$ ($n \leq h \leq 2n-1$), and then are arranged in n different rows (numbered n to 2n−1) in TDA # 0. The M words in the second row of any DRAM # g ($0 \leq g \leq G-1$) are logically arranged in a similar way in n groups of m words and stored in rows n to 2n−1 of the corresponding TDA # g. The words in the other rows of all the G DRAMs are logically arranged following the same procedure.

Figure 3:
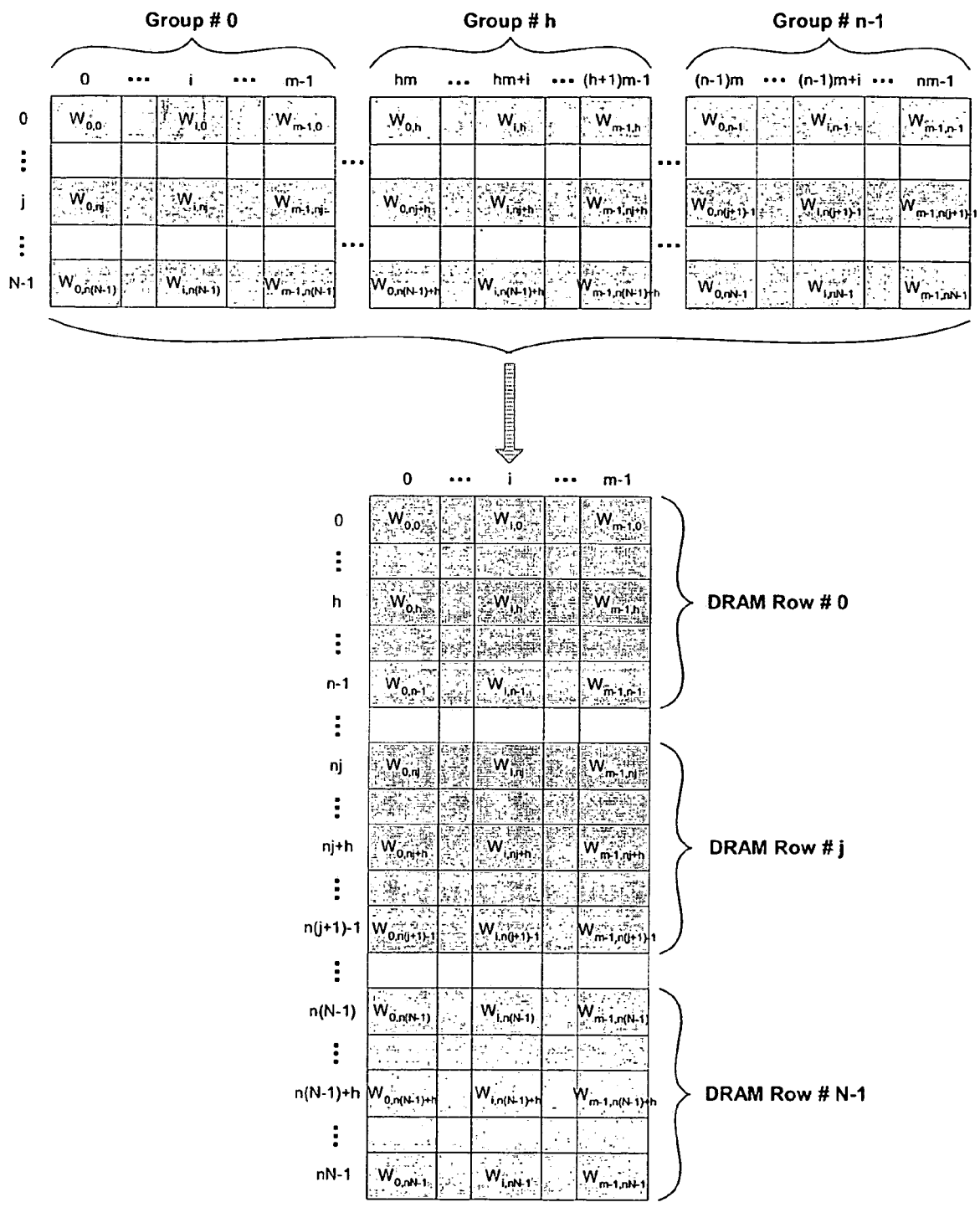
FIG. 3 shows the process of storing the M·N words of the first DRAM (DRAM # 0) in n·N rows and m columns of the first TDA (TDA # 0)
Figure 4:
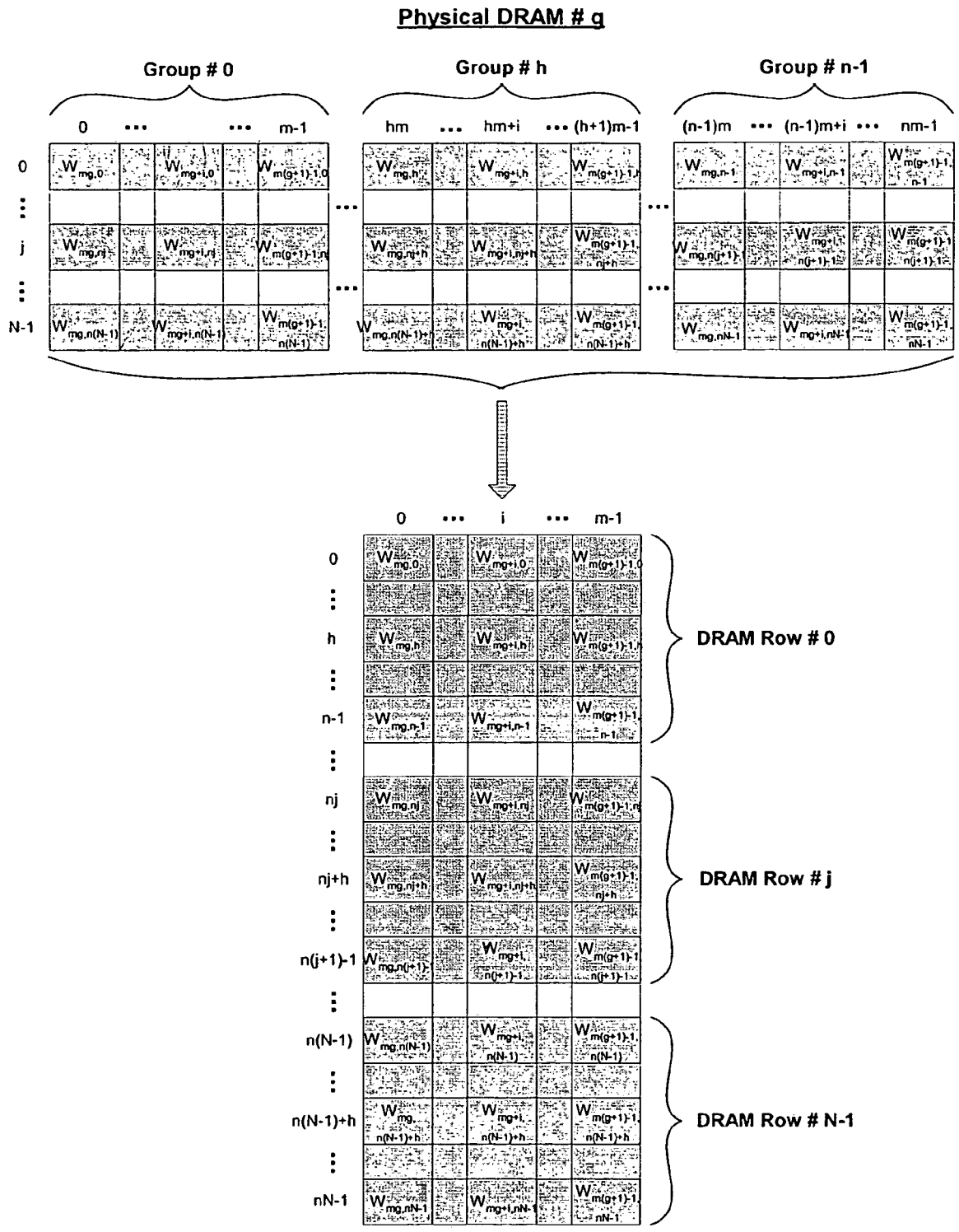
FIG. 4 shows the process of storing the M·N words of a generic DRAM (DRAM # g) in n·N rows and m columns of a generic TDA (TDA # g)
Figure 5:
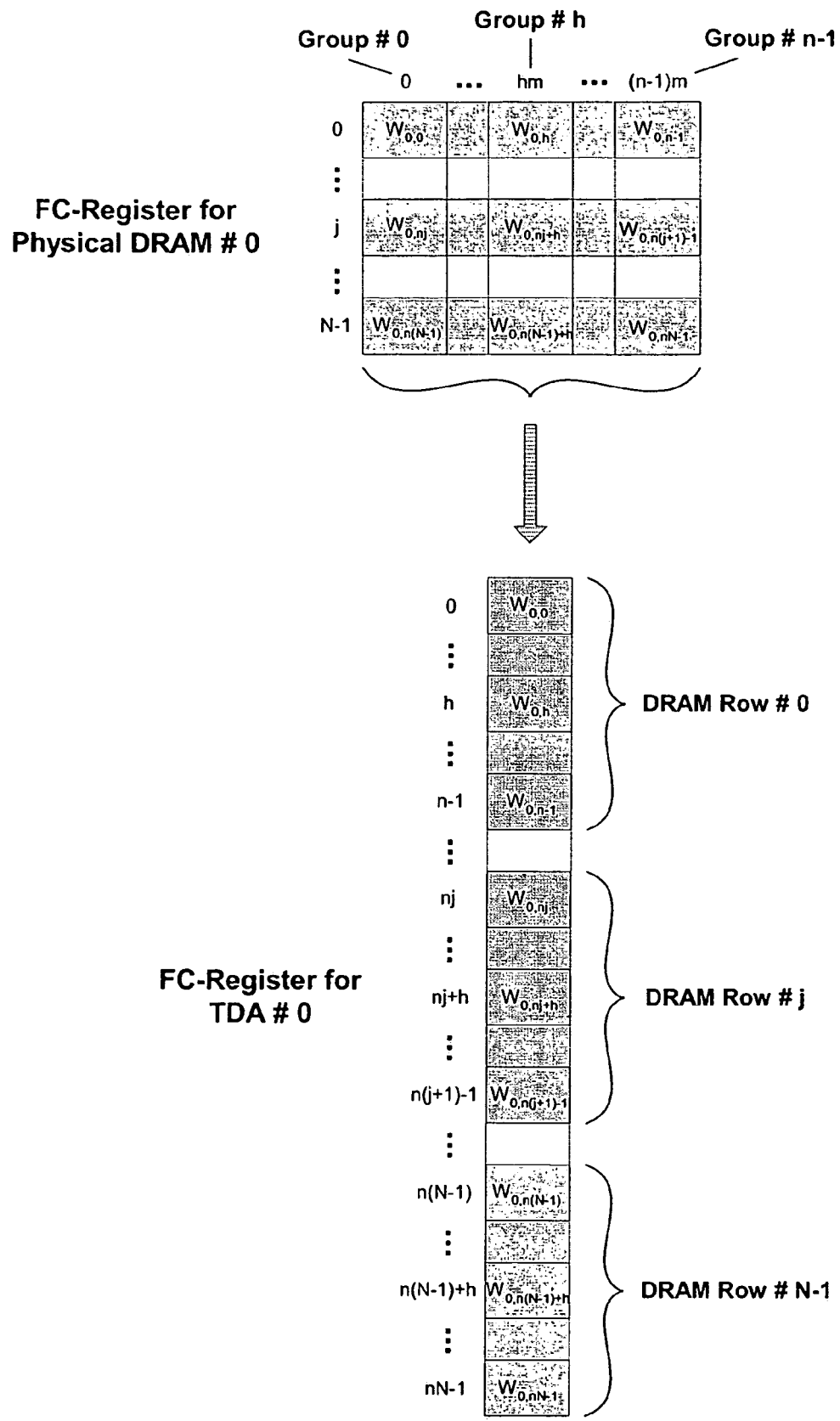
FIG. 5 depicts the FC-Register holding the N·n words of the first column of the first TDA (TDA # 0) and an alternative equivalent arrangement of the First Column (FC)-Register for DRAM # 0.

FIG. 3 shows the process of storing the M·N words of the first DRAM (DRAM # 0) in n·N rows and m columns of the first TDA (TDA # 0). FIG. 4 shows the same process for a generic DRAM (DRAM # g) and a generic TDA (TDA # g). FIG. 5 depicts the FC-Register holding the N·n words of the first column of the first TDA (TDA # 0) and an alternative, equivalent arrangement of the FC-Register for DRAM # 0.

Figure 6:
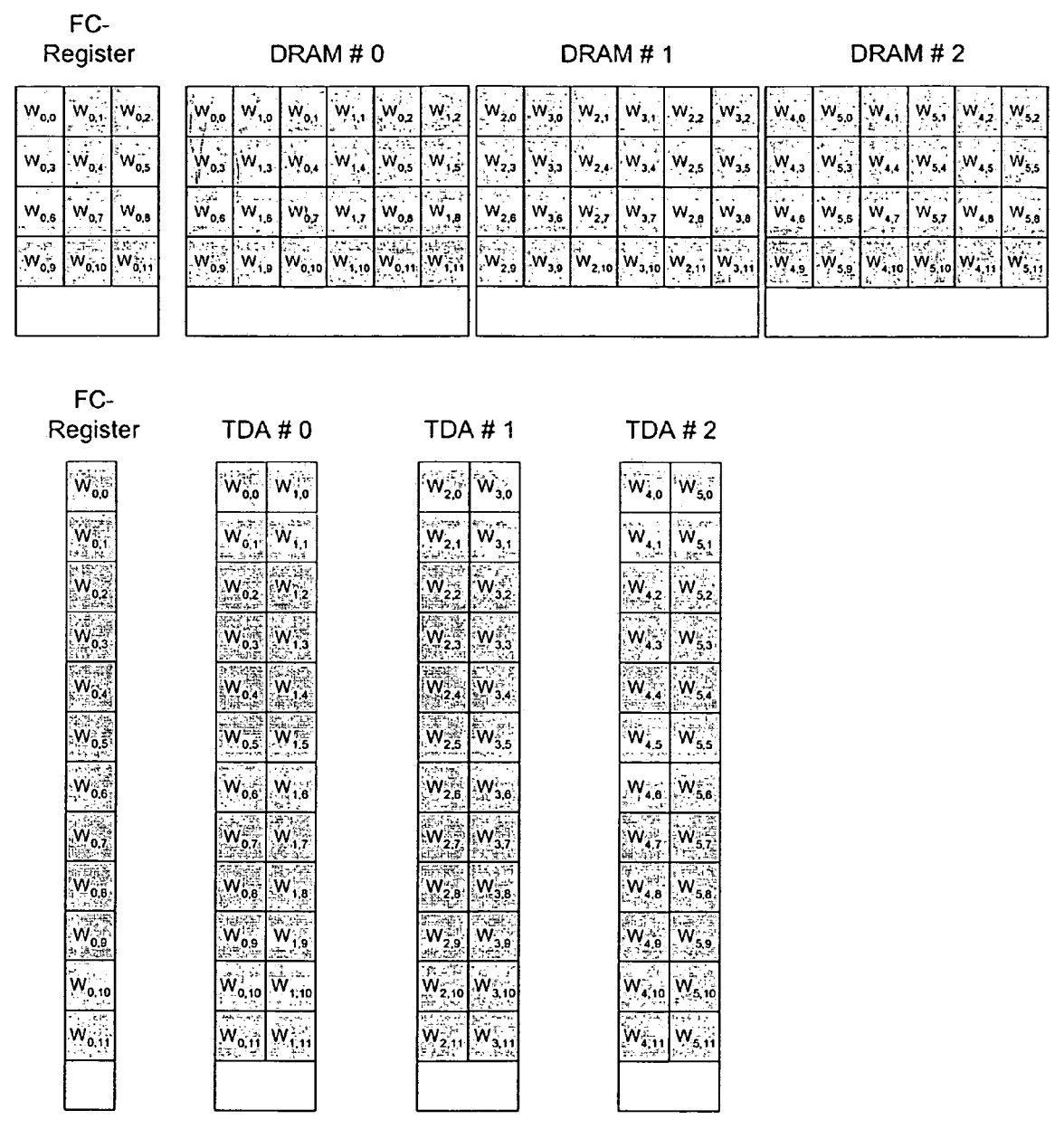

FIG. 6 shows an example of 72 words arranged in G=3 DRAMs with M=6 columns and N=4 rows of words. It is assumed, by way of example, that the 3 DRAMs can be simultaneously accessed, but only m=2 words can be read from DRAM row in one cycle, such that the DRAM row can only be read out in n=6/2=3 cycles. The figure also depicts the logic arrangement of the words in 3 TDAs, corresponding to the 3 DRAMs, where each TDA contains the same total number of 24 words as the corresponding DRAM, but has 2 contiguous words per row and 4×6/2=12 rows.

Figure 7:
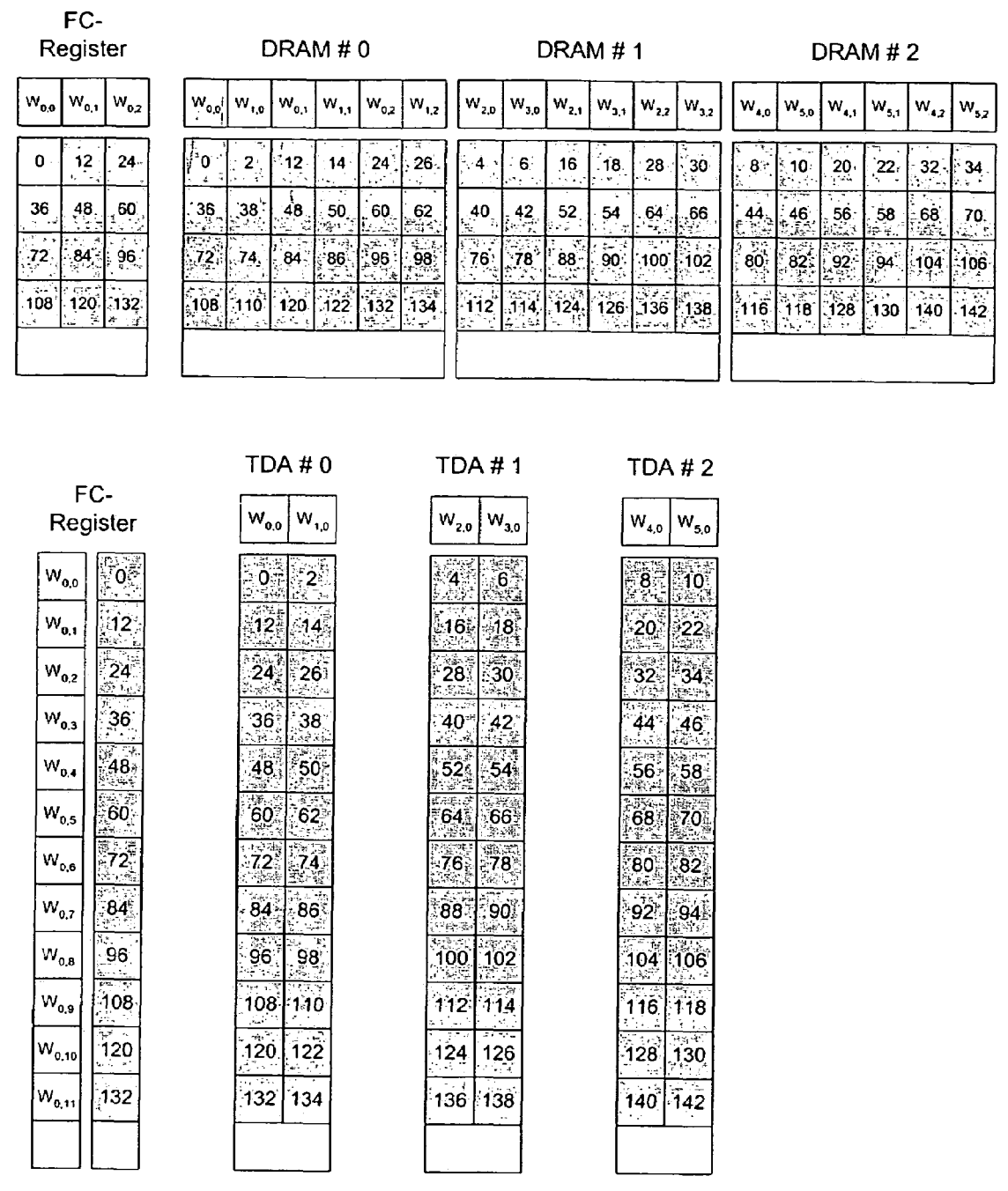

FIG. 7 shows an example of the same arrangement depicted in FIG. 6, using decimal numbers as key entries. The logic arrangement of the 3 TDAs in "extended rows" having contiguous words allows simultaneous access to the 2×3=6 words in these "extended rows" in one cycle, and to the 18 words in the "extended row" of the 3 DRAMs in 3 cycles. This logic arrangement allows a faster search than a linear arrangement along "extended rows" of the 3 physical DRAMs, which would require 9 cycles to access these 18 words. The FC-Register is shown in two alternative configurations that match the number of rows of the DRAMs and the TDAs.

Linear Search Procedure

A sequential linear search of the submitted key in the G TDAs can be completed in two steps, the first of which being identical for Binary CAMs and RCAMs (see FIGS. 2–5).

Step 1: Identification of the key entry in the FC-Register after which the submitted key may be located; this key entry points to a specific extended row in the G TDAs.

Step 2: Sequential access to the rows of the G TDAs identified in Step 1, and identification of the key entry after which the submitted key may be located; this points to a specific key entry in TDA # g ($0 \leq g \leq G-1$). The row and column locations of this specific key entry in DRAM # g is given by row and column mapping formulas.

Step 1 is performed to locate the specific extended row in the G TDAs that may contain the submitted key. This key is compared with the key entries in the FC-Register using a suitable Row Locator. If the submitted key is contained in the G-DRAM, the submitted key must be located between two key entries in the FC-Register for TDA # 0, one smaller or equal and the other larger than the searched key; that is:

$$\text{If } W_{0,J} \leq K < W_{0,J+1} \text{ for } 0 \leq J \leq n \cdot N-1,$$

then the searched key may be contained in the J-th extended row of the G TDAs.

Step 2 is performed to locate the matching key entry in the specific row and column of a specific DRAM # g. All the key entries listed in the J-th extended row of the G TDAs are read out and compared with the searched key using a Column Locator. The location of each of these key entries in the extended row of the G DRAMs is given by row and column mapping formulas.

The extended row location index (j) in the G DRAMs corresponding to the TDA row J is given by a row mapping formula:

$$j = J \cdot \text{Div}(n) = \text{Int}[J/n],$$

wherein j is the integer part of the ratio J/n.

The location index (h) of the key entry groups in the extended row j of the G DRAMs where the searched key may be located is given by a column group mapping formula:

$$h = [J \cdot \text{Mod}(n)] = \text{Res}[J/n],$$

wherein h is the residue of the ratio J/n.

The key group index h determines G groups of in key entries in the extended row j of the G DRAMs (one group per DRAM). These groups of key entries are the same groups of key entries contained in the J-th extended row of the G TDAs. The G·m key entries are compared with the searched key using a Column Locator:

$$\text{If } W_{I,J} \leq K < W_{1+I,J},$$

wherein column index I of $W_{I,J}$ in the J-th extended row of the G TDAs is given by:

$$g \cdot m \leq I < (g+1)m, 0 \leq g \leq G-1,$$

then the searched key may be contained in the J-th row of TDA # g.

The column index i within the group with index h in TDA # g is given by:

$$i=[I \cdot \text{Mod}(m)]=\text{Res}[I/m],$$

wherein i is the residue of the ratio I/m.

The column index I of $W_{I,j}$ in the j-th row of TDA # g is given by:

$$I=h \cdot m+i$$

The column index L of $W_{L,j}$ in the j-th extended row of the G DRAMs is given by:

$$L=g \cdot M+I$$

In Binary CAMs, the submitted key is compared with the key entries in the extended row identified in step 1 in search for an Exact Match (identical values). If there is a key index (I,J) such that $K=W_{I,J}$, then the key entry $W_{I,J}$ exactly matches the searched key. In this case, the index (I,J) can be used to retrieve the Associated Data (AD) listed under the same index. If $K \neq W_{I,J}$ for all indices (I,J), then there is No Exact Match and no valid AD can be retrieved.

In RCAMs, the submitted key is compared with the key entries in the extended row searching for a Range Match (inclusion within the range). If there is a key index (I,J) such that $W_{I,J} \leq K < W_{1+I,J}$, then $W_{I,J}$ matches the defined searched range; the key index (I,J) can be used to retrieve the AD listed under the same index. If the submitted key is larger than all the key entries in the database, then the last valid key entry is the matching key. If $K < W_{I,J}$ for all indices (I,J), then there is No Match and no valid AD can be retrieved.

Examples of a Linear Search

FIGS. 6 and 7 depict a Two-Step Exact or Range Search of the submitted key 89 in the G-DRAM. The G-DRAM consists of G=3 DRAMs with M=6 columns and N=4 rows of words or key entries given by decimal numbers. It is assumed in this example that the 3 DRAMs can be simultaneously accessed, but only m=2 words can be read from DRAM row in one cycle. The figure also depicts the logic arrangement of the words in 3 TDAs, corresponding to the 3 DRAMs, where each TDA contains the same total number of 24 key entries words as the corresponding DRAM, but has 2 contiguous words per row and 4×6/2=12 rows. This logic arrangement of the 3 TDAs in "extended rows" allows simultaneous access to the 2×3=6 words in these "extended rows" in one cycle, and to the 18 words in the "extended row" of the 3 DRAMs in n=6/2=3 cycles. The FC-Register is shown in two alternative configurations that match the number of rows of the DRAMs and the TDAs.

Step 1 is performed to locate the specific extended row in the 3 TDAs that may contain the submitted key K=89. This key is compared with the key entries in the FC-Register. Since $W_{0,7}=84 \leq 89 < 96 = W_{0,8}$, the submitted key 89 is located after the key entry $W_{0,7}=84$ in the FC-Register, and is potentially contained in the extended row J=7 of the 3 TDAs.

Step 2 is performed to locate the matching key entry in the specific row and column of a specific DRAM # g. All the key entries listed in the 7-th extended row are read out and compared with the searched key K=89. The location of these key entries in the extended row of the 3 DRAMs are given by row and column mapping formulas. The extended row location index (j) in the 3 DRAMs corresponding to the TDA row 7 is given by a row mapping formula:

$$j=\text{Int}[J/n]=\text{Int}[7/3]=2.$$

The location index (h) of the key entry groups in the extended row 2 of the 3 DRAMs where the searched key may be located is given by a column group mapping formula:

$$h=\text{Res}[J/n]=\text{Res}[7/3]=1.$$

The key group index h=1 determines 3 groups of m=2 key entries in the extended row j=2 of the 3 DRAMs (one group per DRAM); these groups of key entries are the same groups of key entries contained in the 7-th extended row of the 3 TDAs. The 3×2=6 key entries are compared with the searched key.

Since the submitted key 89 meets the inequality:

$$W_{2,7}=88<89<90=W_{3,7},$$

where column index I=2 of $W_{2,7}$ in the 7-th extended row of the G TDAs is given by:

$$g \cdot 2 \leq 2 < (g+1) \cdot 2, 0 \leq g \leq 2,$$

then the searched key may be contained in the 7-th row of TDA # g=1.

The column index i within the group with index h=1 in TDA # 1 is given by:

$$i=\text{Res}[I/m]=\text{Res}[2/2]=0,$$

The column index I of $W_{i,j}$ in the j-th row of TDA # 1 is given by:

$$I=h \cdot m+i=1 \times 2+0=2$$

The column index L of $W_{L,j}$ in the j-th extended row of the 3 DRAMS is given by:

$$L=g \cdot M+I=1 \times 6+2=8$$

If an Exact Match is searched, the result is that No Exact Match exists for 89 and no valid AD can be retrieved.

The Range Match for 89 is $W_{2,7}$=88. The key index (2,7) can be used to retrieve the AD listed under the same index.

The linear search call be suitably implemented with a Row Locator and one or more Column Locators. The Row Locator compares the searched key with the first (lowest) entries of the extended rows to identify the row that may contain the searched key. One Column Locator can compare the searched key with a group of m words listed in the identified row in one TDA. Using this Column locator, G sequential comparisons are necessary to search the identified rows in the G TDAs. If G Column Locators are available, the searched key can be simultaneously compared with the identified rows of the G TDAs.

Since the search methods disclosed involve several steps that increase the search latency, pipelined searches can be simultaneously performed using a plurality of Column Locators, the number of which depends on the number of steps involved. It is assumed that the groups of m words in the same rows of different TDAs can be accessed simultaneously (or quasi-simultaneously).

As mentioned before, the ratio of the database capacity to number of words in the FC-Register in the linear search is equal to $G \cdot m$, which is the fixed number of words in an extended TDA row. To increase this ratio, and significantly reduce the storage space in the SEM for a predetermined database capacity in the external DRAMs, more sophisticated storage and search methods are disclosed. A better ratio is obtained using a binary search, at the expense of increased search steps and latency. The problem of increased latency is solved by pipelined operation.

Binary Search

The term "Binary Search", as used herein in the specification and in the claims section that follows, refers to a search performed in each row by repeatedly dividing the search interval or range in half according to the entry values.

Beginning with the whole row, the submitted key is compared with the entry in the middle of the row. If the submitted key value is lower than the middle entry value, the search interval is then narrowed to the values in the lower half; otherwise, the search interval is confined to the values in the upper half. This process continues until the matching entry is found (if included) in the searched row.

As in the linear search described hereinabove, the binary search utilizes a set of G DRAMs, each having M columns and N rows of w-bit words, but allowing simultaneous access to only m=b/w words in a row. Each DRAM row contains n=M/m groups of m words. Also, the entries of the G DRAMs are logically arranged in corresponding G TDAs. However, whereas in the linear search, each TDA contains the same number of cells for storing M·N w-bit words as the corresponding DRAM, but arranged in m words per row and N·n rows, and the entries of the multiple TDAs are stored in contiguous ascending order along "extended rows", in the binary search, the groups of m words are stored in contiguous ascending order within the TDAs, but the TDAs are arranged in a non-contiguous order that suits an efficient binary search of the TDA containing the word that matches the searched key. Also, the number of groups of m words stored in rows of succeeding TDAs increases by a factor of 2.

The first TDA (TDA # 0) stores in its first row a group of m contiguous words centered around the word located in the middle ("1/2") of the first extended row used in the linear search. The second TDA (TDA # 1) stores in its first row two groups of m contiguous words centered around 1/4 and 3/4 of the extended row. The third TDA (TDA # 2) stores in its first row four groups of m contiguous words centered around the words located at 1/8, 3/8, 5/8 and 7/8 of the extended row, and so on, up to the G-th TDA (TDA # G−1), which stores in its first row $2^{G-1}$ groups of m contiguous words. Thus, the first extended row of these G TDAs contains $2^G-1$ groups of m contiguous words. This storage procedure is repeated in each succeeding extended row.

It is clearly seen that the number of words stored in each row of succeeding TDAs increases by a factor of 2, starting in m words in TDA # 0, and the length of the TDA rows must be calculated so that each row of the last TDA (TDA # G−1) can fit $m \cdot 2^{G-1}$ words, totalling $m \cdot (2^G-1)$ words in the extended row. If the number of words stored in the last TDA (TDA # G−1) is determined to be equal to that stored in each TDA used in Linear Search, i.e., M·N=m·n·N, then the number of rows in TDA # G−1 is $m \cdot n \cdot N / m \cdot 2^{G-1} = N \cdot n / 2^{G-1}$. Since all the TDAs have the same number of rows, then the FC-Register holds only the $N \cdot n/2^{G-1}$ words of the first column of the first TDA (TDA # 0). Thus, the ratio of the database capacity to the number of words in the FC-Register is increased to $m \cdot (2^G-1)$, which is significantly larger than the corresponding ratio G·m in Linear Search, and the number of words held by the FC-Register is reduced to $N \cdot n/2^{G-1}$. This means that a significantly smaller storage space is needed within the SEM for the same database capacity. On the other hand, a binary search in an "extended row" requires a maximum number of G steps, i.e., a high search latency. However, a high output rate can be achieved by pipelined operation.

One design alternative for the physical storage of the words in binary search is to use G DRAMs with a fixed size, having, for example, the same size as the last DRAM (DRAM # G−1). In this case, many row cells are left empty and appreciable storage space is wasted. Another alternative is the use of G DRAMs of increasing row size, which is more storage efficient, but harder to configure. In this case, a larger database can be stored in the same storage space.

Figure 8:
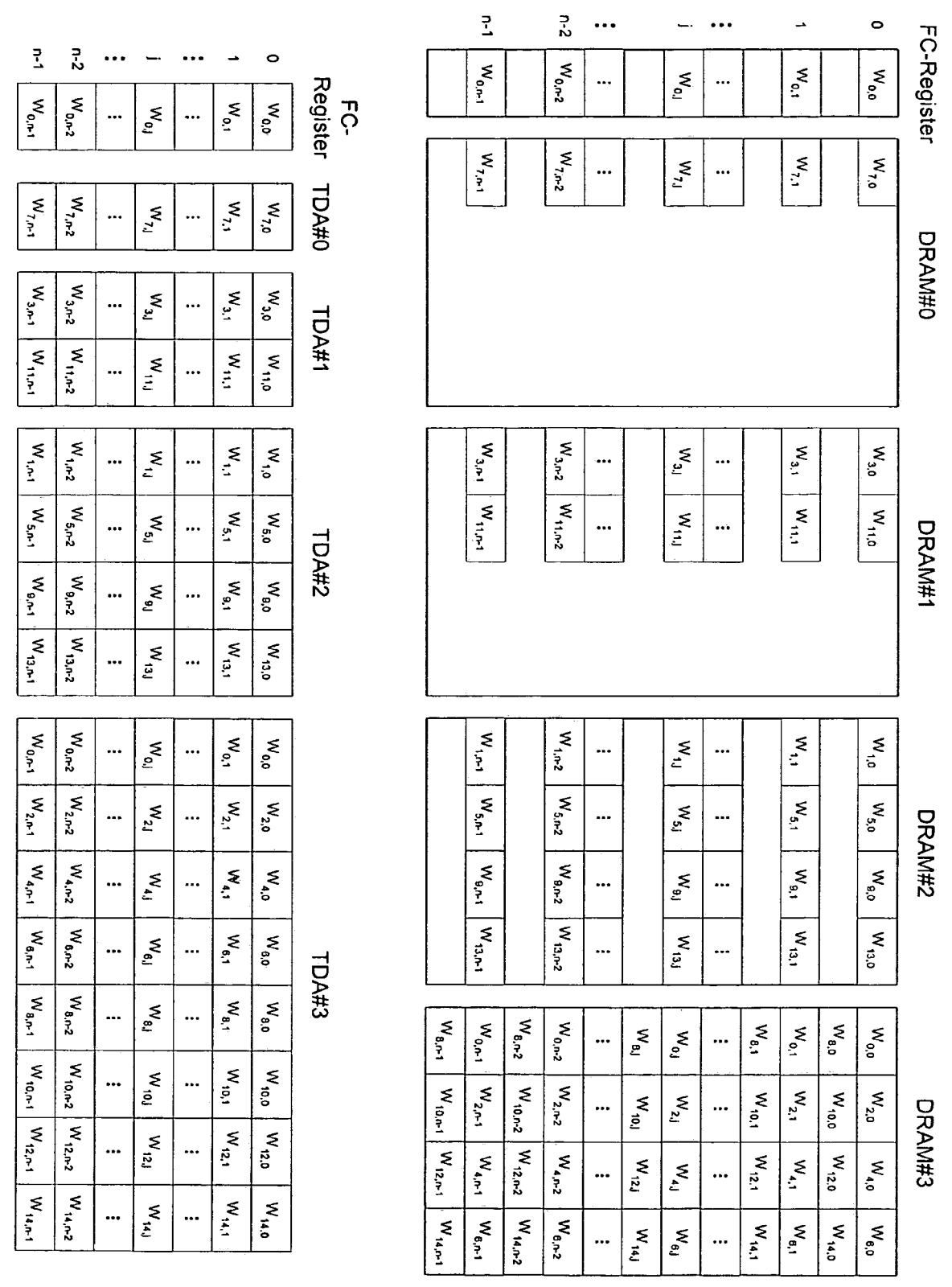

FIG. 8 shows an example of a storage arrangement of 15 words per extended row of G=4 TDAs that is suitable for an efficient binary search procedure. The example assumes that the 4 DRAMs being used allow simultaneous access to a number b of 1-bit cells equal to the number w of bits per word, b=w, so m=b/w=1 word only can be read out in each cycle.

TDA # 0 stores in its first row the word $W_{7,0}$ located at 1/2 of the first extended row. The second TDA (TDA # 1) stores in its first row the two words $W_{3,0}$ and $W_{11,0}$ located at 1/4 and 3/4, respectively, of the extended row. The third TDA (TDA # 2) stores in its first row the four words $W_{1,0}$, $W_{5,0}$, $W_{9,0}$ and $W_{13,0}$ located at 1/8, 3/8, 5/8 and 7/8, respectively, of the extended row. The fourth TDA (TDA # 3) stores in its first row the eight words $W_{0,0}$, $W_{2,0}$, $W_{4,0}$, $W_{6,0}$, $W_{8,0}$, $W_{10,0}$, $W_{12,0}$ and $W_{14,0}$ located at 1/16, 3/16, 5/16, 7/16, 9/16, 11/16, 13/16 and 15/16, 7/8, respectively, of the extended row. The 15 words $W_{0,1}$ through $W_{14,1}$ in the second extended row are stored in the second rows of the 4 TDAs, using the same procedure. The design alternative shown in FIG. 8 for the physical storage of the words uses 4 DRAMs of the same row size that can fit 4 words per row. This arrangement enables an efficient binary search, but wastes storage space because many row cells are left empty.

Binary Search Procedure

A sequential binary search of the submitted key in the G TDAs can be completed in two major steps, the first being identical for Exact and Range Match:

Step 1: Identification of the key entry in the FC-Register after which the submitted key may be located; this key entry points to a specific extended row in the G TDAs.

Step 2: Sequential accesses to the rows of the G TDAs identified in Step 1, and identification of the key entry after which the submitted key may be located; this points to a specific key entry in TDA # g (0≦g≦G−1). The row and column locations of this specific key entry in DRAM # g is given by row and column mapping formulas.

Step 1 is performed to locate the specific extended row in the G TDAs that may contain the submitted key. This key is compared with the key entries in the FC-Register using a Row Locator, as in Step 1 of the Linear Search Procedure described above.

Step 2 is performed to locate the matching key entry in the specific row and column of a specific DRAM # g. The key entries listed in the extended row of the G TDAs are sequentially read out in groups of m words and compared with the searched key using a suitable Column Locator. The location of each of these key entries in the extended row of the G DRAMs is given by row and column mapping formulas.

Step 2 of the binary search procedure starts by comparing the searched key with the group of m contiguous words centered around 1/2 of the first extended row. The second comparison is made with the group of m contiguous words centered around 1/4 or 3/4 of the extended row, according to first comparison result. The third comparison with the group of m contiguous words centered around 1/8 or 3/8 of the row, or around 5/8 or 7/8 of the row, according to second comparison result, and so on, until the matching entry is found. A systematic binary search in an extended row is best performed for $m \cdot (2^G-1)$ words per extended row and requires a maximum number of G steps. Each of these steps involves a read out and a comparison operation, so G read cycles are required for the completion of Step 2 of the search procedure.

Binary Search—Example 1

The example assumes that the G=4 DRAMs being used allow simultaneous access to m=1 word in each cycle, and that Step 1 of the binary search, performed in the FC-Register, points to the first extended row of the 4 TDAs.

Reference is made to FIG. 9, which illustrates the search process for the specific storage arrangement shown in FIG. 8. Step 2 of the search procedure starts by comparing the searched key with $W_{7,0}$ located at 1/2 of the first extended row. The second comparison is made with $W_{3,0}$ or $W_{11,0}$, depending on the result of the first comparison. The third comparison is made with $W_{1,0}$, $W_{5,0}$, $W_{9,0}$ or $W_{13,0}$, depending on the result of the second comparison. The fourth (last) comparison is made with $W_{0,0}$, $W_{2,0}$, $W_{4,0}$, $W_{6,0}$, $W_{8,0}$, $W_{10,0}$, $W_{12,0}$ or $W_{14,0}$, depending on the result of the third comparison. The search in the first extended row is completed within a maximum number of 4 steps, requiring 4 read cycles; only one word is read in each cycle. The search result points to a specific key entry in TDA # g ($0 \leq g \leq 3$). The row and column locations of this specific key entry in DRAM # g are given by row and column mapping formulas.

Figure 10:
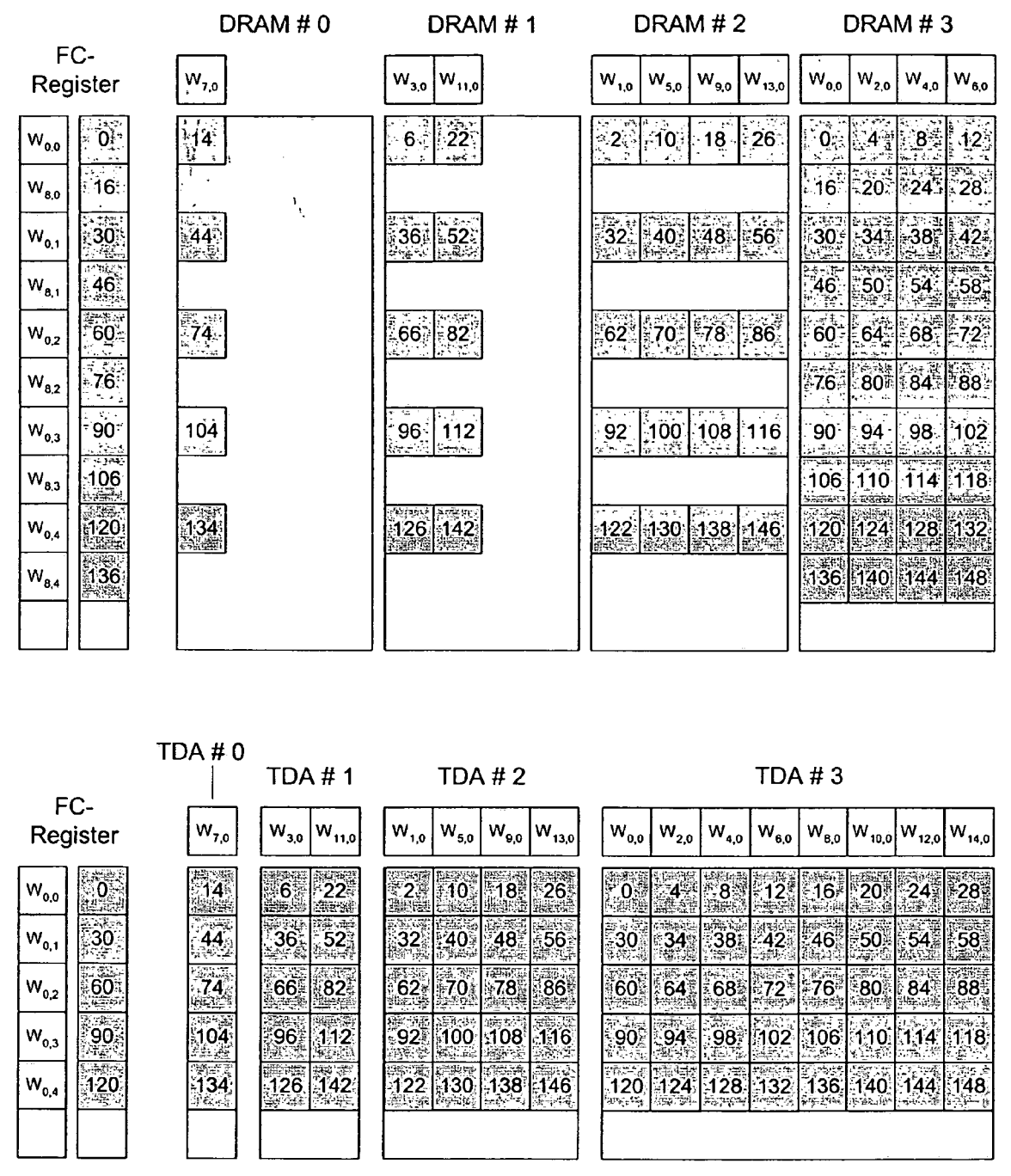

FIG. 10 shows an example with numerical key entries stored (as in FIG. 8) for an efficient binary search procedure, in 4 TDAs with 15 words per extended row. In this example, the TDAs have 5 rows. The figure also shows a possible storage arrangement in 4 physical DRAMs of the same size that can fit 4 words per row.

Figure 11:
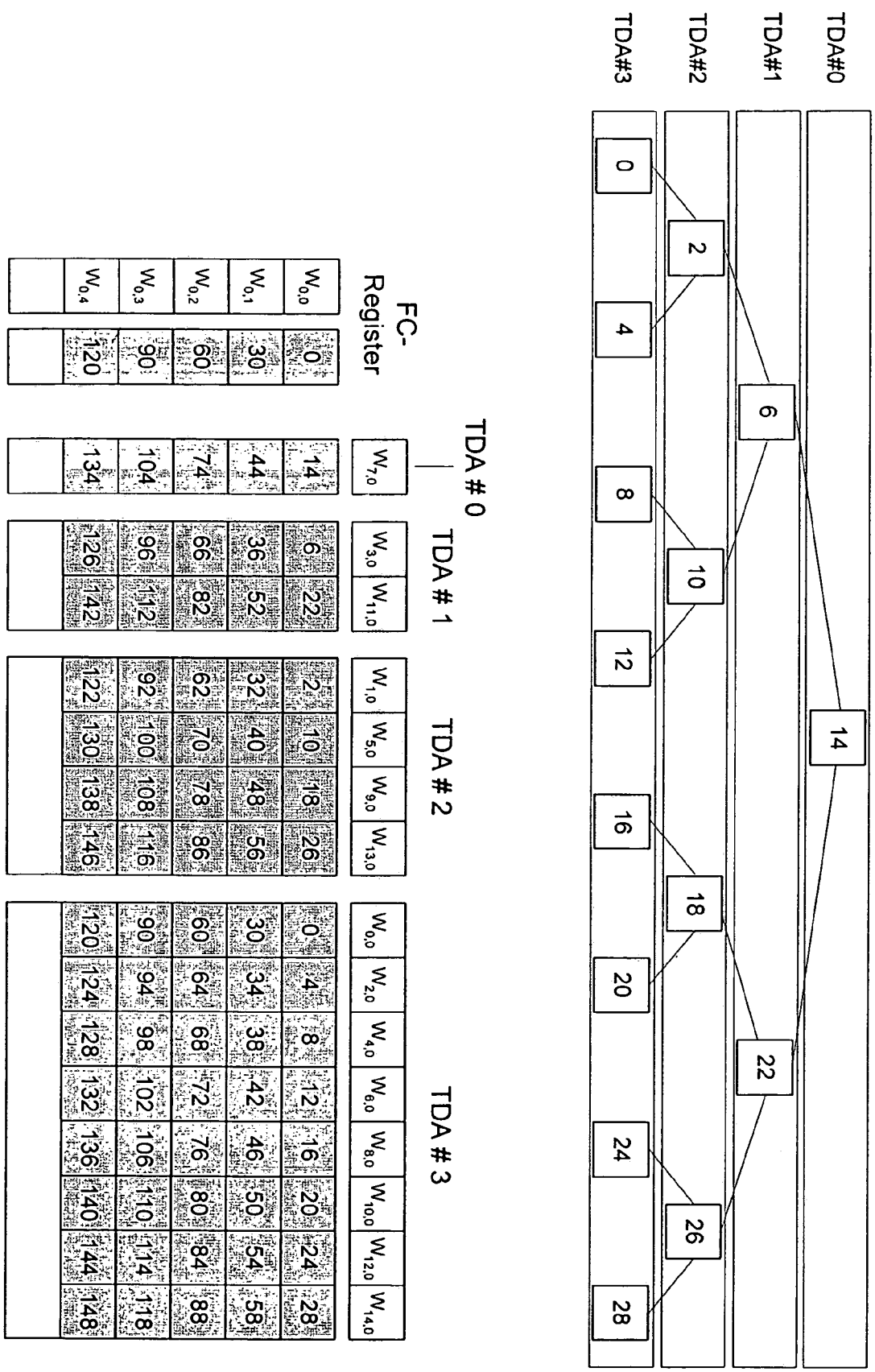
FIG. 11 illustrates the binary search process for the specific storage arrangement shown in FIG. 10.

FIG. 11 illustrates the search process for the specific storage arrangement shown in FIG. 10. The example assumes that the DRAMs being used allow simultaneous access to m=1 word in each cycle, and that the submitted key 21 is searched for Exact and Range Match.

Step 1 is performed to locate the specific extended row in the 4 TDAs that may contain the submitted key K=21. Since $W_{0,0}=0 \leq 21<30=W_{0,1}$, then the submitted key 21 is located after the key entry $W_{0,0}=0$ in the FC-Register, and is potentially contained in the first extended row of the 4 TDAs.

Step 2 begins by comparing the searched key 21 with $W_{7,0}=14$ located at 1/2 of the first extended row. Since 21>14, the second comparison is made with $W_{11,0}=22$. Since 21<22, the third comparison is made with $W_{9,0}=18$. Since 21>18, the fourth (last) comparison is made with $W_{10,0}=20$. Since 21>20, then $W_{10,0}=20$ in TDA # 3 is the Range Match. In this case, there is No Exact Match.

The row and column locations of $W_{10,0}=20$ in DRAM # 3 are given by row and column mapping formulas.

FIG. 12 shows an example of a variant of the binary search procedure (depicted in FIG. 9 and described above), denoted herein as a "binary-linear search". It is assumed, as in the binary search described hereinabove, that the DRAMs being used allow simultaneous access to a single word in each cycle, and that Step 1 of the search procedure, performed in the FC-Register, points to the first extended row of the 5 TDAs. Step 2 of the binary-linear search procedure, performed in the first extended row, consists of only 3 sub-steps: a binary search is performed in the first two sub-steps, followed by a linear search in the third sub-step. The words searched in the third sub-step are stored in 3 TDAs, such that 5 TDAs are used, one more than needed in the "pure" binary search.

As in the binary search, TDA # 0 stores in its first row the word $W_{7,0}$ located at 1/2 of the first extended rows and TDA # 1 stores in its first row the two words $W_{3,0}$ and $W_{11,0}$ located at 1/4 and 3/4, respectively, of the extended row. The other 12 words are arranged in 4 groups of 3 contiguous words; the 3 contiguous words of each group are sequentially stored in 3 additional TDAs (TDA # 2, 3 and 4), each word in a different TDA; so that the 3 words can be simultaneously accessed.

The search procedure in the first row starts with a 2-step binary search, where the searched key is compared with $W_{7,0}$ and then with $W_{3,0}$ or $W_{11,0}$, depending on the first comparison result. The third comparison is made with the 3 contiguous words in one of the 4 groups, determined in the second comparison. As shown in FIG. 12, the 4 groups are $(W_{0,0}, W_{1,0}, W_{2,0})$, $(W_{4,0}, W_{5,0}, W_{6,0})$, $(W_{8,0}, W_{9,0}, W_{10,0})$ and $(W_{12,0}, W_{13,0}, W_{14,0})$. The third comparison is performed in linear sequence. As mentioned hereinabove, this search is completed within a maximum number of 3 steps, requiring 3 read cycles. One word is read in each of the first two cycles (in a binary search) and 3 words are simultaneously read in the third cycle (in a linear search).

As in the "pure" binary search, the number of words stored in each row of succeeding TDAs increases by a factor of 2, to suit the steps of the binary search procedure. Thus, if S steps are performed, the length of the largest TDA row must be calculated to fit $2^{S-1}$ groups of m words. The remaining words in the extended row that are involved in the linear search (after the binary search) are stored in TDAs with this maximal row size of $m \cdot 2^{S-1}$ words. The number of these TDAs depends on the number of m-word groups in an extended row.

If the number of words stored in each of these TDAs is determined to be equal to that stored in each TDA used in the "purely" linear search, i.e., $M \cdot N = m \cdot n \cdot N$, then the number of rows in these TDAs is $m \cdot n \cdot N/m \cdot 2^{S-1} = N \cdot n/2^{S-1}$. Since all the TDAs have the same number of rows, the FC-Register holds the $N \cdot n/2^{S-1}$ words of the first column of the first TDA (TDA # 0). Thus, the ratio of the database capacity to the number of words in the FC-Register is significantly increased beyond the corresponding ratio $G \cdot m$ in the linear search, but below $m \cdot (2^G-1)$ for the "purely" binary search. The number of words held by the FC-Register is $N \cdot n/2^{S-1}$, reduced relatively to $N \cdot n$ for the linear search, but larger than $N \cdot n/2^{G-1}$ for the binary search. Since this combined procedure involves S<G steps, it has a lower latency than the "pure" binary search.

As in the "pure" binary search, one storage alternative makes use of TDAs with the same size. Another alternative is the arrangement of words in TDAs of increasing row size, which is storage-efficient and allows the use of more TDAs or with the same number of DRAMs and the storage of a larger database in these DRAMs.

Binary Search—Example 2

This example assumes that the G=3 DRAMs being used allow simultaneous access to m=2 words in each cycle, and that Step 1 of the binary search, performed in the FC-Register, points to the first extended row of the TDAs.

Figure 13:
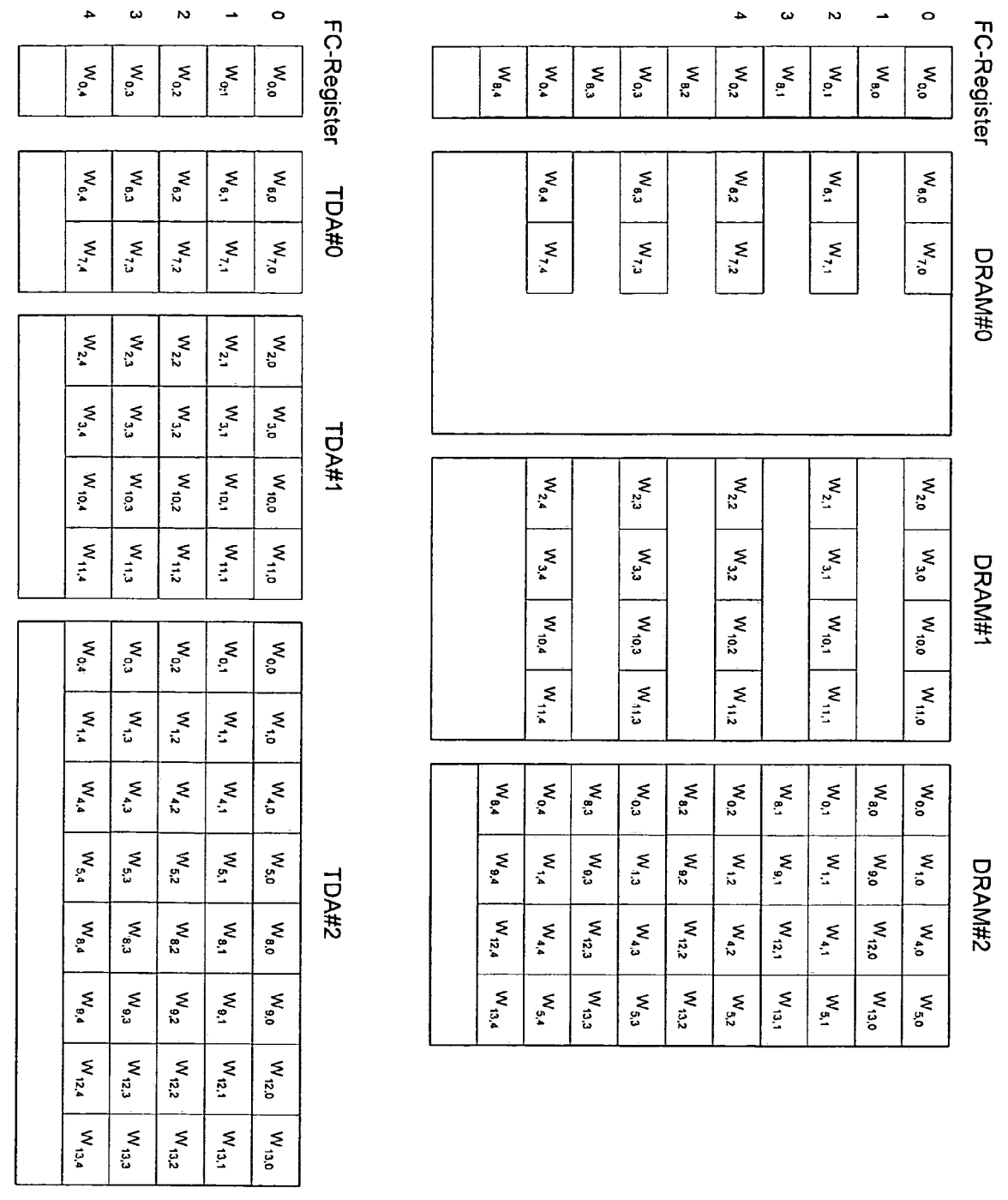

FIG. 13 shows, by way of example, a storage arrangement with 3 DRAMs having 14 words per extended row, for an efficient binary search procedure. FIG. 14 illustrates the search process for the specific storage arrangement shown in FIG. 13. Step 2 of the search procedure starts by comparing the searched key with the pair of words (W6,0, $W_{7,0}$) located at 1/2 of the first extended row. The second comparison is made with one of the 2 pairs ($W_{2,0}$, $W_{3,0}$) or ($W_{10,0}$, $W_{11,0}$), depending on the first comparison result. The third (last) comparison is made with one of the 4 pairs ($W_{0,0}$, $W_{1,0}$), ($W_{4,0}$, $W_{5,0}$), ($W_{8,0}$, $W_{9,0}$) or ($W_{12,0}$, $W_{13,0}$), depending on the second comparison result. This search in the first extended row is completed within a maximum number of 4 steps, requiring 3 read cycles; only one word is read in each cycle. The search result points to a specific key entry in TDA # g ($0 \leq g \leq 2$). The row and column locations of this specific key entry in DRAM# g are given by row and column mapping formulas.

Figure 15:
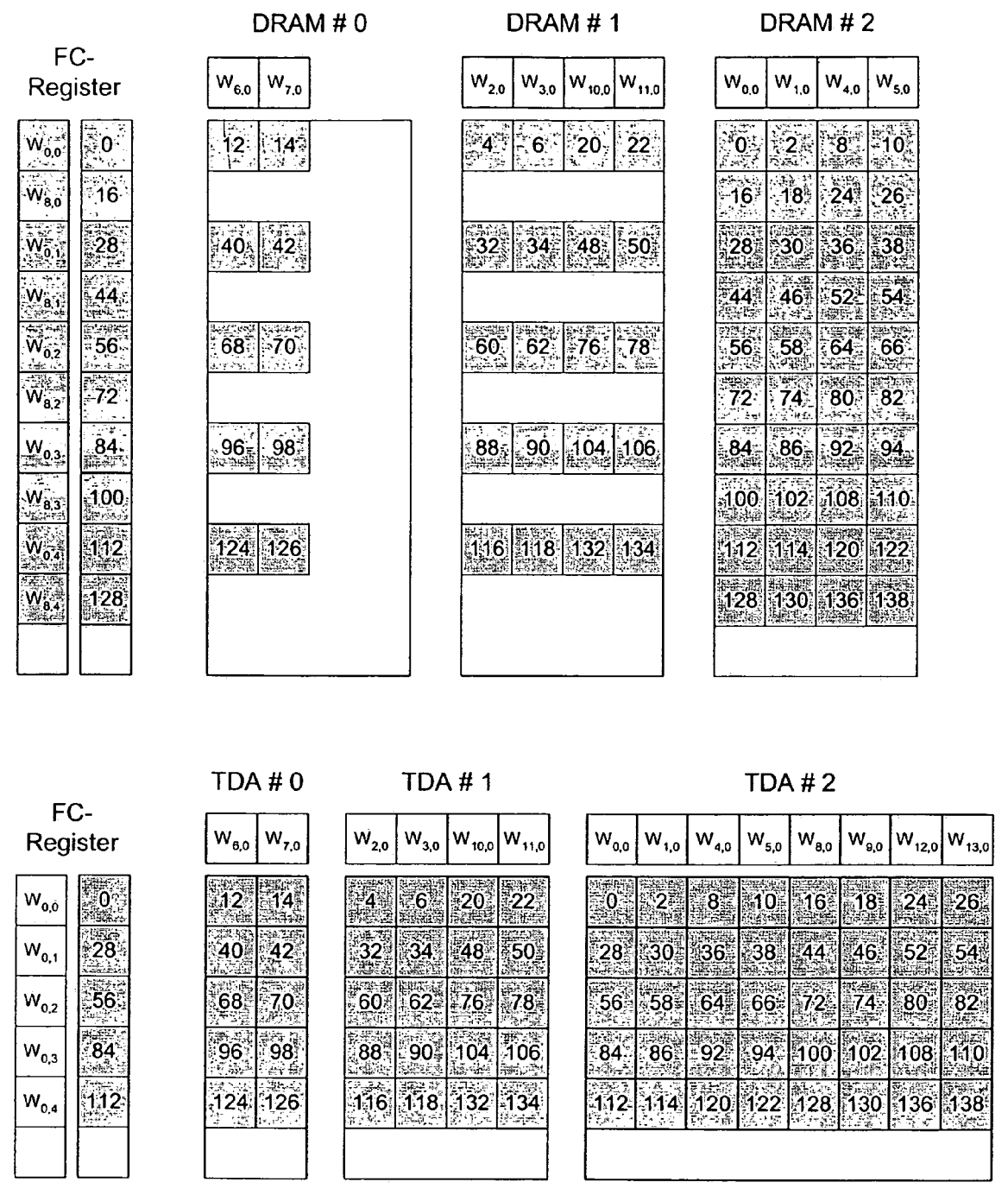

FIG. 15 shows an example with numerical key entries stored (as in FIG. 13) so as to enable an efficient binary search procedure, in 3 TDAs with 14 words per extended row. In this example, the TDAs have 5 rows. FIG. 15 also shows a possible storage arrangement in 3 physical DRAMs of the same size that can fit 4 words per row.

Figure 16:
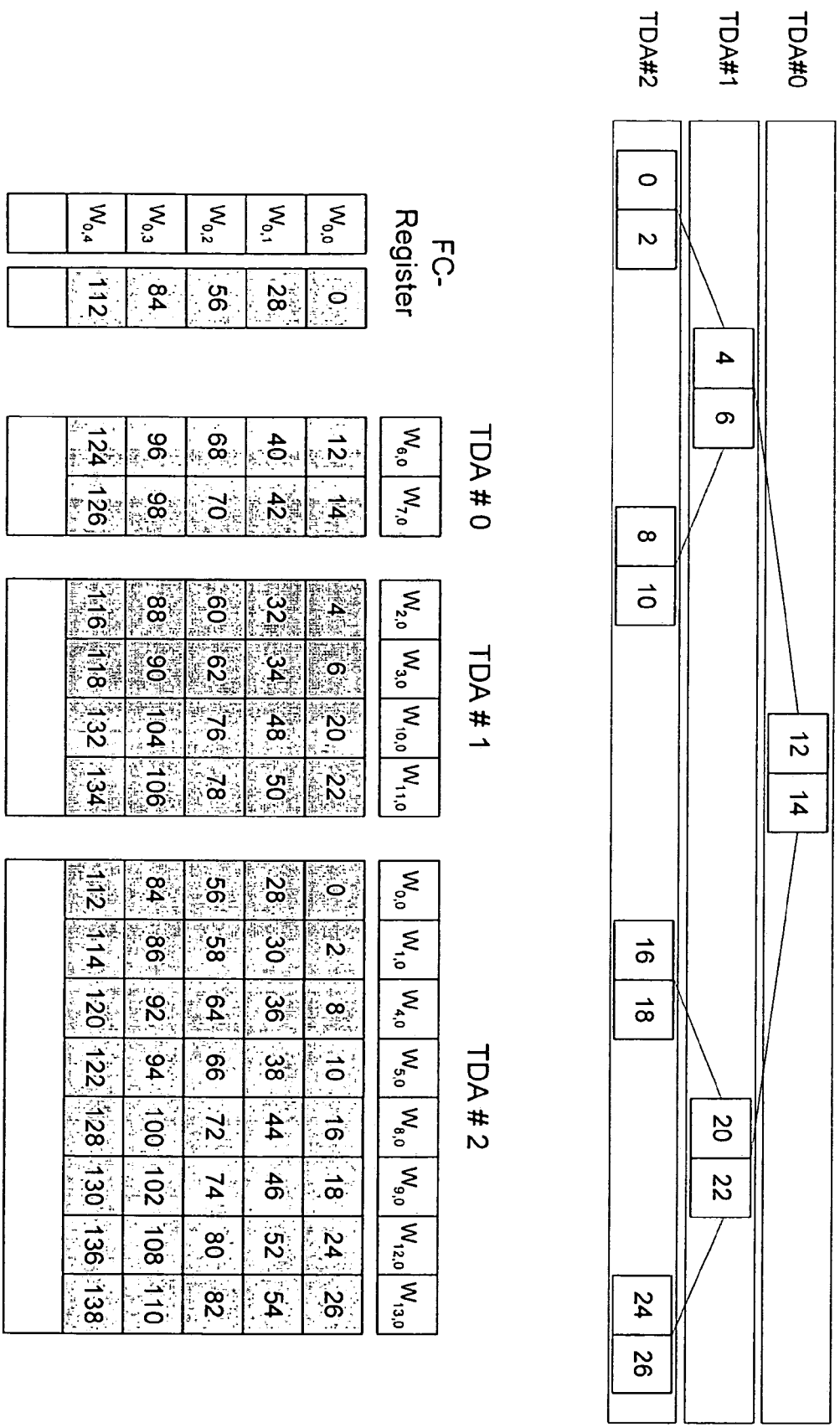
FIG. 16 illustrates the binary search process for the specific storage arrangement shown in FIG. 15.

FIG. 16 illustrates the search process for the specific storage arrangement shown in FIG. 15. It has been assumed that the DRAMs being used allow simultaneous access to m=2 words in each cycle, and that the submitted key 14 is searched for Exact and Range Match.

Step 1 is performed to locate the specific extended row in the 3 TDAs that may contain the submitted key K=21. Since $W_{0,0} = 0 \leq < 28 = W_{0,1}$, the submitted key 21 is located after the key entry $W_{0,0}=0$ in the FC-Register, and is potentially contained in the first extended row of the 3 TDAs.

Step 2 begins by comparing the searched key 21 with the pair of words ($W_{6,0}=12$, $W_{7,0}=14$) located at 1/2 of the first extended row. Since 21>14, the second comparison is made with the pair of words ($W_{10,0}=20$, $W_{11,0}=22$). Since 20<21<22, then $W_{10,0}=20$ in TDA # 1 is the Range Match and a third (last) comparison is not necessary. In this case, there is No Exact Match.

The row and column locations of $W_{10,0}=20$ in DRAM # 1 is given by row and column mapping formulas.

Figure 17:
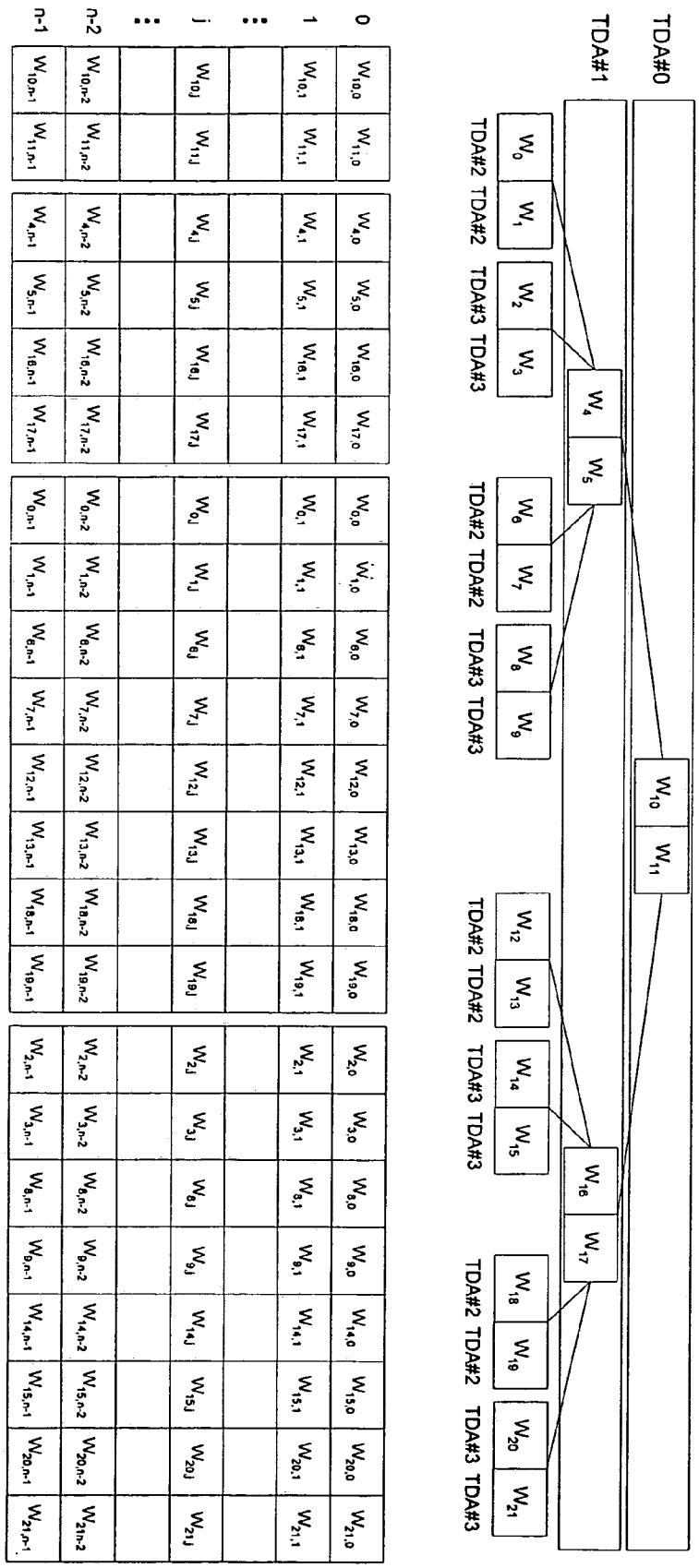
FIG. 17 shows an example of a variant of the binary search procedure depicted in FIG. 14, denoted as "Binary-Linear Search"

FIG. 17 shows another example of the binary-linear search. It has been assumed, as in the binary search (see FIG. 14) that the DRAMs being used allow simultaneous access to m=2 words in each cycle, and that Step 1 of the binary search, performed in the FC-Register, points to the first extended row of the 4 TDAs. Step 2 of the binary-linear search procedure, performed in the first extended row, consists of 3 steps; a binary search is performed in the first two steps, followed by a linear search in the third step.

As in the binary search, TDA # 0 stores in its first row the pair of words ($W_{10,0}$, $W_{11,0}$) located at 1/2 of the first extended row, and TDA # 1 stores in its first row the 2 pairs of words ($W_{4,0}$, $W_{5,0}$) and ($W_{16,0}$, $W_{17,0}$), located at 1/4 and 3/4, respectively, of the extended row. The other 8 pairs of words are arranged in 4 groups of 2 contiguous pairs of words; the 2 contiguous pairs of words of each group are sequentially stored in 2 additional TDAs (TDA # 2 and 3), each pair of words in different TDA, so that the 2 pairs of words can be simultaneously accessed.

The search procedure in the first row starts by comparing the searched key with $W_{6,0}$ and $W_{7,0}$ located at 1/2 of the first extended row. The second comparison is made with $W_{2,0}$ and $W_{3,0}$, or $W_{10,0}$ and $W_{11,0}$, depending on the first comparison result. The third and last comparison is made with $W_{0,0}$ and $W_{1,0}$, $W_{4,0}$ and $W_{5,0}$, $W_{8,0}$ and $W_{9,0}$, or $W_{12,0}$ and $W_{13,0}$, depending on the second comparison result. This search in the first extended row is completed within a maximum number of 4 steps, requiring 3 read cycles; only one word is read in each cycle. The search result points to a specific key entry in TDA # g ($0 \leq g \leq 2$). The row and column locations of this specific key entry in DRAM # g are given by row and column mapping formulas.

The search procedure in the first row starts with a 2-step binary search, wherein the searched key is compared with the pair of words ($W_{10,0}$, $W_{11,0}$) and then with the 2 pairs of words ($W_{4,0}$, $W_{5,0}$) and ($W_{16,0}$, $W_{17,0}$), depending on the first comparison result. The third comparison is made with the 2 contiguous pairs of words in one of the 4 groups, determined in the second comparison. As shown in FIG. 17, the 4 groups of word pairs are ($W_{0,0}$, $W_{1,0}$) and ($W_{2,0}$, $W_{3,0}$), ($W_{6,0}$, $W_{7,0}$) and ($W_{8,0}$, $W_{9,0}$), ($W_{12}$, $w_{13,0}$) and ($W_{14,0}$, $W_{15,0}$), and ($W_{18,0}$, $W_{19,0}$) and ($W_{20,0}$, $W_{21,0}$). The third comparison is performed in linear sequence. This search is completed within a maximum number of 3 steps, requiring 3 read cycles. One pair of words is read in each of the first two cycles (in the binary search) and 2 pairs of words are simultaneously read in the third cycle (in the linear search).

B-Tree Search

B-tree search algorithms can be used to minimize the number of access times to the DRAMs, thereby speeding up the search process, for a specified capacity, or increasing the memory capacity for a specified search rate. In this process, the search interval or range in each row is repeatedly divided in any selected number of parts (in particular, two parts for a binary tree, which is a special case of the B-tree) according to the specific database structure, so that the matching entry can be found in fewer steps, assuming that all other system parameters are identical. Due to the significant advantages of the B-tree search, it is preferable to use a B-tree whenever possible, in particular, balanced tree structures, where the tree has the same number of branches at every decision node and the same maximum number of steps is needed to access any database entry.

The B-tree configuration enables searching an increased number of words in each search step; thus, the same number of words can be searched in fewer steps.

As in the special case of the binary search, the entries of the G DRAMs are logically arranged in corresponding G TDAs. However, the groups of m words are stored in the TDAs in a different order to allow the most efficient search in a B-tree structure of the TDA containing the word that matches the searched key. The optimal storage procedure (e.g., the number of m-word groups stored in rows of succeeding TDAs) and search procedure depend on the selected B-tree structure, which should be tailored to the database structure.

The storage and search procedure may consist of identical steps, where each node has the same number of branches and each search interval has the same number of entries, or may be combined, involving different number of branches and varied intervals in different steps.

A simple example of a B-tree search presented herein combines a first step in which the search interval in each row is divided in three parts (denoted herein as "ternary search"), followed by two steps involving binary search. FIG. 18 shows an example of a storage arrangement in G=3 TDAs of 11 words per extended row for an efficient "ternary-binary search" procedure. It has been assumed in this example that the 3 DRAMs being used allow simultaneous access to m=1 word in each cycle. FIG. 19 illustrates the search process for the specific storage arrangement shown in FIG. 18.

TDA # 0 stores in its first row the words $W_{3,0}$ and $W_{7,0}$ located at 1/3 and 2/3 of the first extended row, as suitable for an efficient ternary search. TDA # 1 stores in its first row the three words $W_{1,0}$, $W_{5,0}$ and $W_{9,0}$, each located at 1/2 of the three intervals determined by the first search step. TDA # 2 stores in its first row the remaining 6 words $W_{0,0}$, $W_{2,0}$, $W_{4,0}$, $W_{6,0}$, $W_{8,0}$ and $W_{10,0}$, each located at 1/2 of the 6 intervals determined by the previous search steps. This arrangement allows sequential accesses to the required words in each step.

The design alternative shown in FIG. 18 for the physical storage of the words in binary search is to use 3 DRAMs with a fixed size, having, for example, the same size as the last DRAM (DRAM # 2). However, many row cells are left empty, such that a large storage space is wasted. Another alternative is the use of 3 DRAMs of increasing row size, which is more storage efficient, but harder to configure. In this case, a larger database can be stored within the same storage space.

B-Tree Search Procedure

A sequential ternary-binary search of the submitted key in the G TDAs can be completed in two major steps, the first of which being identical for Exact and Range Matches:

Step 1: Identification of the key entry in the FC-Register after which the submitted key may be located; this key entry points to a specific extended row in the G TDAs.

Step 2: Sequential accesses to the rows of the G TDAs identified in Step 1, and identification of the key entry after which the submitted key may be located; this points to a specific key entry in TDA # g ($0 \leq g \leq G-1$). The row and column locations of this specific key entry in DRAM # g is given by row and column mapping formulas.

Step 1 is performed to locate the specific extended row in the G TDAs that may contain the submitted key. The submitted key is compared with the key entries in the FC-Register using a Row Locator, as in Step 1 of the linear search procedure described hereinabove.

Step 2 is performed to locate the matching key entry in the specific row and column of a specific DRAM # g. The key entries listed in the extended row of the G TDAs are sequentially read out in groups of m words and compared with the searched key using a suitable Column Locator. The locations of these key entries in the extended row of the G DRAMs are given by row and column mapping formulas.

Step 2 of the ternary-binary search procedure starts by comparing the searched key with 2 groups of m contiguous words centered around 1/3 and 2/3 of the first extended row. The second comparison is made with one of 3 groups of m contiguous words centered around halves of the 3 sections determined by the first comparison, i.e., 1/6, 1/2 or 5/6 of the extended row, according to first comparison result. The third comparison with one of the 6 groups of m contiguous words centered around halves of the 6 sections determined by the first and second comparisons (excluding the previously checked words) words, i.e., 1/12, 1/4, 5/12, 7/12, 3/4 or 11/12 of the extended row, and so on, until the matching entry is found. The number of groups of m contiguous words in an extended row suitable for systematic ternary-binary search depends on the specific ternary and binary search steps performed in Step 2.

B-Tree Search Procedure—Example 1

The example assumes that the G=3 DRAMs being used allow simultaneous access to m=1 word in each cycle, and that Step 1 of the ternary-binary search, performed in the FC-Register, points to the first extended row of the 3 TDAs.

Reference is made to FIG. 19, which illustrates the search process for the specific storage arrangement shown in FIG. 18. Step 2 of the search procedure starts with a 1-step ternary search, where the searched key is compared with $W_{3,0}$ and $W_{7,0}$. Depending on this comparison result, the searched key is compared in a 2-step binary search, first with $W_{1,0}$, $W_{5,0}$ or $W_{9,0}$, and finally with $W_{0,0}$, $W_{2,0}$, $W_{4,0}$, $W_{6,0}$, $W_{8,0}$ or $W_{10,0}$, depending on the previous comparison result. The search procedure is completed within a maximum number of 3 steps, requiring 3 read cycles. The search result points to a specific key entry in TDA # g ($0 \leq g \leq 2$). The row and column locations of this specific key entry in DRAM # g are given by row and column mapping formulas.

Figure 20:
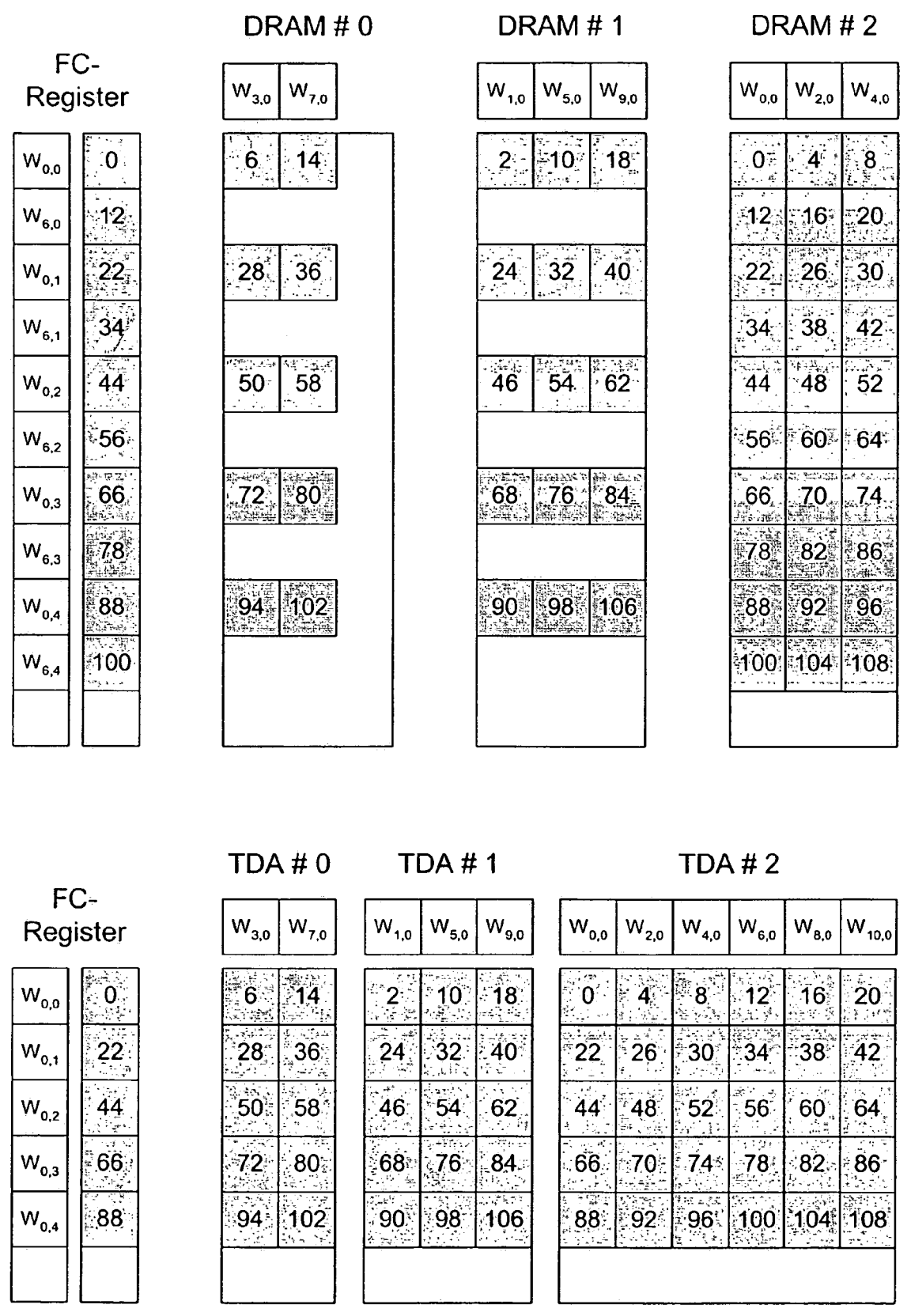

FIG. 20 shows an example with numerical key entries stored (as in FIG. 18) so as to enable an efficient Ternary-Binary search procedure: in 3 TDAs with 11 words per extended row. In this example, the TDAs have 5 rows. The figure also shows a possible storage arrangement in 3 physical DRAMs of the same size that can fit 4 words per row.

Figure 21:
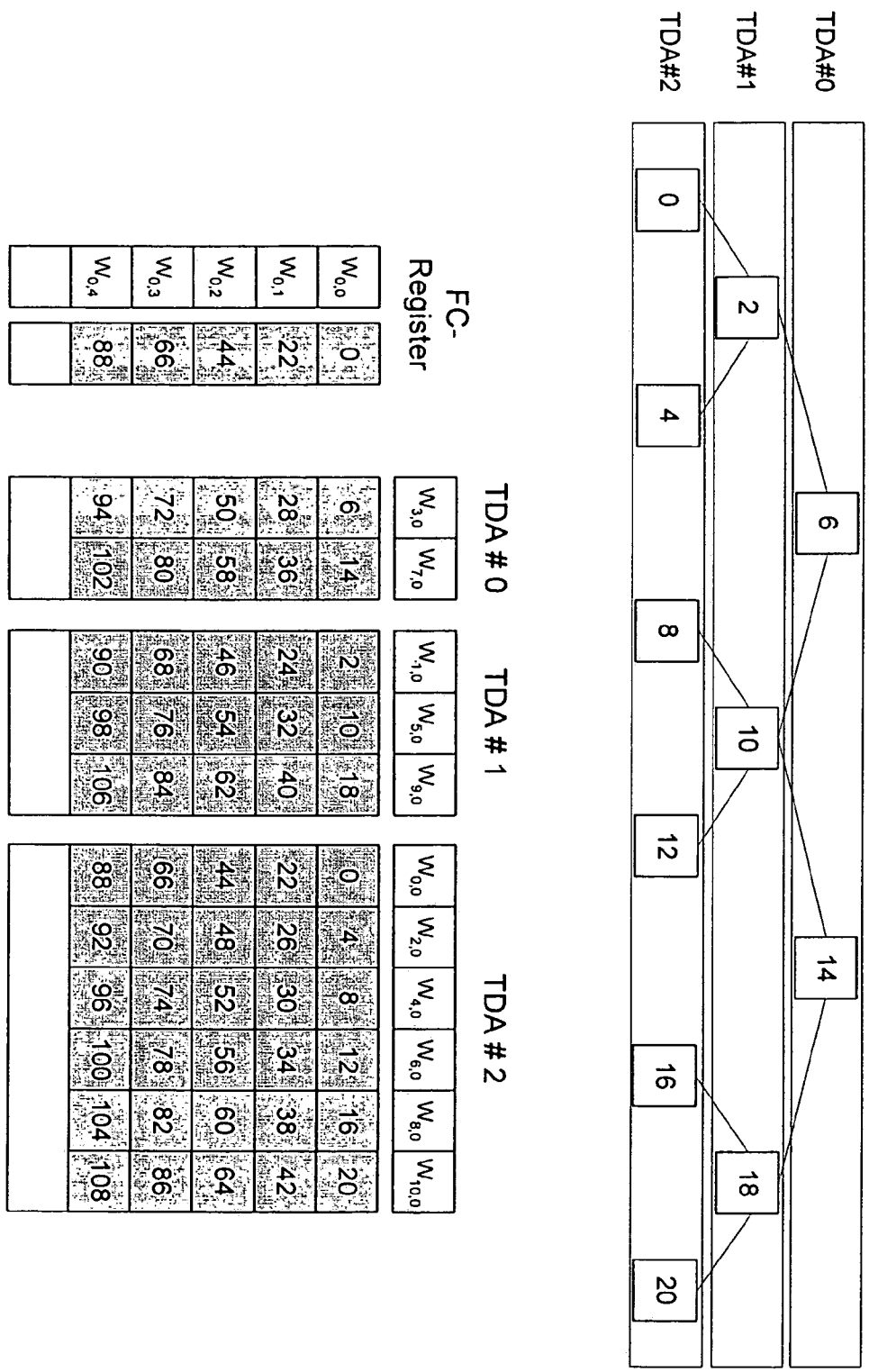
FIG. 21 illustrates the Ternary-Binary search process for the specific storage arrangement shown in FIG. 20.

FIG. 21 illustrates the search process for the specific storage arrangement shown in FIG. 20. It has been assumed that the DRAMs being used allow simultaneous access to m=1 word in each cycle, and that the submitted key 17 is searched for Exact and Range Matches.

Step 1 is performed to locate the specific extended row in the 3 TDAs that may contain the submitted key K=17. Since:

$$W_{0,0}=0 \leq 17 < 44 = W_{0,1},$$

the submitted key 17 is located after the key entry $W_{0,0}=0$ in the FC-Register, and is potentially contained in the first extended row of the 3 TDAs.

Step 2 begins by comparing the searched key 17 with $W_{3,0}=6$ and $W_{7,0}=14$ located at 1/3 and 2/3, respectively, of the first extended row. Since 17>14, the second comparison is made with $W_{9,0}=18$. Since 17<18, the third (last) comparison is made with $W_{8,0}=16$. Since 17>16, then $W_{8,0}=16$ in TDA # 2 is the Range Match. In this case, there is No Exact Match.

The row and column locations of $W_{8,0}=16$ in DRAM # 2 are given by row and column mapping formulas.

B-Tree Search—Example 2

The example assumes that the G=3 DRAMs being used allow simultaneous access to m=2 words in each cycle, and that Step 1 of the ternary-binary search, performed in the FC-Register, points to the first extended row of the 3 TDAs.

Figure 22:
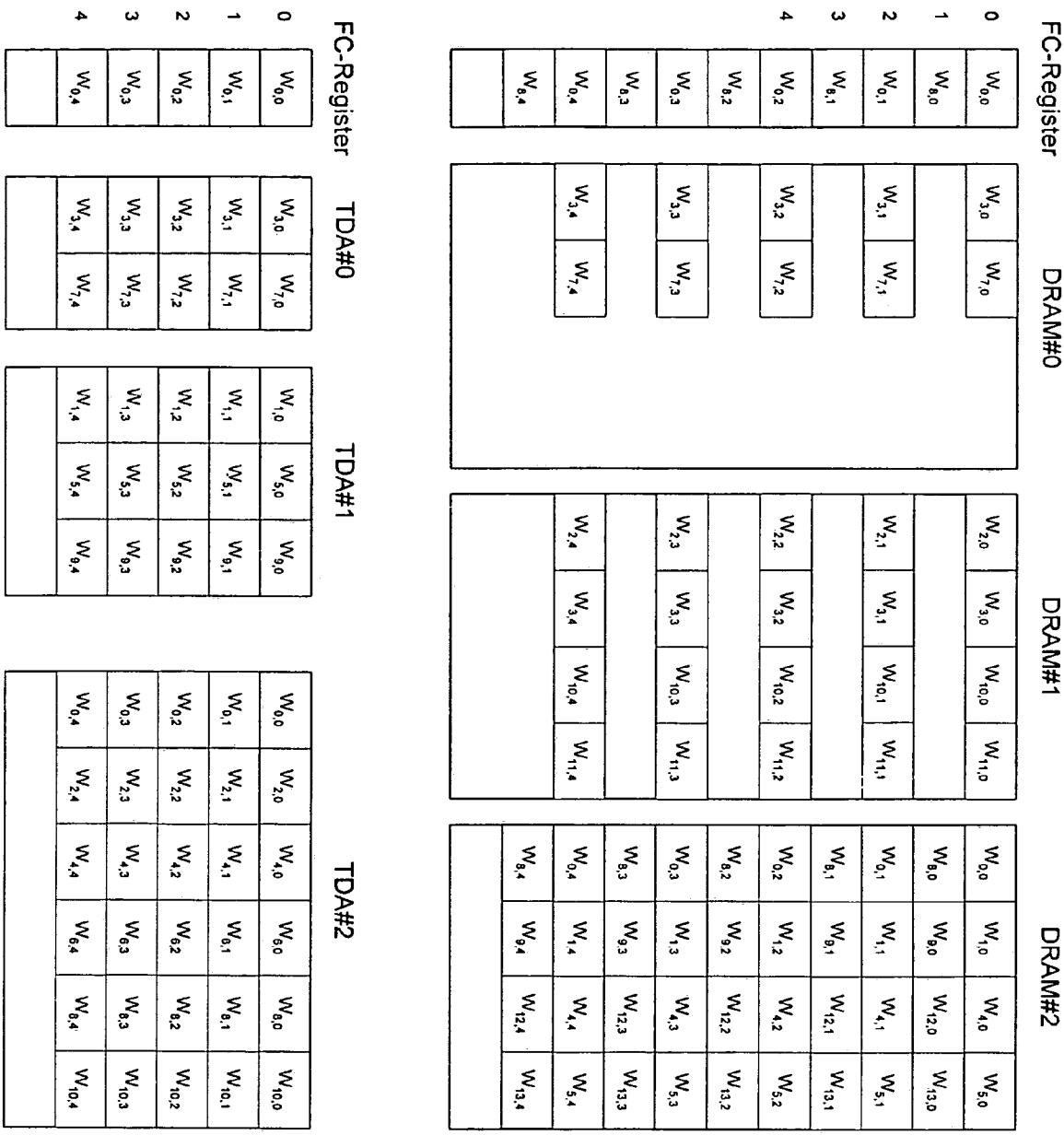
FIG. 22 shows an example of a storage arrangement in 3 TDAs of 22 words per extended row for an efficient Ternary-Binary search procedure.
Figure 23:
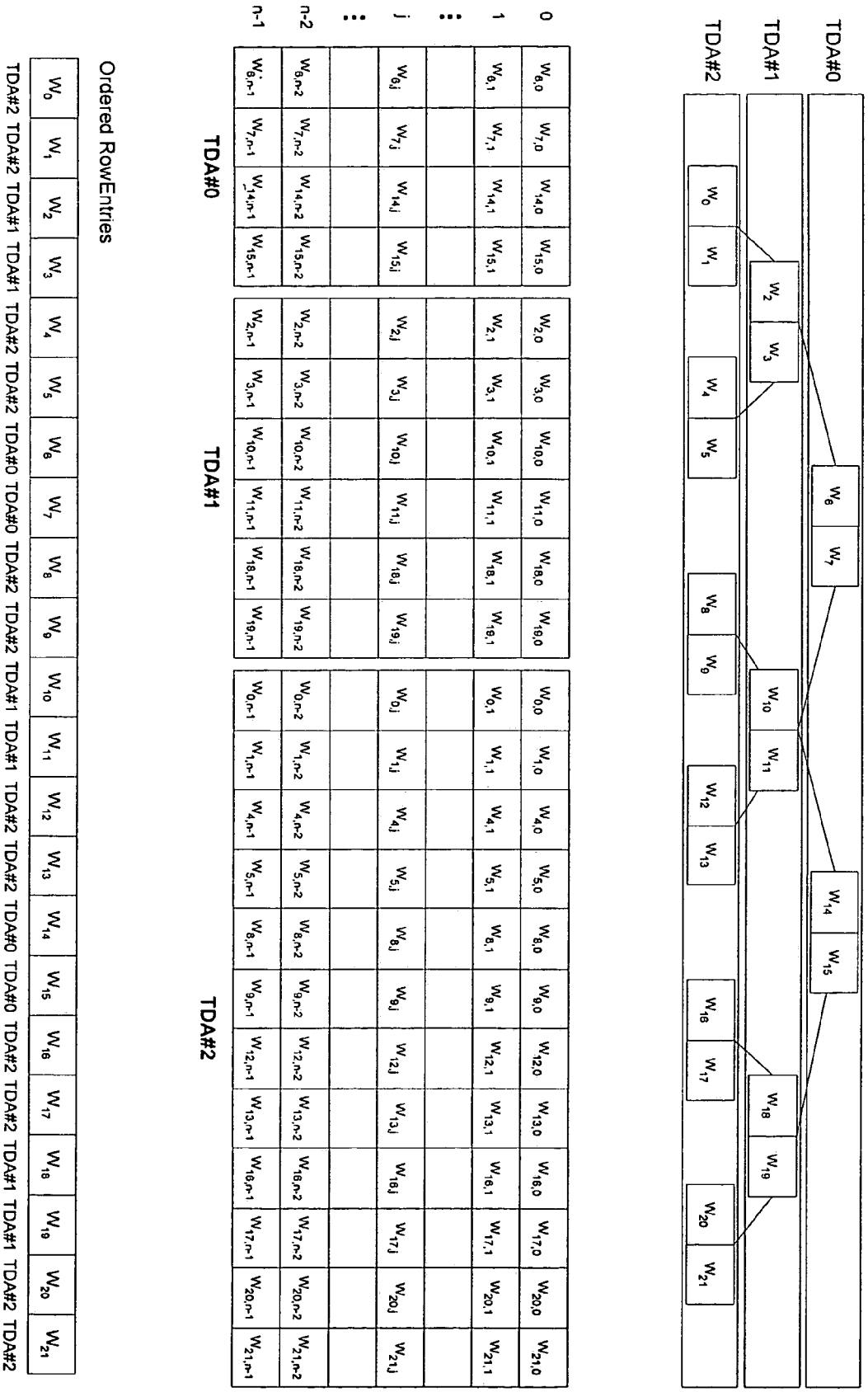
FIG. 23 illustrates the Ternary-Binary search process for the specific storage arrangement shown in FIG. 22.

FIG. 22 shows an example of a storage arrangement in 3 DRAMs of 22 words per extended row so as to enable an efficient ternary-binary search procedure. FIG. 23 illustrates the search process for the specific storage arrangement shown in FIG. 22. Step 2 of the search procedure starts with a 1-step ternary search, where the searched key is compared with the 2 pairs of words ($W_{6,0}$, $W_{7,0}$) and ($W_{14,0}$, $W_{15,0}$) located at 1/3 and 2/3, respectively, of the first extended row. Depending on this comparison result, the searched key is compared in a 2-step binary search, first with one of the the 3 pairs of words ($W_{2,0}$, $W_{3,0}$), ($W_{10,0}$, $W_{11,0}$) or ($W_{18,0}$, $W_{19,0}$) and finally with one of the the 6 pairs ($W_{0,0}$, $W_{1,0}$), ($W_{4,0}$, $W_{5,0}$), ($W_{8,0}$, $W_{9,0}$), ($W_{12,0}$, $W_{13,0}$), $W_{17,0}$) or ($W_{20,0}$, $W_{21,0}$), depending on the previous comparison result. The search procedure is completed within a maximum number of 3 steps, requiring 3 read cycles. The search result points to a specific key entry in TDA # .g ($0 \leq g \leq 2$). The row and column locations of this specific key entry in DRAM # g is given by row and column mapping formulas.

Figure 24:
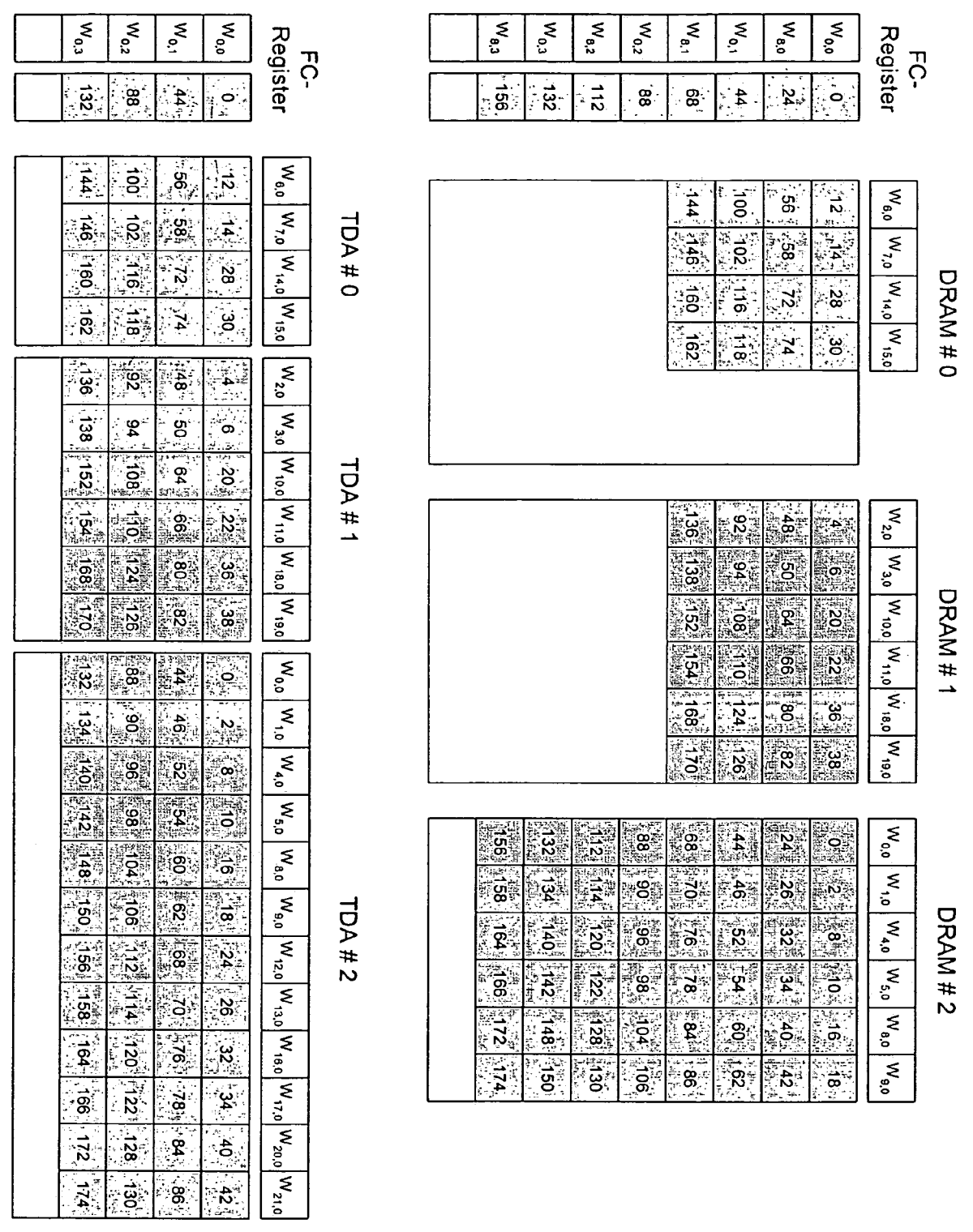

FIG. 24 shows an example with numerical key entries stored (as in FIG. 22) so as to enable an efficient ternary-binary search procedure, in 3 TDAs with 22 words per extended row. In this example, the TDAs have 4 rows. FIG. 24 also provides a possible storage arrangement in 3 physical DRAMs of the same size that can fit 6 words per row.

Figure 25:
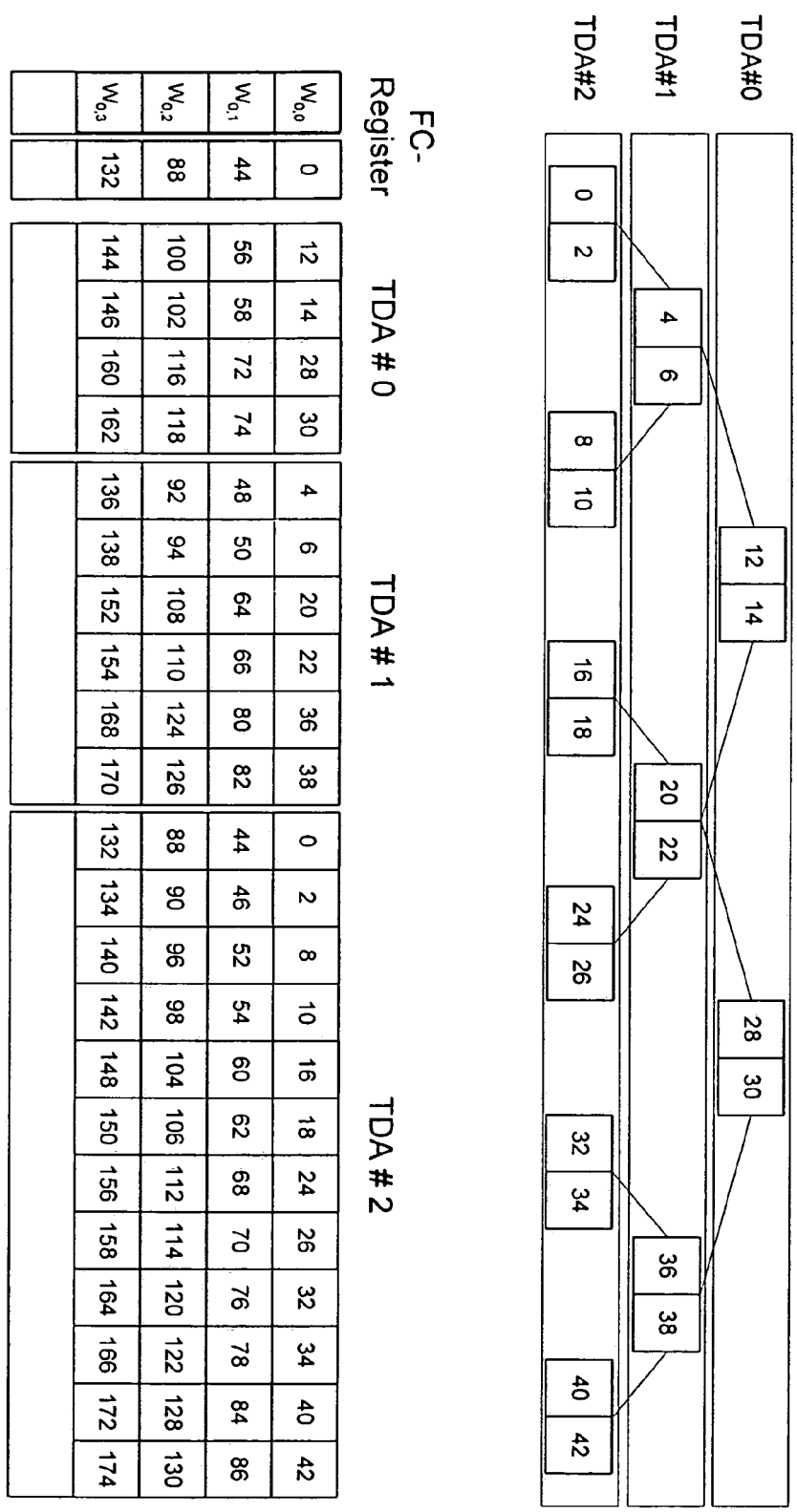
FIG. 25 illustrates the Ternary-Binary search process for the specific storage arrangement shown in FIG. 24.

FIG. 25 illustrates the search process for the specific storage arrangement shown in FIG. 24. It has been assumed, in exemplary fashion, that the DRAMs being used allow simultaneous access to m=2 words in each cycle, and that the submitted key 17 is searched for Exact and Range Matches.

Step 1 is performed to locate the specific extended row in the 3 TDAs that may contain the submitted key K=17. Since:

$$W_{0,0}=0 \leq 17 < 44 = W_{0,1},$$

the submitted key 17 is located after the key entry $W_{0,0}=0$ in the FC-Register, and is potentially contained in the first extended row of the 3 TDAs.

Step 2: begins by comparing the searched key 17 with the the 2 pairs of words ($W_{6,0}=12$, $W_{7,0}=14$) and ($W_{14,0}=28$, $W_{15,0}=30$) located at 1/3 and 2/3, respectively, of the first extended row. Since 17>14, the second comparison is made with the pair of words ($W_{10,0}=20$, $W_{11,0}=22$). Since 17<20. the third (last) comparison is made with the pair of words ($W_{8,0}=16$, $W_{9,0}=18$). Since 16<17<18, then $W_{8,0}=16$ in TDA # 2 is the Range Match. In this case, there is No Exact Match.

The row and column locations of $W_{8,0}=16$ in DRAM # 2 is given by row and column mapping formulas.

Pipelined Search Procedure

The three search methods disclosed above (Linear, Binary and B-Tree) are performed in a set of G TDAs corresponding to the G DRAMs, which can be accessed in a specified sequence after a short delay between the DRAMs, and allow the simultaneous (or quasi-simultaneous) retrieval of groups of m words from different TDAs. This means that G access intervals are required between the retrievals of groups of m words from the same TDA.

A sequential search of the submitted key in the G TDAs can be completed in two major steps, the first being identical for Exact and Range Match. The first step is performed in the FC-Register to identify the specific extended row in the G TDAs where the submitted key may be located. In the second step, the rows of the G TDAs identified in the first step are sequentially accessed to identify the key entry after which the submitted key may be located; this points to a specific key entry in TDA # g ($0 \leq g \leq G-1$). The row and column locations of this specific key entry in DRAM # g is given by row and column mapping formulas. This second step involves sequential comparisons of the searched key with groups of m contiguous words in several stages of a search tree, where each stage requires a processing time and access intervals between the retrievals of the groups of m words from the G TDAs. This sequential multiple-stage process results in a high latency. Since a search cycle for a submitted key starts only after the search cycle for the previous key is completed, the search requires many clocks for execution and it is performed at a small fraction of the clock rate.

In a preferred embodiment, a pipelined process is applied, such that a new search cycle can start before the previous search cycle is completed. In the two examples provided below, a new search cycle starts one clock period after the start of the previous cycle. Thus, the pipelined process enables the performance of search operations at a full or substantially full clock rate, where a clock period is defined by the DRAM access interval.

The first example of a pipelined procedure provided below applies to the sequential Binary Search Procedure presented above in terms of a set of G=4 DRAMs logically arranged in 4 TDAs, as shown in FIG. 8, and the search process for this arrangement illustrated in FIG. 9.

Pipelined Binary Search Procedure—Example 1

This example assumes that the G=4 DRAMs being used allow simultaneous access to m=1 word in each cycle, and that Step 1 of the binary search (FIG. 9), performed in the FC-Register, points to the first extended row (# 0) of the 4 TDAs.

Table 1 shows schematically the ongoing performance of the second step of the search procedure in a pipelined fashion for a list of submitted keys designated $K_0$, $K_1$, $K_2$, etc. The search procedure starts by comparing the searched key with W7,0 located at 1/2 of the first extended row. The second comparison is made with $W_{3,0}$ or $W_{11,0}$, depending on the result of the first comparison. The third comparison is made with $W_{1,0}$, $W_{5,0}$, $W_{9,0}$ or $W_{13,0}$, depending on the result of the second comparison. The fourth (last) comparison is made with $W_{0,0}$, $W_{2,0}$, $W_{4,0}$, $W_{6,0}$, $W_{8,0}$, $W_{10,0}$, $W_{12,0}$ or $W_{14,0}$, depending on the result of the third comparison. The search in the first extended row is completed within a maximum number of 4 stages, requiring 4 read cycles; only one word is read in each cycle. The search result points to a specific key entry in TDA # g ($0 \leq g \leq 3$). The row and column locations of this specific key entry in DRAM # g are given by row and column mapping formulas.

Table 1 lists the results of the binary search procedure shown in FIG. 11 (a specific case of the search procedure of FIG. 9) applied to the numerical key entries arranged in the 4 TDAs with 15 words per extended row provided in FIG. 10. The DRAM Output Key refers to the word transferred from the relevant DRAM to the SEM following each search stage; NOP means No Operation and indicates that the DRAMs do not output any word in the specific clock cycle. It is assumed in this example that a lookup cycle takes 4 clock cycles, and that the time taken for processing the DRAM output key and identifying the next key to be retrieved from the DRAMs lies between 4 and 5 clock cycles; thus the 4 DRAMs accept a new searched key every 4 clock cycles and are ready to output the identified keys after 5 clock cycles.

TABLE 1

Example 1 of Pipelined Binary Search Procedure

| Clock Cycle | Searched Key | Search Tree Stage | TDA Involved | DRAM Output Key |
|---|---|---|---|---|
| $CLK_0$ | $K_0 = 3$ | #1 | TDA #0 | $W_{7,0} = 14$ |
| $CLK_1$ | — | — | — | NOP |
| $CLK_2$ | — | — | — | NOP |
| $CLK_3$ | — | — | — | NOP |
| $CLK_4$ | $K_1 = 8$ | #1 | TDA #0 | $W_{7,0} = 14$ |
| $CLK_5$ | $K_0 = 3$ | #2 | TDA #1 | $W_{3,0} = 6$ |
| $CLK_6$ | — | — | — | NOP |
| $CLK_7$ | — | — | — | NOP |
| $CLK_8$ | $K_2 = 17$ | #1 | TDA #0 | $W_{7,0} = 14$ |
| $CLK_9$ | $K_1 = 8$ | #2 | TDA #1 | $W_{3,0} = 6$ |
| $CLK_{10}$ | $K_0 = 3$ | #3 | TDA #2 | $W_{1,0} = 2$ |
| $CLK_{11}$ | — | — | — | NOP |
| $CLK_{12}$ | $K_3 = 23$ | #1 | TDA #0 | $W_{7,0} = 14$ |
| $CLK_{13}$ | $K_2 = 17$ | #2 | TDA #1 | $W_{11,0} = 22$ |

TABLE 1-continued

Example 1 of Pipelined Binary Search Procedure

| Clock Cycle | Searched Key | Search Tree Stage | TDA Involved | DRAM Output Key |
|---|---|---|---|---|
| $CLK_{14}$ | $K_1 = 8$ | #2 | TDA #2 | $W_{5,0} = 10$ |
| $CLK_{15}$ | $K_0 = 3$ | #4 | TDA #3 | $W_{2,0} = 4$ |
| $CLK_{16}$ | $K_3 = 27$ | #1 | TDA #0 | $W_{7,0} = 14$ |
| $CLK_{17}$ | $K_3 = 23$ | #2 | TDA #1 | $W_{11,0} = 22$ |
| $CLK_{18}$ | $K_2 = 17$ | #3 | TDA #3 | $W_{9,0} = 18$ |
| $CLK_{19}$ | $K_1 = 8$ | #4 | TDA #3 | $W_{4,0} = 8$ |

If an Exact Match is identified before the last stage, then the DRAM containing the matched word outputs this word and then the DRAMs output NOPs in the later stages. In case of Range Match, the DRAMs continue outputting the words resulting from the sequential comparisons with the submitted key up to the last stage; all these words are then processed in the SEM to identify the matched word with no further participation of these DRAMs.

The number of words stored in each row of succeeding TDAs used in binary search increases by a factor of 2, starting in one word in TDA # 0 and ending in 4 words in the last TDA (TDA # 3) in this last example. Using DRAMs with a fixed size, which is a common design, leaves many row cells empty in the first DRAMs and appreciable storage space is wasted. This storage scheme may also cause uneven flow of bits from the DRAMs to the SEM, such that the flow exceeds the bus bandwidth for short periods.

In a preferred embodiment of the present invention, more sophisticated storage schemes, in which words compared in different search stages are stored in common (not separate) DRAMs, help to fill the DRAMs almost completely, providing higher storage efficiency, more balanced bit flow and better use of the bus bandwidth. These storage schemes are tailored to particular DRAM arrangements, and depend on the number of DRAMs, maximum numbers of key entries per DRAM, maximum numbers of key entries retrievable from a DRAM row per access, search tree used, etc. Example 2 shows a pipelined search procedure using a B-tree and a more efficient storage in G=4 logically arranged in 4 TDAs.

Pipelined B-Tree Search Procedure—Example 2

The example of a B-tree search presented herein (see FIG. 26) assumes that the G=4 DRAMs have 44 words per extended row and allow simultaneous access to m=2 words in each cycle, and that Step 1 of the binary search, performed in the FC-Register, points to the first extended row (# 0) of the 4 TDAs.

Figure 26:
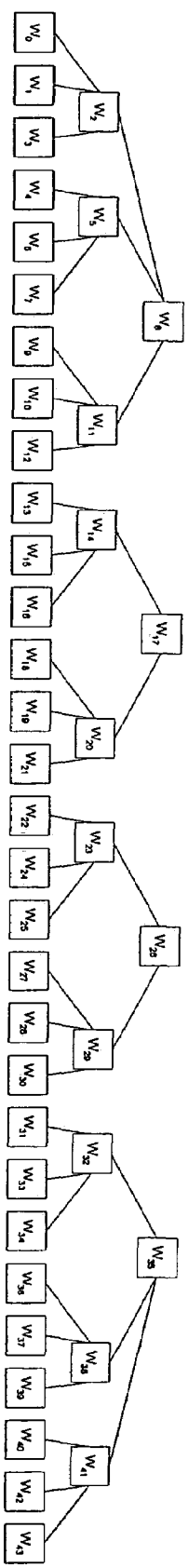
FIG. 26 shows an example of a logical arrangement of key entries in 4 TDAs for a B-tree search procedure consisting of three stages, where the words used in different search stages are arranged in common TDAs.

FIG. 26 shows the logical arrangement in 4 TDAs of the 44 words per extended row and a B-tree search procedure consisting of three stages. In this example, the words compared in the first and third search stages are arranged in common TDAs (the first three) and those used in the second stage are arranged in a separate (last) TDA. This arrangement is one of many alternatives for a B-tree search.

Step 2 of the search procedure starts with a 1-stage ternary search, in which the searched key is compared with the 4 words arranged in 2 pairs ($W_{8,0}$, $W_{17,0}$) and ($W_{26,0}$, $W_{35,0}$) located about 1/5, 2/5, 3/5 and 4/5, respectively, of the first extended row. Depending on this comparison result, the searched key is compared in a second stage with one of 5 pairs of words ($W_{2,0}$, $W_{5,0}$), ($W_{11,0}$, $W_{14,0}$), ($W_{20,0}$, $W_{23,0}$), ($W_{29,0}$, $W_{W29,0}$, $W_{32,0}$) or ($W_{38,0}$, $W_{41,0}$). Finally, depending on the second-stage comparison result, the searched key is compared in a third stage with one of 15 pairs of word pairs ($W_{0,0}$, $W_{1,0}$), ($W_{3,0}$, $W_{4,0}$), ($W_{3,0}$, $W_{4,0}$), . . . , ($W_{39,0}$, $W_{40,0}$) or ($W_{42,0}$, $W_{43,0}$), as illustrated in FIG. 26. The search procedure is completed within a maximum number of 3 stages, requiring 3 read cycles. The search result points to a specific key entry in TDA # g ($0 \leq g \leq 3$). The row and column locations of this specific key entry in DRAM # g is given by row and column mapping formulas.

FIG. 26 shows that the 2 pairs of words ($W_{8,0}$, $W_{17,0}$) and ($W_{26,0}$, $W_{35,0}$) used in the first stage are duplicated in 3 TDAs (#0 to #2), so that these pairs of words can be alternatively retrieved from any pair of TDAs. The specific pair of TDAs used depends on the location of the matching word identified in the third stage of the relevant previous search cycle; the TDA that contains the matching word of the third stage is used to retrieve this word, and the 2 remaining TDAs are used to retrieve the words needed in the first stage. The retrieval is performed sequentially from TDAs #0, #1 and #2, and the order of retrieval is determined by the location of the matching word identified in the third stage, as exemplified in Table 2.

Figure 27:
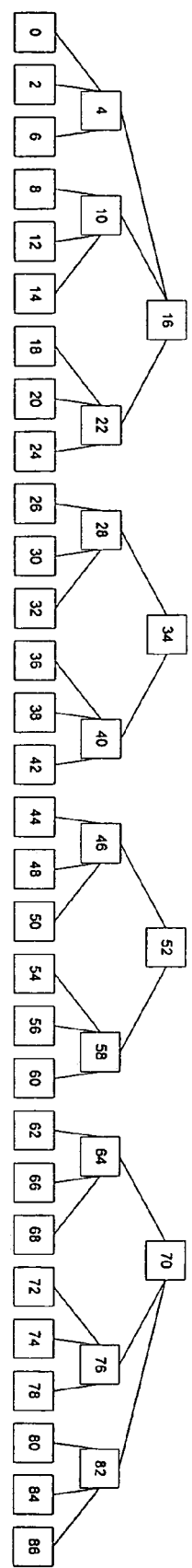
FIG. 27 shows a particular case having exemplary numerical key entries for the logical arrangement and the B-tree search procedure depicted in FIG. 26.

Table 2 lists the results of a specific case of the binary search procedure applied to numerical key entries arranged in the 4 TDAs with 44 words per extended row, as shown in FIG. 27. The DRAM Output Keys refer to the pair of words transferred from the DRAM corresponding to relevant TDA to the SEM following each search stage; NOP means No Operation and indicates that the DRAMs do not output any word in the specific clock cycle. It is assumed herein, is in the previous example, that a lookup cycle takes 4 clock cycles, and that the time taken for processing the DRAM output keys and identifying the next pair of keys to be retrieved from the DRAMs lies between 4 and 5 clock cycles. It is also assumed that consecutive DRAMs can only be accessed after one clock cycle. Consequently, the 4 DRAMs accept a new searched key every 4 clock cycles and are ready to output the identified keys after 5 clock cycles.

If an Exact Match is identified before the last stage, then the DRAM containing the matched word outputs this word; the DRAMs output NOPs in the later stages. In case of Range Match, the DRAMs continue outputting the words resulting from the sequential comparisons with the submitted key up to the last stage; all these words are then processed in the SEM to identify the matched word with no further participation of these DRAMs.

The benefit of the storage scheme used above (FIG. 26), in which the words compared in the first and third stages are arranged in 3 common TDAs (#0 to #2), can be seen by comparing it to an alternative arrangement, where the words processed in the first and third stages are stored in 3 separate TDAs. A simple alternative (see FIG. 28) is to store the 4 words used in the first stage as 2 pairs in two separate TDAs (#0 and #1), the 10 words used in the second stage as 5 pairs in a separate TDA (as before, but now listed as TDA #2) and the 30 words used in the third stage as 15 pairs in a separate fourth TDA (#3).

TABLE 2

Example 2 of Pipelined Binary Search Procedure

| Clock Cycle | Searched Key | Search Tree Stage | TDA Involved | DRAM Output Keys |
|---|---|---|---|---|
| $CLK_0$ | $K_0 = 3$ | #1 | TDA #0 | $W_{8,0} = 16$, $W_{17,0} = 34$ |
| $CLK_1$ | $K_0 = 3$ | #1 | TDA #1 | $W_{26,0} = 52$, $W_{35,0} = 70$ |
| $CLK_2$ | — | — | — | NOP |
| $CLK_3$ | — | — | — | NOP |

TABLE 2-continued

Example 2 of Pipelined Binary Search Procedure

| Clock Cycle | Searched Key | Search Tree Stage | TDA Involved | DRAM Output Keys |
|---|---|---|---|---|
| $CLK_4$ | $K_1 = 21$ | #1 | TDA #0 | $W_{8,0} = 16, W_{17,0} = 34$ |
| $CLK_5$ | $K_1 = 21$ | #1 | TDA #1 | $W_{26,0} = 52, W_{35,0} = 70$ |
| $CLK_6$ | — | — | — | NOP |
| $CLK_7$ | — | — | — | NOP |
| $CLK_8$ | $K_2 = 31$ | #1 | TDA #0 | $W_{8,0} = 16, W_{17,0} = 34$ |
| $CLK_9$ | $K_2 = 31$ | #1 | TDA #1 | $W_{26,0} = 52, W_{35,0} = 70$ |
| $CLK_{10}$ | — | — | — | NOP |
| $CLK_{11}$ | $K_0 = 3$ | #2 | TDA #3 | $W_{2,0} = 4, W_{5,0} = 10$ |
| $CLK_{12}$ | $K_3 = 43$ | #1 | TDA #0 | $W_{8,0} = 16, W_{17,0} = 34$ |
| $CLK_{13}$ | $K_3 = 43$ | #1 | TDA #1 | $W_{26,0} = 52, W_{35,0} = 70$ |
| $CLK_{14}$ | — | — | — | NOP |
| $CLK_{15}$ | $K_1 = 21$ | #2 | TDA #3 | $W_{11,0} = 22, W_{14,0} = 28$ |
| $CLK_{16}$ | $K_0 = 3$ | #3 | TDA #0 | $W_{0,0} = 0, W_{1,0} = 2$ |
| $CLK_{17}$ | $K_4 = 56$ | #1 | TDA #1 | $W_{8,0} = 16, W_{17,0} = 34$ |
| $CLK_{18}$ | $K_4 = 56$ | #1 | TDA #2 | $W_{26,0} = 52, W_{35,0} = 70$ |
| $CLK_{19}$ | $K_2 = 31$ | #2 | TDA #3 | $W_{11,0} = 22, W_{14,0} = 28$ |
| $CLK_{20}$ | $K_1 = 21$ | #3 | TDA #0 | $W_{9,0} = 18, W_{10,0} = 20$ |
| $CLK_{21}$ | $K_5 = 65$ | #1 | TDA #1 | $W_{8,0} = 16, W_{17,0} = 34$ |
| $CLK_{22}$ | $K_5 = 65$ | #1 | TDA #2 | $W_{26,0} = 52, W_{35,0} = 70$ |
| $CLK_{23}$ | $K_3 = 43$ | #2 | TDA #3 | $W_{20,0} = 40, W_{23,0} = 46$ |
| $CLK_{24}$ | $K_6 = 76$ | #1 | TDA #0 | $W_{8,0} = 16, W_{17,0} = 34$ |
| $CLK_{25}$ | $K_2 = 31$ | #3 | TDA #1 | $W_{15,0} = 30, W_{16,0} = 32$ |
| $CLK_{26}$ | $K_6 = 76$ | #1 | TDA #2 | $W_{26,0} = 52, W_{35,0} = 70$ |
| $CLK_{27}$ | $K_4 = 56$ | #2 | TDA #3 | $W_{20,0} = 40, W_{23,0} = 46$ |
| $CLK_{28}$ | $K_7 = 85$ | #1 | TDA #0 | $W_{8,0} = 16, W_{17,0} = 34$ |
| $CLK_{29}$ | $K_3 = 43$ | #3 | TDA #1 | $W_{21,0} = 42, W_{22,0} = 44$ |
| $CLK_{30}$ | $K_7 = 85$ | #1 | TDA #2 | $W_{26,0} = 52, W_{35,0} = 70$ |
| $CLK_{31}$ | $K_5 = 65$ | #2 | TDA #3 | $W_{29,0} = 58, W_{32,0} = 64$ |

In this last arrangement (FIG. 28), the first two TDAs dedicated to the 4 words used in the first stage are almost empty, and the last TDA dedicated to the 30 words is full and requires 15 rows, such that the 4 TDAs dedicate 15 rows for the 44 words in an extended row. On the other hand, the previous, more convenient storage scheme (FIG. 26), has 4 TDAs that are nearly full and require only 7 rows for the same 44 words. Thus, this scheme provides more efficient storage and/or a smaller number of rows, allowing for a smaller FC-Register.

Similar efficient arrangements, in which words (Keys and/or Associated Data) used in different search stages are stored in common DRAMs, may involve, among others, stages of two types. The first-type stage requires the retrieval of a relatively large number of words, but totaling a low capacity percentage of the database. The second-type stage requires the retrieval of a small number of words, but with a higher total capacity. The words of the first-type stages are duplicated in different DRAMs, whereas those of the second-type stages are not duplicated. When (at least) two different input keys are searched in the same lookup cycle, one at the first-type stage and the other at the second-type stage, the second-type stage requires non-duplicated words contained in specific DRAMs, and the first-type stage requires words that are duplicated in the rest of the DRAMs and can always be accessed.

Multi-RAM Multi-Hierarchy Search Procedure

Multi-Hierarchy Architecture

In Multi-Hierarchy Architecture, the first column of the FC-RAM (FC-Register) is partitioned into k hierarchical blocks according to a numerical system of base B. A general hierarchical structure consists of k hierarchical blocks, a $B^{k-1}$ Register and (k−1) RAMs, $B^{k-2}$ RAM to $B^0$ RAM. This partitioning procedure can be applied to any list or one-dimensional array of key entries.

FIG. 26 shows a partitioning of an FC-Register into three hierarchical blocks ($B^2$ Register, $B^1$ RAM and $B^0$ RAM) in a similar fashion to the partitioning taught in the co-pending U.S. patent application Ser. No. 10/206,189, assigned to HyWire Ltd. It has been assumed that the FC-Register contains N key entries. The lowest-hierarchy block $B^0$ RAM has $A \cdot B^2$ key entries, where the number A is selected to meet the condition $A \cdot B^2 \geq N$, so that the $B^0$ RAM contains all the FC-Register entries. If $A \cdot B^2 > N$, some of the last entries of the $B^0$ RAM remain empty and are filled with "all ones", which places them "out of range" for all search purposes.

It is noted for the sake of clarity that the entries shown in the B Register, $B^1$ RAM and $B^0$ RAM in FIG. 26 are the row indices (J) of the FC-Register entries and not their values $K_{0,J}$.

The partitioning process is performed in recursive mappings of a one-dimensional first column array into RAMs having the same entries. In the first mapping, the FC-Register is mapped into the $B^0$ RAM, which has $A \cdot B$ rows and B columns (see FIG. 26), so that all the entries whose row indices are multiples of B are arranged in the first column of the $B^0$ RAM; the $B^0$ RAM may be stored without its first column to save storage space. This first column is mapped into the next-hierarchy block (denoted as $B^1$ RAM) with A rows and B columns, so that all the entries whose row indices are multiples of $B^2$ are arranged in the $B^1$ RAM first column. These first column entries are stored in the next-hierarchy block (in this case, the highest-hierarchy block), which is a one-dimensional register with A cells, denoted as $B^2$ Register.

Thus, the $B^2$ Register contains all the first column entries whose row indices are multiples of $B^2$, i.e., $K_{0,J}$, where $J = m \cdot B^2$, $0 \leq m \leq A-1$. The $B^1$ RAM has A rows and B columns, and stores all the entries whose row indices are multiples of B, i.e., $K_{0,J}$, where $J = n \cdot B$, $0 \leq n \leq A \cdot B - 1$. The lowest-hierarchy block, $B^0$ RAM, stores all the entries of the FC-Register in $A \cdot B$ rows and B columns.

As in the FC-Register, if any of the last entries of the $B^2$ Register, $B^1$ RAM and $B^0$ RAM remain empty, they are filled with "all ones", which places them "out of range" for all search purposes.

In general, when the FC-Register first Column is large and is partitioned in k hierarchical blocks, the serial search procedure consists of k+2 steps. The increasing number of hierarchical blocks reduces the requisite chip size but adds latency due to the increased number of steps required by the serial search procedure. However, these k+2 steps can be performed in a pipelined procedure to achieve a high throughput. A key search in the G-DRAM starts with a search in the hierarchical blocks, specifically in the highest-hierarchy block, the $B^{k-1}$ Register, using a Row Locator to locate the largest key entry that is smaller than (or equal to) the submitted key. This key entry points to a specific row in the next-hierarchy block, the $B^{k-2}$ RAM. The submitted key is subsequently searched in the specific row of this RAM using a Column Locator to locate the largest key entry that is smaller than (or equal to) the submitted key. This key entry points to a specific row in the $B^{k-3}$ RAM. Similar search procedures are then performed in the subsequent hierarchical blocks down to the $B^0$ RAM. The matching key entry in this last RAM points to a specific FC-Register entry and G-DRAM extended row.

In the 3-hierarchy structure provided by way of example in FIG. 26, the key search starts, as described above, with a search in the in the highest-hierarchy block, $B^2$ Register, and continues in $B^1$ RAM and $B^0$ RAM, where the matching key entry points to a specific FC-Register entry and G-DRAM extended row. Finally, the submitted key is searched in this extended row to find an Exact Match (for a Binary CAM) or a Range Match (for an RCAM). This final step depends on the specific search method used (Linear, Binary or B-Tree).

FIG. 27 shows an example of the FC-Register partitioning into three hierarchical blocks, $B^2$ Register, $B^1$ RAM and $B^0$ RAM, which is a particular case of the partitioning procedure depicted in FIG. 26. In this example, the FC-Register consists of 75 entries and the numerical base for the partition is 5 (B=5, A=3).

The FC-Register partitioning can be used to significantly reduce the storage space in the SEM by storing in it part of the hierarchical blocks or only the highest-hierarchy block of the FC-Register, while locating all the other hierarchical blocks along with the Multi-RAMs in the external DRAMs. Then, the search methods disclosed herein can be used to sequentially search the hierarchical blocks and the Multi-RAMs in the external DRAMs. The storage space reduction in the SEM by reducing the number of the hierarchical blocks in the SEM requires increased bus bandwidth, due to the extra access cycles in the hierarchical blocks located in the external DRAMs. However, due to the high efficiency of the disclosed search methods, the increase in bandwidth requirement is moderate, and is more than compensated by the highly significant reduction in the embedded memory requirement within an SEM, and in the increased search throughput with respect to search engines having external memories.

Multi-Hierarchy Search Procedure

A sequential search of the submitted key in a G-DRAM is performed with the FC-Register. When the FC-Register is large and is partitioned in k hierarchical blocks, the serial Search procedure consists of k+2 steps. The increasing number of hierarchical blocks reduces the chip but adds latency because of the increased number of steps required by the serial search procedure. However, these k+2 steps can be performed in a pipelined procedure to achieve a high throughput.

Referring to the example with three hierarchical blocks, $B^2$ Register, $B^1$ RAM and $B^0$ RAM, shown in FIG. 26 for the FC-Register, a sequential search of the submitted key can be completed in four main steps. The first three of these steps are identical for Exact and Range Matches.

Step 1: Identification of the key entry in $B^2$ Register after which the submitted key may be located by means of a Row Locator; the identified key entry points to a specific row in the $B^1$ RAM.

Step 2: Access to the $B^1$ RAM row identified in Step 1 and identification of the key entry after which the submitted key may be located (using a Column Locator); the identified key entry points to a specific row in the $B^0$ RAM.

Step 3: Access to the $B^0$ RAM row identified in Step 2 and identification of the key entry after which the submitted key may be located (using a Column Locator); the identified key entry points to a specific row in the FC-Register and extended row in the G TDAs.

Step 4: Sequential access to the rows of the G TDAs identified in Step 3, and identification of the key entry after which the submitted key may be located; this points to a specific key entry in TDA # g ($0 \leq g \leq G-1$). The row and column locations of this specific key entry in DRAM # g is given by row and column mapping formulas. This step is different for Exact and Range Match, and depends on the specific search method used (Linear, Binary or B-Tree).

The four-step Key Search can be performed in sequence, requiring many clocks for execution, or in pipelined mode, which enables search results output at full clock rate.

The partitioning process can be applied to store only the highest-hierarchy block in the SEM and the other hierarchical blocks in external memories for further reduction of the internal SEM memory. The efficient key search methods, disclosed hereinabove in the section entitled "Storage and Search Methods", can be used to minimize the number of accesses to the external memories and enable faster throughput.

Multi-Dimensional Multi-Hierarchy Search Procedure

Figure 28:
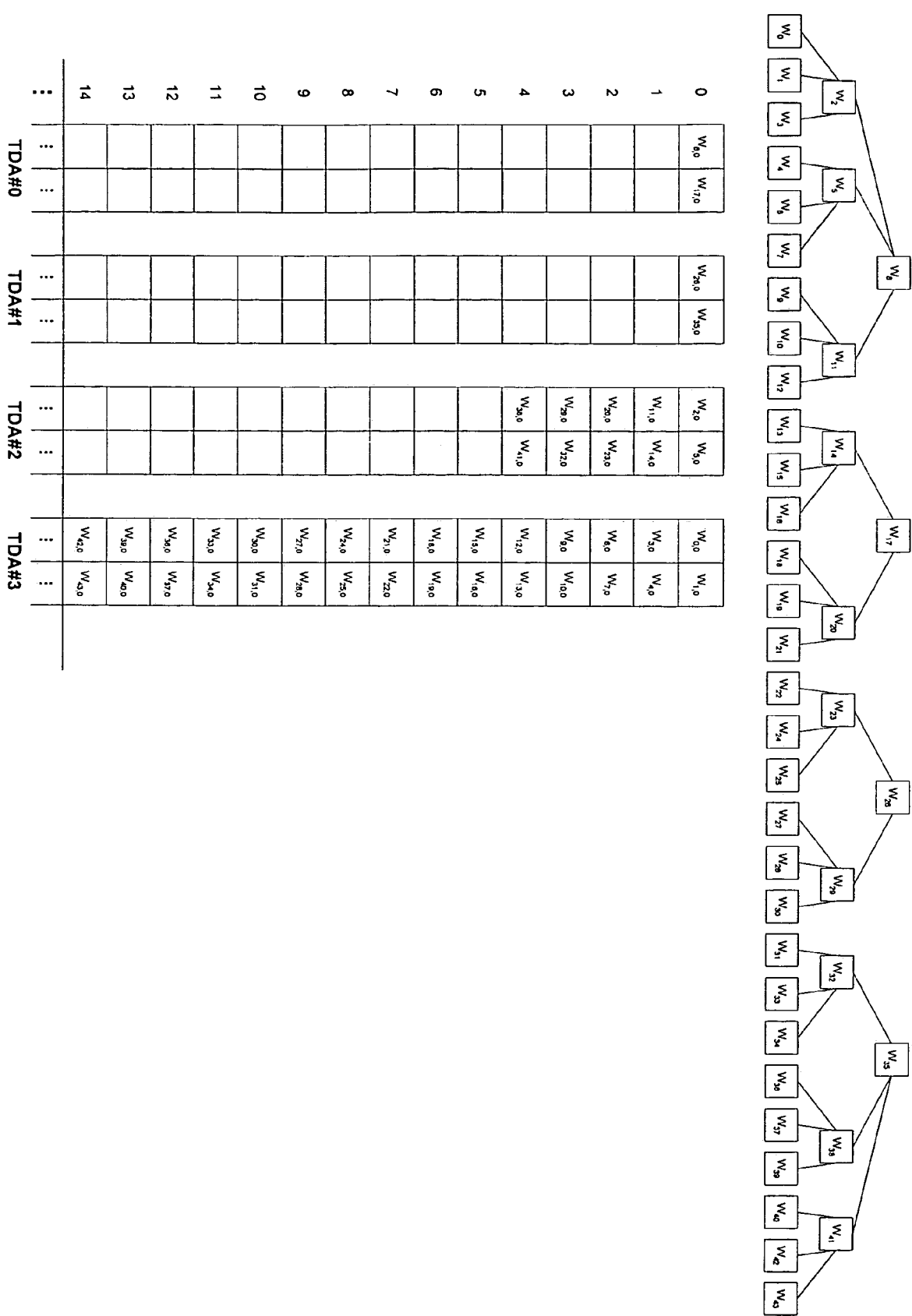
FIG. 28 shows an alternative logical arrangement to that depicted in FIG. 26, wherein the words used in different search stages are arranged in separate TDAs.
Figure 29:
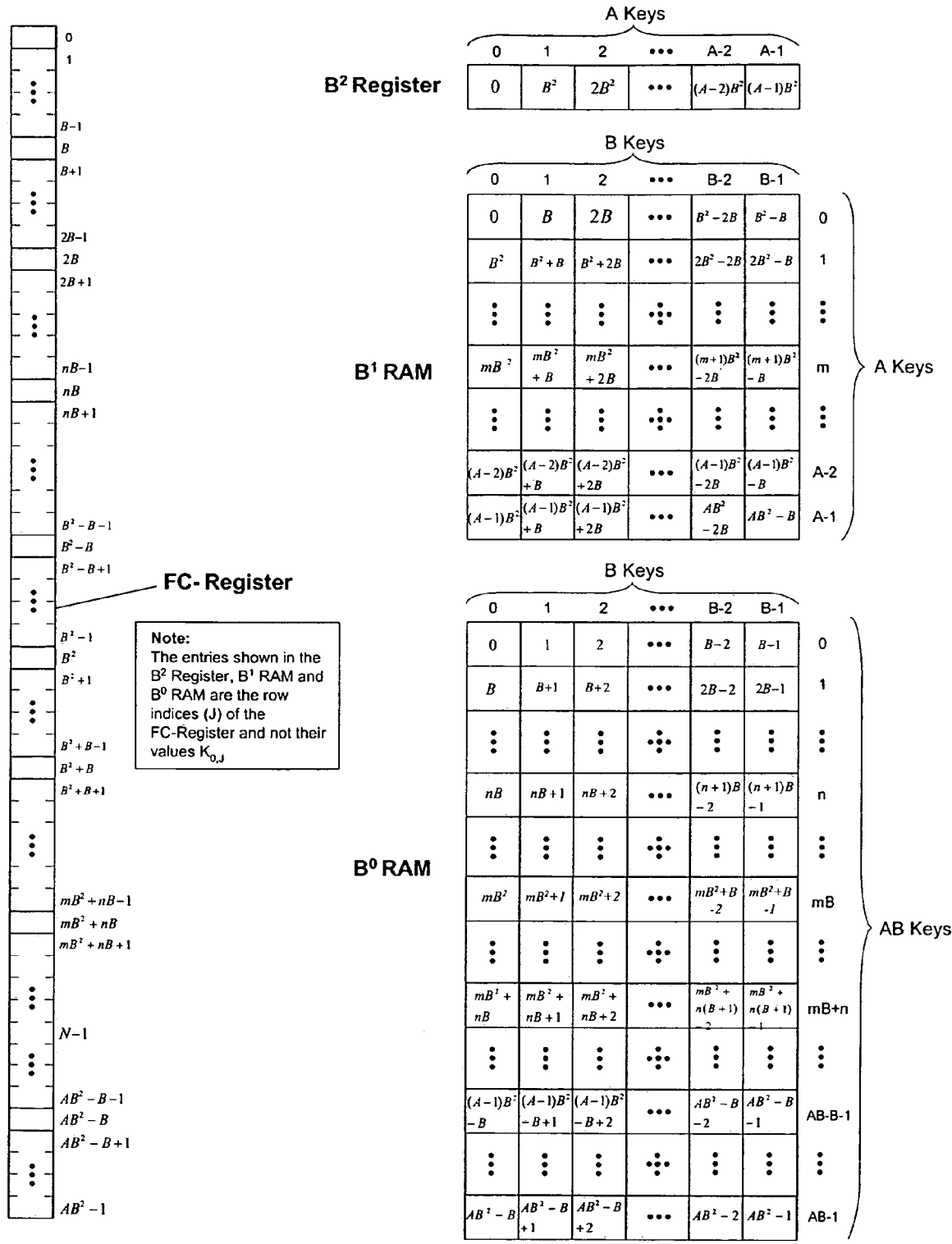
FIG. 29 shows an exemplary lowest-level block $B^0$ RAM of the FC-Register, in which the FC-RAM is partitioned into two hierarchical blocks.
Figure 30:
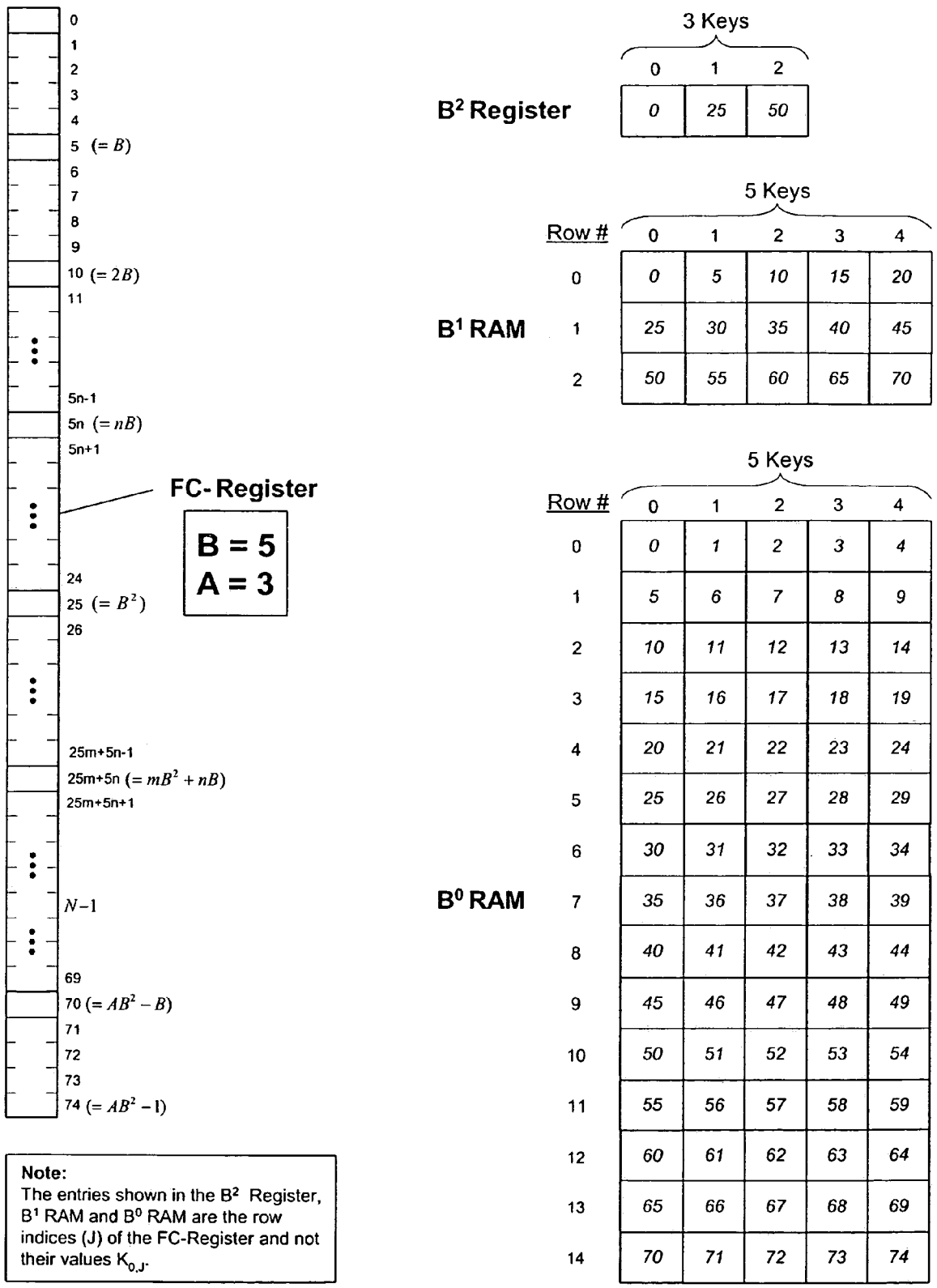
FIG. 30 shows the next-level block $B^1$ RAM of the FC-Register, and a generic partition of the $B^0$ RAM depicted in FIG. 29.

FIGS. 28 and 29 show an example of partitioning of any two-dimensional array, such as an FC-RAM for multiple TDAs, into two hierarchical blocks (denoted as $B^0$ RAM and $B^1$ RAM) according to a numerical system of base B for the FC-RAM columns and of base D for the FC-RAM rows. The lowest-hierarchy block $B^0$ RAM depicted in FIG. 28 contains the same key entries as the FC-RAM. Assume that the FC-RAM contains M·N key entries N rows and M columns. The $B^0$ RAM has A·B rows and C·D columns, where the number A and D are selected to meet the conditions $A \cdot B \geq N$ and $C \cdot D \geq M$, such that that the $B^0$ RAM contains all the FC-RAM entries. If A·B>N, some of the last column entries of the $B^0$ RAM remain empty and are disregarded (e.g., by filling them with "all ones", which places them "out of range") for all search purposes. Similarly, if C·D>M, some of the last row entries of the $B^0$ RAM remain empty and are also disregarded.

The partitioning process is performed by mapping the $B^0$ RAM, having A·B rows and C·D columns, into the next-hierarchy block $B^1$ RAM (FIG. 29) having A rows and C columns, so that all the $B^1$ RAM entries have row indices that are multiples of B and column indices that are multiples of D.

A sequential search of the submitted key in a G-DRAM starts in the $B^1$ RAM. The search procedure can be completed in three steps; all these steps, except the last one, are identical for Exact and Range Match.

Step 1: Identification of the $B^1$ RAM row (e.g., row # n in FIG. 29) in which the submitted key may be located and then the key entry (e.g., in column # m) after which the submitted key may be located; the identified key entry points to a generic partition of the $B^0$ RAM (starting at $W_{mD,nB}$ in FIG. 29) that consists of B rows and D columns.

Step 2: Access to the partition of the $B^1$ RAM identified in Step 1, and identification of the partition row and column (e.g., row # nB+j, column # mD+i in FIG. 29) that contain the key entry $W_{mD+i,nB+j}$ after which the submitted key may be located; this key entry points to a specific row in a specific TDA # g ($0 \leq g \leq G-1$).

Step 3: Access to the specific row in TDA # g identified in Step 2, and identification of the key entry after which the submitted key may be located; this points to a specific key entry in TDA # g ($0 \leq g \leq G-1$). The row and column locations of this specific key entry in DRAM # g is given by row and column mapping formulas. This step is different for Exact and Range Match, and depends on the specific search method used (Linear, Binary or B-Tree).

The three-step key search can be performed in sequence, requiring many clocks for execution, or in pipelined mode, which enables search result output at full clock rate.

This partitioning process can be repeated to map the $B^1$ RAM into a third-hierarchy block (denoted as $B^2$ RAM), whose row indices J are multiples of $B^2$, i.e., $J=n \cdot B^2$, $0 \leq n \leq A-1$, and column indices I are multiples of $D^2$, i.e., $I = m \cdot D^2$, $0 \leq m \leq C-1$. Recursive partitioning can be applied to large two-dimensional databases to generate multi-hierarchy blocks, and store only the highest-hierarchy block in the SEM and the other hierarchical blocks in external memories. This allows significant reduction of the internal SEM memory. The efficient key search methods disclosed in Section 2 can be used to minimize the number of accesses to the external memories for faster throughput.

The partitioning procedure for a two-dimensional array described above can be extended to arrays of larger dimensionality. The recursive partitioning of this array into several hierarchical blocks can be used to significantly reduce the storage space in the SEM by storing in it only part of the hierarchical blocks, or only highest-hierarchy block, while locating all the other hierarchical blocks along with the Multi-RAMs in the external DRAMs.

Tradeoff of Speed and Storage Capacity in External Memories

One way of increasing the search speed by a factor R, while keeping the total system memory unchanged, is to divide the storage capacity of the set of DRAMs in R equal parts, store identical information in each of the memory parts, and perform parallel search procedures in these memory parts. This configuration increases the search speed at the expense of the available memory reduction.

A similar way of increasing the search speed by a factor R is to increase the system capacity by R, for example, by increasing the number of DRAMs accordingly, copying the information stored in the current set of DRAMs to each of the new sets of DRAMs, and performing parallel search procedures in these R sets of DRAMs. This configuration increases the search speed at the expense of added memory devices.

The increased search speed by R in both configurations requires a corresponding increase of the Search logic operating rate by the same factor.

Entries of different lengths and types (e.g., IPv4 CIDR addresses, IPv6 addresses, MAC addresses, MPLS labels, etc.) can be stored in the same DRAMs. These entries can be arranged in different schemes, each optimized for a specific search rate. Alternatively, the entries may be arranged in structures that allow various search procedures (not necessarily optimized) at different rates.

As used herein in the specification and in the claims section that follows, the term "chip" refers to an integrated circuit used for processing data.

As used herein in the specification and in the claims section that follows, the term "row" refers to a first line of cells in an array, and the term "column" refers to a second line of cells in an array, the second line of cells being disposed in perpendicular fashion to the first line of cells. For the sake of convenience, all rows are horizontal in the figures provided herein, and all the columns are vertical.

As used herein in the specification and in the claims section that follows, the term "monotonic order" and the like refer to one or more rows (or one or more columns) in an array in which the key entries (e.g., range boundary values) are in ascending order or in descending order. This can be achieved in various ways, as demonstrated hereinabove. The term "monotonic order" specifically includes rows having a cyclic monotonic order, e.g., 9,15,69,81,2,4,7, or 23,105, 222,611,8,14.

As used herein in the specification and in the claims section that follows, the term "two-dimensional array (TDA)" and the like refer to a logical array of at least two dimensions (i.e., an array having a plurality of rows and a plurality of columns).

As used herein in the specification and in the claims section that follows, the term "logical array" refers to the arrangement of key entries so as to allow orderly access to the entries that are required in each stage or level of a search tree, thereby making efficient use of the bandwidth.

As used herein in the specification and in the claims section that follows, the term "increased rate of data retrieval" and the like, used with reference to data retrieval to processing logic in a chip, from a memory system external to the chip, refer to an increased rate of timely data retrieval in relation to the rate of timely data retrieval obtained by arranging the key entries in a simple monotonic order throughout the whole database.

As used herein in the specification and in the claims section that follows, the term "timely data retrieval" refers to an operation in which data retrieved from an external memory system to the search engine manager (SEM) is meaningful for the processing logic at the current (logical) stage of the search and/or within the current clock cycle. In some cases, it is preferable to retrieve data at an immediately successive (logical) stage or stages of the search, and the term "timely data retrieval" is meant to specifically include this possibility.

As used herein in the specification and in the claims section that follows, the term "memory storage unit" and the like refer to any memory storage device, such as an SRAM, ROM, EPROM, $E^2$ROM, flash-based storage device, optical storage device, CCD, etc. However, the storage and search methods presented herein are specifically designed for and best used (at present) with a DRAM containing a set of memory banks that can be sequentially accessed. The term "memory storage unit" is specifically meant to include a compound DRAM, each compound DRAM containing a set of memory banks that can be sequentially accessed. The term "memory storage unit" is also meant to include a memory bank, or a partitioned area of a DRAM or of a memory bank storage device, where each partitioned area within the storage device operates as a substantially separate memory device.

In the definitions provided hereinbelow relating to levels of a search tree, examples refer to an exemplary search tree having levels 1,2,3,4, and 5, and a memory including 4 memory storage units ("MSUs"): A, B, C, and D, each containing some of the key entries.

As used herein in the specification and in the claims section that follows, the term "duplicated level" and the like refer to key entries, representing at least a portion of a particular level of a search tree, which are duplicated (i.e.. stored more than once) within two or more memory storage units. For example, at least a portion of the key entries in level 1 (i.e., identical key entries) are stored both in MSU 'A' and in MSU 'B'. Similarly, the term "non-duplicated level" and the like refer to key entries, representing at least a portion of a particular level of a search tree, which are not duplicated (i.e., stored more than once) within two or more memory storage units.

As used herein in the specification and in the claims section that follows, the term "singular level" and the like, apply to a memory storage unit if the key entries stored therein are not duplicated within one or more other memory storage units that are being searched for a matching key entry. By way of example, it MSU 'A' contains a first portion of level 1, level 2, and level 3, MSU 'B' contains level 4 and the remaining portion of level 1, MSU 'C' contains a first portion of level 5, and MSU 'D' contains the remaining portion of level 5, and no duplicate entries belonging to levels 1–4 are stored in MSU 'C' or in MSU 'D', then all four MSUs are solitary levels.

As used herein in the specification and in the claims section that follows, the term "solitary level" and the like, apply to a memory storage unit if the key entries stored therein, excluding duplicated key entries, belong to a single level of the search tree. Thus, if MSU 'A' contains level 1 and level 2, MSU 'B' contains level 1 (duplicated) and level 4, MSU 'C' contains a first portion of level 5, and MSU 'D' contains a second portion of level 5, each of MSUs A–D would be considered to have a solitary level.

As used herein in the specification and in the claims section that follows, the term "span" refers to a continuum of numbers, monotonically arranged, bounded by the lowest value of a memory storage unit and the highest value of the memory storage unit.

As used herein in the specification and in the claims section that follows, the term "associated data" is meant to include an index associated with a key entry.

Regarding Range definitions, a Range is defined as a set of all the integers K that comply with the condition $N_L \leq K < N_H$, where $N_L$ and $N_H$ are two integers such that $0 \leq N_L < N_H$; $N_L$ and $N_H$ are defined as the Range Lower and Upper Boundaries, respectively. The Range definition implies that the Range Lower Boundary $N_L$ is closed and belongs to the Range, whereas the Range Upper Boundary $N_H$ is open does not belong to the Range (or vice versa).

The RCAM key ranges used in conjunction with the present invention are preferably non-overlapping for RAM-based operation. This requires the prior conversion of an overlapping range set into an equivalent non-overlapping range set according with the principles presented in my co-pending U.S. application Ser. No. 10/229,065.

If the non-overlapping ranges are not adjacent, they can be made adjacent by "interpolating" intervals between them. These intervals are not proper ranges, because they have an open lower boundary and a closed upper boundary.

Adjacent ranges yield a compact representations in which each shared boundary appears once instead of twice in the "conventional" adjacent range notation. In other words, only the lower boundary of each range is presented, instead of both the lower and upper boundaries of each range.

The RCAM sequentially stores the lower boundaries of the adjacent ranges in contiguous ascending order. The upper boundary of the last range is also included at the end. This compact adjacent range representation in an array is suitable for implementing a RAM-Based RCAM. As used herein in the specification and in the claims section that follows, the terms "Range Key Entries", "Range Boundary Values" and the like refer to the entries of this array. These terms are specific examples of what is defined more generally as "Range Boundary Information". Preferably, the angle can be represented within the array as a single range-boundary value.

The Associated Data entries corresponding to the ranges are stored in the same order in the Associated Data array. The data associated with the intervals that are not valid ranges have no meaning (Don't Care).

As used herein in the specification and in the claims section that follows, the terms "range validity information" and the like refer to data that indicate the validity of a range. A specific kind of range validity information is termed "boundary status", yet a more specific kind of range validity information is termed "boundary type". Preferably, the boundary type entry provides an indication of whether a range boundary is closed or open.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An associative search engine (ASE) for data storage and retrieval, the associative search engine comprising:
   (a) a search engine manager (SEM), disposed within a chip, said search engine manager including:
      (i) processing logic;
   (b) a memory system, including an external memory, said external memory disposed outside of said chip, said memory system including:
      (i) a plurality of memory storage units, each memory storage unit of said memory storage units having at least a first array for storing a plurality of range boundary information;
   (c) at least a second array for storing a plurality of associated data entries, said data entries being associated with said range boundary information, wherein said processing logic is designed and configured to search, in response to an input key, said range boundary information, so as to determine if said input key falls within a range associated with a particular range boundary information of said range boundary information, and wherein said range boundary information is stored in said memory storage units as logical two-dimensional arrays (TDAs) arranged for a search tree having a plurality of levels, so as to provide an increased rate of the data retrieval from said memory system to said processing logic.

2. The associative search engine of claim 1, wherein the search engine manager has an internal memory disposed within said chip.

3. The associative search engine of claim 1, wherein said range is represented by a single boundary value.

4. The associative search engine of claim 1, wherein said external memory includes at least one random access memory (RAM).

5. The associative search engine of claim 1, wherein at least a portion of said memory storage units are disposed in said external memory, the system further comprising:
   (d) an interface for interfacing between said external memory and said SEM.

6. The associative search engine of claim 1, further comprising:
   (d) a memory for storing range validity information for each of said range boundary information.

7. The associative search engine of claim 6, wherein said memory for storing range validity information is disposed within said external memory.

8. An associative search engine (ASE) for data storage and data retrieval, the associative search engine comprising:

(a) a search engine manager (SEM), disposed within a chip, said search engine manager including:
  (i) processing logic;
(b) an external memory system, disposed outside of said chip, said memory system including:
  (i) a plurality of memory storage units, each memory storage unit of said memory storage units having at least a first array for storing a plurality of key entries;
(c) at least a second array for storing a plurality of associated data entries, said data entries being associated with said key entries, and
(d) an interface for data interfacing between said external memory system and said SEM,
wherein said processing logic is designed and configured to search within each of said memory storage units, in response to an input key, so as to determine if said input key matches a particular key entry of said key entries, and
wherein said key entries are stored in said memory storage units as logical two-dimensional arrays (TDAs) arranged for a search tree having a plurality of levels, so as to provide an increased rate of the data retrieval from said external memory system to said processing logic.

9. The associative search engine of claim 8, wherein said key entries are arranged within said memory storage units so as to enable a pipelined searching, wherein a search for said input key is initiated by said processing logic before a search for a previous input key has been completed.

10. The associative search engine of claim 8, wherein said key entries are arranged within said memory storage units such that at least one of said memory storage units contains solely one solitary level of said plurality of levels.

11. The associative search engine of claim 10, wherein said key entries are arranged within said memory storage units such that said one solitary level is a singular solitary level.

12. The associative search engine of claim 11, wherein said key entries are further arranged within said memory storage units such that all of said memory storage units contain solely one solitary level of said plurality of levels.

13. The associative search engine of claim 11, wherein all of said memory storage units contain solely one solitary level of said plurality of levels, said key entries being further arranged such that a particular level of said levels is stored entirely in a single memory storage unit of said memory storage units.

14. The associative search engine of claim 13, wherein each particular level of said levels is stored entirely in a single respective memory storage unit of said memory storage units.

15. The associative search engine of claim 10, wherein said key entries are arranged such that at least a portion of said memory storage units have at least one duplicated level.

16. The associative search engine of claim 15, wherein said key entries are arranged such that all of said memory storage units have at least one duplicated level.

17. The associative search engine of claim 15, wherein said duplicated level is disposed within an additional memory storage unit so as to reduce a memory space requirement within said memory storage units.

18. The associative search engine of claim 15, wherein said duplicated level is disposed within an additional memory storage unit so as to reduce a requisite number of rows within said memory storage units.

19. The associative search engine of claim 8, wherein said key entries are arranged such that at least a portion of said memory storage units have at least one duplicated level.

20. The associative search engine of claim 19, wherein said duplicated level is disposed within an additional memory storage unit so as to reduce a requisite number of rows within said memory storage units.

21. The associative search engine of claim 10, wherein said external memory system includes at least one random access memory (RAM).

22. The associative search engine of claim 21, wherein said at least one RAM includes at least one dynamic random access memory (DRAM).

23. The associative search engine of claim 21, wherein said at least one RAM includes at least one partitioned random access memory.

24. The associative search engine of claim 22, wherein said at least one DRAM includes a plurality of memory banks.

25. The associative search engine of claim 8, wherein said processing logic is designed and configured to store said key entries in monotonic order within at least one memory storage unit of said memory storage units.

26. The associative search engine of claim 25, wherein at least two of said memory storage units have overlapping spans.

27. The associative search engine of claim 8, further comprising:
  (e) a register for storing row-identifying key entries.

28. The associative search engine of claim 8, wherein said second array is disposed in said external memory.

29. The associative search engine of claim 27, wherein said register is a column register.

30. The associative search engine of claim 27, wherein said register is divided into a plurality of hierarchical blocks.

31. A method for processing data using an associative search engine having an external memory and for extracting the data from the external memory in response to an input key, the method comprising the steps of:
  (a) providing the associative search engine (ASE), the ASE having:
    (i) a search engine manager (SEM), disposed within a chip, said search engine manager including processing logic;
  (b) providing, for the ASE, an external memory system disposed outside of said chip, said external memory system including:
    (i) a plurality of memory storage units, each memory storage unit of said memory storage units having at least a first array for storing a plurality of key entries;
  (c) providing a memory for storing a plurality of associated data entries, said data entries being associated with said key entries;
  (d) providing an interface for data interfacing between said external memory system and said SEM;
  (e) arranging said key entries as logical two-dimensional arrays (TDAs) so as to increase a rate of data retrieval from said external memory system to said processing logic, and
  (f) searching said key entries, in response to the input key, so as to determine if the input key matches a particular key entry of said key entries.

32. The method of claim 31, wherein said external memory system includes at least one random access memory (RAM).

33. The method of claim 31, wherein at least one step of said searching of said key entries is performed in said plurality of memory storage units within a single clock cycle.

34. The method of claim 31, further comprising the step of:
  (g) storing a key entry from each row of said TDAs in a column register to produce an array of row-identifying key entries.

35. The method of claim 31, further comprising the step of:
  (g) storing a row-identifying key entry associated with a particular row of said TDAs, so as to produce an array of row-identifying key entries.

36. The method of claim 31, further comprising the step of:
  (g) storing, in a column register, a row-identifying key entry associated with a particular row of said TDAs, so as to produce an array of row-identifying key entries.

37. The method of claim 35, further comprising the step of:
  (h) searching said array containing said row-identifying key entries to determine a particular row within said TDAs that potentially contains a matching key entry that matches the input key.

38. The method of claim 37, further comprising the step of:
  (i) searching said particular row that potentially contains said matching key entry.

39. The method of claim 35, wherein each TDA of said TDAs represents a level of a B-tree.

40. The method of claim 35, wherein said array of row-identifying key entries is partitioned into k hierarchical blocks according to a numerical system of base B, wherein $k \geq 2$ and $B \geq 2$.

41. The method of claim 31, wherein said plurality of key entries stored in said at least a first array contains range boundary information.

42. The method of claim 31, wherein said key entries are arranged in monotonic order within said memory storage units.

43. The method of claim 31, wherein said searching is a pipelined searching, such that a search for the input key is initiated by said processing logic before a search for a previous input key has been completed.

44. The method of claim 43, wherein said arranging of said key entries in logical TDAs is performed so as to enable said pipelined searching.

45. An associative search engine (ASE) for data storage and retrieval, the associative search engine comprising:
  (a) a search engine manager (SEM), disposed within a chip, said search engine manager including:
    (i) processing logic;
  (b) a memory system, including:
    (i) at least a first array for storing a plurality of range boundary information pertaining to a plurality of Ranges, each Range of said Ranges being defined as a set of all integers K that comply with a condition $N_L \leq K < N_H$, where $N_L$ and $N_H$ are two integers such that:

$0 \leq N_L < N_H$, or $0 < N_L \leq N_H$;

wherein $N_L$ and $N_H$ are a lower Range boundary and an upper Range boundary, respectively;
  (c) at least a second array for storing a plurality of associated data entries, said data entries being associated with said range boundary information,
wherein said processing logic is designed and configured to search, in response to an input key, said range boundary information, so as to determine if said input key falls within a Range associated with a particular range boundary information of said range boundary information.

46. The associative search engine of claim 45, wherein said range boundary information is stored in said memory system as logical two-dimensional arrays (TDAs) arranged for a search tree having a plurality of levels, so as to provide an increased rate of the data retrieval from said memory system to said processing logic.

47. The associative search engine of claim 45, wherein said Range is represented by a single boundary value.

* * * * *